US012292522B2

(12) United States Patent
Wang et al.

(10) Patent No.: US 12,292,522 B2
(45) Date of Patent: May 6, 2025

(54) DETERMINING A POSITION OF USER EQUIPMENT BY USING ADAPTIVE PHASE-CHANGING DEVICES

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 316 days.

(21) Appl. No.: 18/005,555

(22) PCT Filed: Jul. 15, 2021

(86) PCT No.: PCT/US2021/041802
§ 371 (c)(1),
(2) Date: Jan. 13, 2023

(87) PCT Pub. No.: WO2022/015965
PCT Pub. Date: Jan. 20, 2022

(65) Prior Publication Data
US 2023/0258759 A1    Aug. 17, 2023

Related U.S. Application Data

(60) Provisional application No. 63/058,319, filed on Jul. 29, 2020, provisional application No. 63/053,560, filed on Jul. 17, 2020.

(51) Int. Cl.
*G01S 5/00*    (2006.01)
*G01S 5/02*    (2010.01)

(52) U.S. Cl.
CPC .......... *G01S 5/0036* (2013.01); *G01S 5/0273* (2013.01); *G01S 2205/008* (2013.01)

(58) Field of Classification Search
CPC ................. G01S 5/0036; G01S 5/0273; G01S 2205/008; G01S 1/0423; G01S 1/08; G01S 5/02; H04B 7/145; H04B 7/04026
(Continued)

(56) References Cited

U.S. PATENT DOCUMENTS 9,002,286 B2 * 4/2015 Maran .................. H04B 17/373
                                                                        455/67.11
2011/0201357 A1 * 8/2011 Garrett ...................... G01S 5/12
                                                                        455/456.2
(Continued)

FOREIGN PATENT DOCUMENTS

CN    107438398 A  * 12/2017  ............... A61B 3/16
CN    107820253 A  *  3/2018  ............ H04W 16/14
(Continued)

OTHER PUBLICATIONS

"Foreign Office Action", AU Application No. 2021309975, Aug. 1, 2023, 2 pages.
(Continued)

*Primary Examiner* — Mahendra R Patel
(74) *Attorney, Agent, or Firm* — Colby Nipper PLLC

(57) ABSTRACT

Techniques and apparatuses are described for determining a position of user equipment by using adaptive phase-changing devices. In aspects, a base station transmits wireless signals for a UE toward respective reconfigurable intelligent surfaces (RISs) of adaptive phase-changing devices. The APDs may direct reflections of the wireless signals in a direction, such as toward the UE, based on a configuration of the RIS of the APD. The base station receives, from the UE via a wireless connection, identifiers of the reflections of the wireless signals that are received by the UE. In some cases, the base station also receives a signal quality parameter associated with the reflection reaching the UE. The base station determines angular information based on the respective identifiers and/or signal quality parameters of the reflections. Based on the angular information and known positions of the APDs, the base station determines a position of the UE.

20 Claims, 21 Drawing Sheets

(58) Field of Classification Search
USPC .................................................... 455/456.1
See application file for complete search history.

(56) References Cited

U.S. PATENT DOCUMENTS

| | | | | |
|---|---|---|---|---|
| 2012/0057580 | A1* | 3/2012 | Hansen | G01S 1/02 |
| | | | | 370/338 |
| 2013/0306276 | A1* | 11/2013 | Duchesneau | H04L 41/04 |
| | | | | 709/225 |
| 2019/0116605 | A1* | 4/2019 | Luo | H04W 72/0446 |
| 2019/0199457 | A1* | 6/2019 | Chopra | H04W 52/42 |
| 2020/0067593 | A1* | 2/2020 | Gharavi | H04B 7/15528 |
| 2020/0296680 | A1* | 9/2020 | Akkarakaran | H04W 4/029 |
| 2021/0254056 | A1* | 8/2021 | Liu | G16B 20/50 |
| 2022/0224414 | A1* | 7/2022 | Haas | H04B 10/572 |

FOREIGN PATENT DOCUMENTS

| | | | | |
|---|---|---|---|---|
| CN | 108702675 | A * | 10/2018 | ............ G01J 5/48 |
| CN | 111050277 | | 4/2020 | |
| CN | 111050277 | A * | 4/2020 | |
| CN | 111093267 | | 5/2020 | |
| CN | 114530947 | A * | 5/2022 | .............. H02J 5/005 |
| EP | 3919929 | A1 * | 12/2021 | ............ G01S 5/0205 |
| WO | WO-2021251511 | A1 * | 12/2021 | .......... H01Q 15/0006 |
| WO | 2022015965 | | 1/2022 | |

OTHER PUBLICATIONS

"International Preliminary Report on Patentability", Application No. PCT/US2021/041802, Jan. 17, 2023, 10 pages.
"International Search Report and Written Opinion", PCT Application No. PCT/US2021/041802, Nov. 4, 2021, 14 pages.
Alghamdi, et al., "Intelligent Surfaces for 6G Wireless Networks: A Survey of Optimization and Performance Analysis Techniques", Sep. 6, 2020, 23 pages.
Cui, et al., "An Efficient CSI Acquisition Method for Intelligent Reflecting Surface-assisted mmWave Networks", Dec. 27, 2019.
Fu, et al., "Intelligent Reflecting Surface for Downlink Non-Orthogonal Multiple Access Networks", Jun. 27, 2019.
He, et al., "Adaptive Beamforming Design for mmWave RIS-Aided Joint Localization and Communication", 2020 IEEE Wireless Communications and Networking Conference Workshops, Apr. 6, 2020, 6 pages.
Wymeersch, et al., "Radio Localization and Mapping with Reconfigurable Intelligent Surfaces", arxiv.org, Cornell University, Dec. 19, 2019, 14 pages.

* cited by examiner

| Base Station 120 | APD 181 | | | UE 110 | |
|---|---|---|---|---|---|
| Beam ID Modulation 502 | Phase Vector 606 | Reflection Angle 608 | Reflection 514 | Reflection ID 506 | RSRP 610 |
| 1.10 | 71 | 109° | 632 | · | < -140 dBm |
| ... | ... | ... | ... | ... | ... |
| 1.20 | 81 | 99° | 633 | · | < -140 dBm |
| ... | ... | ... | ... | ... | ... |
| 1.28 | 89 | 91° | · | 1.28 | -131 dBm |
| 1.29 | 90 | 90° | · | 1.29 | -119 dBm |
| 1.30 | 91 | 89° | 634 | 1.30 | -97 dBm |
| 1.31 | 92 | 88° | · | 1.31 | -108 dBm |
| 1.32 | 93 | 87° | · | 1.32 | -125 dBm |
| ... | ... | ... | ... | ... | ... |
| 1.50 | 101 | 79° | 635 | · | < -140 dBm |
| ... | ... | ... | ... | ... | ... |
| 1.60 | 111 | 69° | 636 | · | < -140 dBm |
| | Beam Sweeping Pattern 13 604 | | | | |

| Base Station 120 | APD 183 | | | UE 110 | |
|---|---|---|---|---|---|
| Beam ID Modulation 502 | Phase Vector 606 | Reflection Angle 608 | Reflection 514 | Reflection ID 506 | RSRP 610 |
| 3.10 | 421 | 87° | 672 | · | < -140 dBm |
| ... | ... | ... | ... | ... | ... |
| 3.24 | 430 | 101° | · | 3.24 | -107 dBm |
| 3.25 | 431 | 102° | 673 | 3.25 | -89 dBm |
| 3.26 | 432 | 103° | · | 3.26 | -111 dBm |
| ... | ... | ... | ... | ... | ... |
| 3.40 | 451 | 117° | 674 | · | < -140 dBm |
| | Beam Sweeping Pattern 27 604 | | | | |

Time Slot 2 808

Time Slot 3 810

DETERMINING A POSITION OF USER EQUIPMENT BY USING ADAPTIVE PHASE-CHANGING DEVICES

RELATED APPLICATION(S)

This application is a national stage entry of International Application No. PCT/US2021/041802, filed Jul. 15, 2021, which claims the benefit of U.S. Provisional Application No. 63/058,319, filed Jul. 29, 2020, which in turn claims the benefit of U.S. Provisional Application No. 63/053,560, filed Jul. 17, 2020, the disclosures of which are incorporated herein by reference in their entirety.

BACKGROUND

Evolving wireless communication systems, such as fifth generation (5G) technologies and sixth generation (6G) technologies, use various techniques to determine positions of user equipment that communicate over a wireless network. As an example, a user equipment may transmit or receive various location signals or reference signals associated with pre-existing wireless technologies. Transmitting signals in low-frequency bands may enable non-line of sight (non-LoS) communication between base stations of the wireless network and the user equipment, but the use of non-LoS communication for determining a position of user equipment often yields imprecise results. To illustrate, in various urban canyon or indoor environments, the non-LoS location or reference signals are susceptible to multipath fading due to structures, foliage, or other LoS impairments located between the base stations and the user equipment. It therefore becomes desirable to avoid or mitigate the effects of fading in order to improve precision when determining the position of user equipment.

SUMMARY

This document describes techniques and apparatuses for using adaptive phase-changing devices when determining a position of user equipment. In aspects, a base station transmits wireless signals for a UE toward respective reconfigurable intelligent surfaces (RISs) of adaptive phase-changing devices (APDs). The APDs steer reflections of the wireless signals in a direction, such as toward the UE, based on a configuration of the RISs of the APDs. The base station receives, from the UE via a wireless connection, identifiers of the reflected wireless signals that are received by the UE. In some cases, the base station also receives a signal quality parameter associated with the reflection reaching the UE. The base station determines angular information based on the respective identifiers and/or signal quality parameters of the reflections. Based on the angular information and known positions of the APDs, the base station determines a position of the UE.

In various aspects, a base station implements a method to determine a position of a UE by transmitting a first wireless signal for the UE toward a first RIS of a first APD and receiving, from the UE via a wireless connection, a first identifier of a first reflection of the first wireless signal received by the UE. The base station also transmits a second wireless signal for the UE toward a second RIS of a second APD and receives a second identifier of a second reflection of the second wireless signal received by the UE. In some cases, the base station transmits a third wireless signal for the UE toward a third RIS of a third APD and receives a third identifier of a third reflection of the third wireless signal received by the UE. The method implemented by the base station includes determining respective angular information for the first APD and second APD based on the first identifier of the first reflection and the second identifier of the second reflection. The base station then determines a position of the UE based on the respective angular information and position information of the first APD and second APD. By so doing, the base station can determine the position of the UE quickly, without coordinating communications through or aggregating information from other base stations, which also reduces latency or network overhead associated with pre-existing processes for determining a position of user equipment.

The details of one or more implementations for determining a position of user equipment by using adaptive phase-changing devices are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects for determining a position of user equipment by using adaptive phase-changing devices are described with reference to the following drawings. The same numbers are used throughout the drawings to reference like features and components.

DETAILED DESCRIPTION

Figure 1:
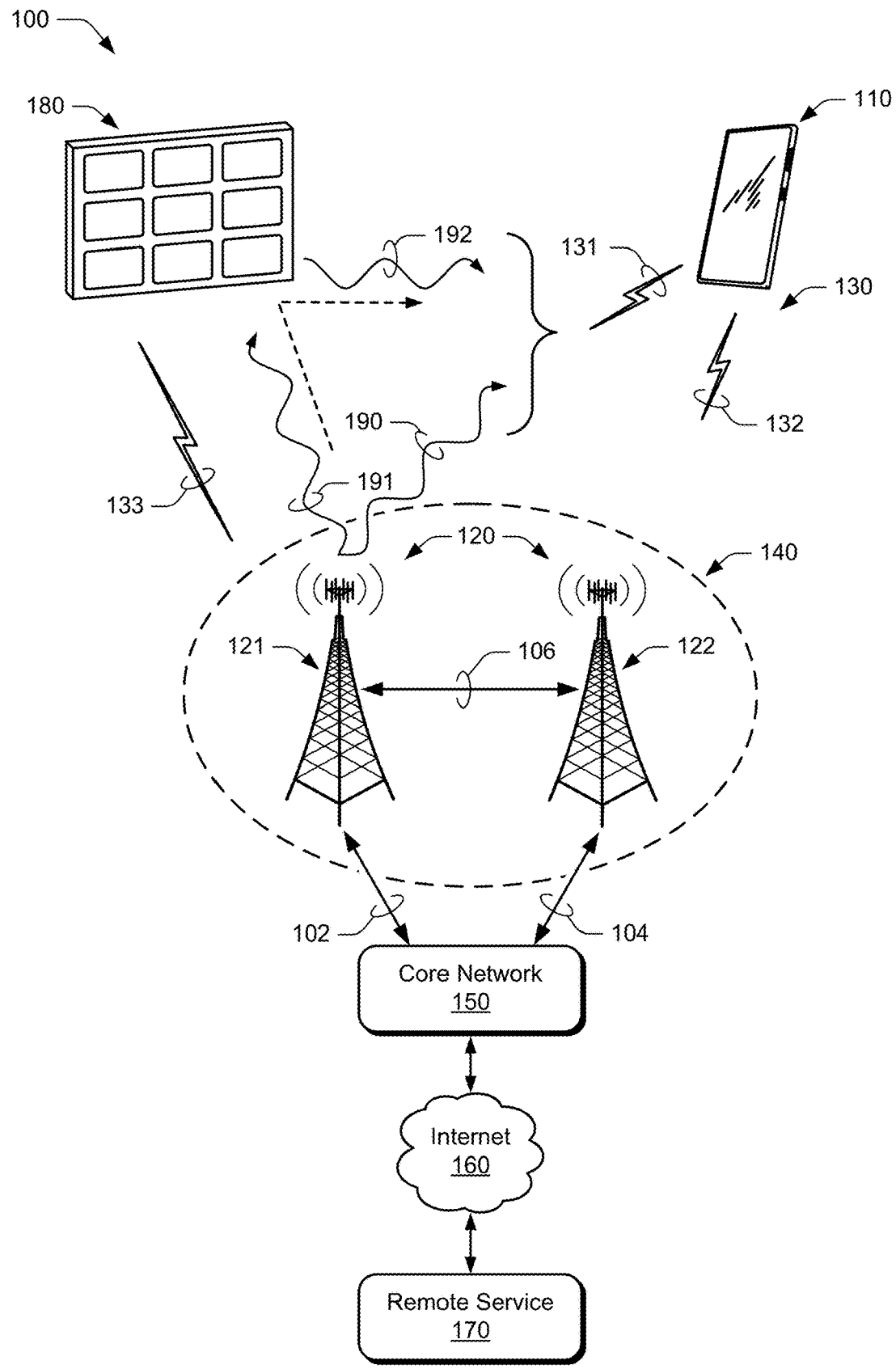
FIG. 1 illustrates an example operating environment in which various aspects of determining a user equipment's position by using adaptive phase-changing devices can be implemented.

Evolving wireless communication systems use various techniques to determine positions of user equipment associated with a wireless network, which can be leveraged to improve communications with the user equipment or provide location-based services to the user equipment. Known techniques to determine user equipment positions, however, could be inaccurate due to communication of reference signals or sounding signals in low-frequency bands of pre-existing wireless systems. While signals transmitted in these low-frequency bands may enable non-LoS communication between base stations of the wireless network and the user equipment, the non-LoS signals are susceptible to multipath and other types of fading due to structures, obstructions, or other LoS impairments between the base station and the user equipment. Additionally, coordinating and processing these signals typically relied on communication with or among multiple base stations of the wireless network, which is complex, time intensive, and increases network overhead. Such factors may further impair the accuracy of positions determined with non-LoS communication, particularly for non-stationary or fast-moving user equipment. Thus, the techniques implemented by pre-existing network technologies to determine positions of user equipment were often inaccurate, relatively slow, and increased network overhead.

This disclosure describes improvements in determining a position of user equipment by using adaptive phase-changing devices, which may be deployed in fifth generation new radio (5G NR) and sixth generation (6G) wireless networks. To improve wireless network system performance and deliver larger quantities of user data, evolving wireless communication systems (e.g., 5G, 6G) can transmit at higher frequencies (e.g., millimeter wave range), sometimes through LoS communication between user equipment and a base station of the next generation wireless network systems. While this high-frequency LoS communication enables more accurate and quicker determinations of user equipment positions, LoS obstructions (e.g., buildings, utility poles, weather, or foliage) may block the high-frequency signals or the user equipment may not always have a LoS communication channel with a base station. As an example, mmWave signals have high throughput and low latency under LoS conditions, but a user equipment may not have consistent, unobstructed LoS conditions with a base station (e.g., non-stationary user equipment) or with multiple base stations as needed to provide sufficient respective angular and distance information for computations to determine a user equipment's position.

As described herein, adaptive phase-changing devices (APDs) can be used to address this or other issues by reflecting radio frequency (RF) waves or signal rays in a controlled manner to enhance wireless communications. In aspects, APDs can be configured to reflect or direct wireless signals transmitted by a base station toward a user equipment that may not have a direct LoS communication channel with the base station or to provide an additional communication path for different angular information. Thus, an APD enables a base station to communicate high-frequency signals with the user equipment using reflections of the signals that can be steered toward the user equipment around obstructions or through different angles. In the context of determining a position of the user equipment, the base station can use APDs at different locations to steer or direct reflections of the high-frequency signals toward the user equipment. Based on the angles used to steer or direct the reflections to the user equipment, the base station can quickly and accurately determine a position for the user equipment. By so doing, the base station can determine or update the position of the user equipment without the involvement of other base stations or network entities, thereby reducing time, complexity, and network overhead associated with determining the position of the user equipment.

To enable reflections or signal transformations, an APD includes a reconfigurable intelligent surface (RIS) that, when properly configured, reflects and/or modifies propagating signals in a controlled manner based on the configuration of the RIS. In some aspects, an APD-enabled position function of a base station configures an RIS of an APD to direct or steer reflections of an incident wireless signal transmitted by the base station toward the user equipment. Generally, the RIS of the APD includes configurable surface materials or elements that control how incident signals striking the surface of the materials are transformed and reflected. To illustrate, the configuration of the surface materials or elements can affect a direction, phase, amplitude, and/or polarization of the transformed signal reflected by the surface. Thus, modifying a surface configuration of the RIS changes how signals are steered or transformed, enabling a base station to direct reflections of wireless signals toward user equipment with precise control. Alternatively or additionally, the base station or APD modulates a beam identifier (e.g., a transmit beam ID or reflected beam ID) on one or more portions of a wireless signal, which is conveyed to the user equipment by a reflection of the wireless signal as an identifier of the reflection (e.g., a reflection that reaches the user equipment) or reflection identifier. The user equipment can then decode and report the identifier of the reflection and signal quality parameters for the reflected wireless signal back to the base station to aid in determining which specific reflection of the wireless signal (e.g., signal ray) reached the user equipment. In some cases, the base station implements a low-frequency or anchor wireless connection with the user equipment to receive feedback of the reflection identifiers and/or signal quality parameters (e.g., reference signal receive-strength) for the reflections received by the user equipment. Alternatively or additionally, the base station implements a control channel with the APDs over a wired link or a low-frequency wireless link to enable selection and configuration of one or more of the APDs for operations associated with determining a position of one or more user equipment. As an example, the base station may transmit indications of RIS configurations or beam sweeping patterns to the APDs for use by the APDs to direct reflections to user equipment. These are but a few example aspects of determining a user equipment's position by using adaptive phase-changing devices, others of which are described throughout this disclosure.

In aspects of determining a position of user equipment by using APDs, a base station transmits wireless signals for a UE toward respective reconfigurable intelligent surfaces (RISs) of adaptive phase-changing devices (APDs). The APDs may direct reflections of the wireless signals in a direction, such as toward the UE, based on a configuration of the RIS of each APD. In some cases, the base station uses one or more of the APDs to implement a beam sweeping pattern to directionally sweep reflections of an incident wireless signal toward an estimated position of the UE, which allows the base station to narrow down a location of the UE when determining the position of the UE. The base station receives, from the UE via a wireless connection, identifiers of the reflections of the wireless signals that are received by the UE. In some cases, the base station also receives a signal quality parameter associated with each reflection reaching the UE. The base station determines angular information based on the respective identifiers and/or signal quality parameters of the reflections. Based on the angular information and known positions of the APDs, the base station calculates a position of the UE.

In some aspects, a base station implements a method to determine a position of a UE by transmitting a first wireless signal for the UE toward a first RIS of a first APD and receiving, from the UE via a wireless connection, a first identifier of a first reflection of the first wireless signal received by the UE. The base station also transmits a second wireless signal for the UE toward a second RIS of a second APD and receives a second identifier of a second reflection of the second wireless signal received by the UE. In some cases, the base station transmits a third wireless signal for the UE toward a third RIS of a third APD and receives a third identifier of a third reflection of the third wireless signal received by the UE. Alternatively or additionally, the base station may communicate directly with the UE (e.g., without an APD) to obtain or determine information related to a location of the UE relative to the base station. The method includes determining respective angular information for the first APD and second APD based on the first identifier of the first reflection and the second identifier of the second reflection. The base station then determines a position of the UE based on at least the respective angular information related to and position information of the first APD and second APD. By so doing, the base station can determine the position of the UE quickly and accurately, without coordinating communications through or aggregating information from other base stations, which also reduces network overhead associated with determining positions of user equipment.

While features and concepts of the described systems and methods for determining a position of a UE by using APDs can be implemented in any number of different environments, systems, devices, and/or various configurations, various aspects of determining a UE's position by using ADPs are described in the context of the following example devices, systems, and configurations.

Example Environment

FIG. 1 illustrates an example environment 100, which includes a user equipment 110 (UE 110) that can communicate with base stations 120 (illustrated as base stations 121 and 122) through one or more wireless communication links 130 (wireless link 130), illustrated as wireless links 131 and 132. Alternatively or additionally, the wireless links 130 include a wireless link 133 between at least one of the base stations 120 (e.g., base station 121) and an adaptive phase-changing device 180 (APD 180) to control a surface configuration of the APD 180. In other implementations, the base stations 120 include a wireline interface for communicating control information with the APD 180. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device, such as a sensor, relay, or actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base stations, or the like, or any combination thereof.

One or more base stations 120 communicate with the user equipment 110 using the wireless links 131 and 132, which may be implemented as any suitable type of wireless link. The wireless links 131 and 132 include control-plane information and/or user-plane data, such as downlink user-plane data and control-plane information communicated from the base stations 120 to the user equipment 110, uplink of other user-plane data and control-plane information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), fifth generation New Radio (5G NR), sixth generation (6G), and so forth. In various aspects, the base stations 120 and UE 110 may be implemented for operation in sub-gigahertz bands, sub-6 GHz bands (e.g., Frequency Range 1), and/or above-6 GHz bands (e.g., Frequency Range 2, millimeter wave (mmWave) bands) that are defined by one or more of the 3GPP LTE, 5G NR, or 6G communication standards (e.g., 26 GHZ, 28 GHz, 38 GHz, 39 GHz, 41 GHZ, 57-64 GHZ, 71 GHz, 81 GHz, 92 GHz bands, 100 GHz to 300 GHz, 130 GHz to 175 GHz, or 300 GHz to 3 THz bands). Multiple wireless links 130 may be aggregated in a carrier aggregation or multi-connectivity technology to provide a higher data rate for the UE 110. Multiple wireless links 130 from multiple base stations 120 may be configured for Coordinated Multipoint (CoMP) communication with the UE 110.

In some implementations, the wireless links (e.g., wireless link 131 and/or wireless link 132) utilize wireless signals, where an intermediate device (e.g., APD 180) reflects or transforms ray(s) of the wireless signals. To illustrate, signal ray 190 and signal ray 191 correspond to rays of a wireless signal (e.g., broad or narrow beam) used to implement the wireless link 131. In the environment 100, the rays 190 and 191 correspond to rays of a downlink wireless signal from the base station 121 to the UE 110, but the rays can alternatively or additionally correspond to an uplink wireless signal from the UE 110 to the base station 121. As part of communicating with the UE 110 through wireless link 131, the base station 121 beams a downlink wireless signal intended for the UE 110. A first ray of the downlink wireless signal (e.g., signal ray 190) propagates toward the UE 110 in a line-of-sight (LoS) manner and a second ray of the downlink wireless signal (e.g., signal ray 191) propagates toward the APD 180. The signal ray 191 strikes the surface of the APD 180 and transforms into signal ray 192, as a reflection of signal ray 191, that propagates toward the UE 110. In aspects, the signal ray 191 strikes the surface of an RIS of the APD 180, which steers its reflected signal ray 192 toward the UE 110. Note that the LoS signal ray 190 may be dynamically blocked or attenuated by foliage, human bodies, water vapor, or other materials (not shown).

The base station 121 configures an RIS of the APD 180 to direct how the RIS alters signal properties (e.g., direction, phase, amplitude, polarization) of a wireless signal. For example, the base station 121 communicates RIS surface-configuration information to the APD 180 using the wireless link 133, which may include an adaptive phase-changing device slow-control channel (APD-slow-control channel) or an adaptive phase-changing device fast-control channel (APD-fast-control channel). In various implementations of using an APD to determine a position of user equipment, the base station 121 determines a surface configuration for the APD 180 to direct or steer reflections of wireless signals transmitted by the base stations 120 toward the UE 110. Alternatively or additionally, the base station 121 determines a configuration for the APD 180 based on downlink signal quality parameters received from the UE 110, uplink quality parameters generated by the base station 121, and/or link quality parameters obtained from historical data records as further described.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an SI interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Example Devices

Figure 2:
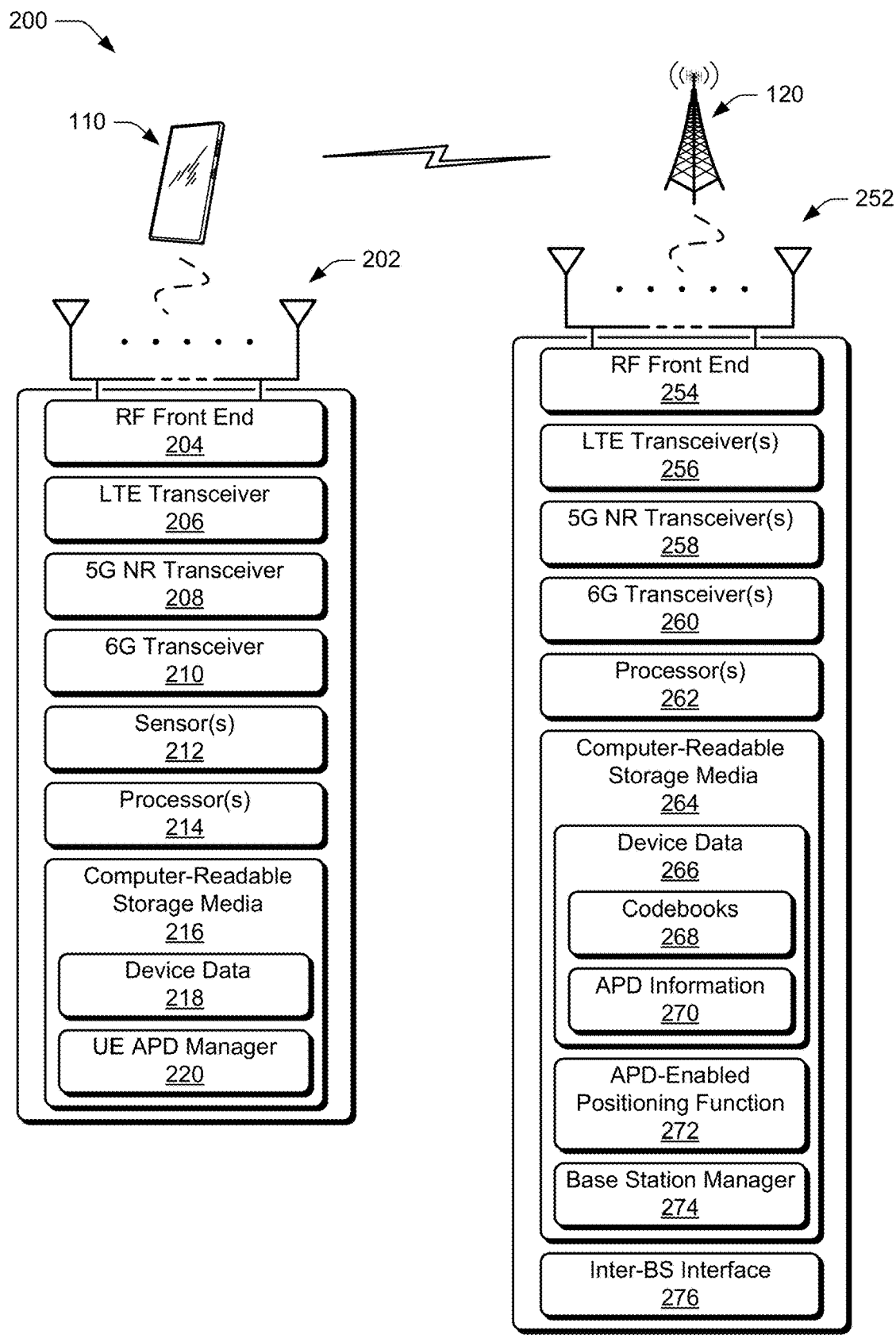
FIG. 2 illustrates an example device diagram of entities that can implement various aspects of determining a position of user equipment by using adaptive phase-changing devices.

FIG. 2 illustrates an example device diagram 200 of the user equipment 110 and base stations 120. Generally, the device diagram 200 describes network entities that can implement various aspects of determining a position of user equipment by using adaptive phase-changing devices. FIG. 2 shows respective instances of the UE 110 and the base stations 120. The UE 110 or the base stations 120 may include additional functions and interfaces that are omitted from FIG. 2 for the sake of visual brevity. The UE 110 includes antennas 202, a radio frequency front end 204 (RF front end 204), and radio-frequency transceivers that include any one or more of an LTE transceiver 206, a 5G NR transceiver 208, and/or a 6G transceiver 210 for communicating with base stations 120 in the RAN 140. The RF front end 204 of the UE 110 can couple or connect the LTE transceiver 206, the 5G NR transceiver 208, and the 6G transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, the 5G NR transceiver 208, and/or the 6G transceiver 210 may be configured to support beamforming for the transmission and reception of communications with the base stations 120. By way of example and not limitation, the antennas 202 and the RF front end 204 can be implemented for operation in sub-gigahertz bands (e.g., 700 MHz, 800 MHZ, 900 MHz bands), sub-6 GHz bands (e.g., low-band, 1800 MHz, 1900 MHZ, 2100 MHZ, 3500 MHz bands), and/or above 6 GHz bands (e.g., high-band) that are defined by the 3GPP LTE and 5G NR communication standards (e.g., 57-64 GHZ, 28 GHZ, 38 GHZ, 71 GHz, 81 GHz, or 92 GHz bands).

The UE 110 includes sensors 212 that can be implemented to detect various properties such as temperature, orientation, acceleration, proximity, magnetic fields, position, distance, supplied power, power usage, battery state, or the like. As such, the sensors of the UE 110 may include any one or a combination of accelerometers, gyros, depth sensors, magnetometers, global navigation satellite system (GNSS) sensors (e.g., global positioning system (GPS) receiver), distance sensors, temperature sensors, thermistors, battery sensors, and power usage sensors.

The UE 110 also includes processor(s) 214 and computer-readable storage media 216 (CRM 216). The processor 214 may be a single core processor or a multiple core processor implemented with a homogenous or heterogeneous core structure. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes any combination of user data, multimedia data, codebook(s), applications, and/or an operating system of the UE 110. In implementations, the device data 218 stores processor-executable instructions that are executable by processor(s) 214 to enable user-plane communication, control-plane signaling, and user interaction with the UE 110.

The CRM 216 of the UE 110 may optionally include a user equipment adaptive phase-changing device manager 220 (UE APD manager 220). Alternatively or additionally, the UE APD manager 220 may be implemented in whole or part as hardware logic or circuitry integrated with or separate from other components of the UE 110. In aspects, the UE APD manager 220 of the UE 110 decodes reflection identifiers, analyzes link quality parameters, and generates various APD feedback messages for a base station. Alternatively or additionally, the UE APD manager 220 maintains an anchor connection with a base station 120 over a low-frequency band (e.g., less than 6 GHz) to provide signal reflection or beam information for high-frequency signals (e.g., higher than 6 GHZ) used to set up and conduct operations to determine the position of the UE 110 with the APDs 180. As such, the UE 110 may implement carrier aggregation (CA) to communicate in two frequency bands when communicating with the base station 120 to implement aspects of using APDs to determine a position of user equipment.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and the 6G transceivers 260 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, the 5G NR transceivers 258, and/or the 6G transceivers 260. Additionally, the antennas 252, the RF front end 254, the LTE transceivers 256, the 5G NR transceivers 258, and/or the 6G transceivers 260 may be configured to support beamforming, such as Massive-MIMO, for the transmission and reception of communications with the UE 110.

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as RAM, SRAM, DRAM, NVRAM, ROM, or Flash memory useable to store device data 266 of the base stations 120. The device data 266 includes network scheduling data, radio resource management data, applications, and/or an operating system of the base stations 120, which are executable by processor(s) 262 to enable communication with the UE 110. The device data 266 also includes codebooks 268 and APD information 270 for APDs 180 associated with the base station 120. The codebooks 268 may include any suitable type or combination of codebooks, including surface-configuration codebooks that store surface-configuration information for a RIS of an APD and beam sweeping codebooks that store patterns, sequences, or timing information for implementing multiple surface configurations useful to direct an APD to perform a variety of directional reflecting. In some aspects, the surface-configuration codebooks and beam sweeping codebooks include phase vector information, angular information (e.g., calibrated to respective phase vectors), timing/synchronization information, and/or beam reflection configuration information. The APD information 270 can include respective identifiers, capabilities, command and control information, locations, orientations (e.g., static or last known) for the APDs 180 with which the base station 120 communicates. The base station 120 may generate or revise the APD information 270 to add new APDs 180 that are detected, update information of known APDs 180, or delete existing ADPs 180 that are deprecated.

In aspects, the CRM 264 includes an APD-enabled position function (APF) 272 that manages or implements aspects of determining a position of user equipment by using APDs. Alternatively or additionally, the APF 272 may be implemented in whole or part as hardware logic or circuitry integrated with or separate from other components of the base station 120. Generally, the APF 272 may quickly compute or determine positions of one or more user equipment with a high level of accuracy using multiple APDs 180 (e.g., at least two APDs). In aspects, the APF 272 of the base station 120 manages usage of the APDs 180 to direct or steer reflections of wireless signals (e.g., signal ray or beams) toward one or more user equipment. To manage the usage of the APDs 180, the APF 272 can identify APDs 180 near a UE 110, determine surface configurations for the APDs 180 (e.g., RIS configurations), or select beam sweeping directions or patterns for the APDs 180, such as to steer or direct reflections of downlink wireless signals (e.g., BS-originated reference signals) toward the UE 110. Based on an analysis of identifiers of the reflections (e.g., BS- and/or APD-modulated beam IDs) and/or signal quality parameters for the reflections reaching the UE 110, the APF 272 can determine which surface configurations (e.g., phase vectors) are associated with those reflections received by the UE 110. The surface configurations may be calibrated or predetermined to correspond to respective angles of reflection, which the APF 272 uses to determine angular information for the reflections of the wireless signals received by the UE 110. Alternatively or additionally, the APF 272 can use the signal quality parameters, such as reference signal received power (RSRP) of the reflections, in the determination of the angular information for an APD 180 or to estimate distance between the APD 180 and the UE 110. Using the angular information and known position of multiple APDs 180, and optionally non-APD-based position information, the APF 272 triangulates and/or trilaterates a position of the UE 110. This is but one example of determining a position of a UE by using APDs that the APF 272 or base station 120 can implement, others of which are described throughout this disclosure.

The CRM 264 also includes a base station manager 274 for managing various functionalities and communication interfaces of the base stations 120. Alternatively or additionally, the base station manager 274 may be implemented in whole or part as hardware logic or circuitry integrated with or separate from other components of the base stations 120. In at least some aspects, the base station manager 274 configures the antennas 252, RF front end 254, LTE transceivers 256, 5G NR transceivers 258, and 6G transceiver 260 for communication with the UE 110, the APDs 180, and/or communication with a core network. The base stations 120 include an inter-base station interface 276, such as an Xn and/or X2 interface, which the base station manager 274 configures to exchange user-plane and control-plane data between another base station 120, to manage the communication of the base stations 120 with the UE 110. The base stations 120 also include a core network interface (not shown) that the base station manager 274 configures to exchange user-plane data and control-plane information with core network functions and/or entities.

Figure 3:
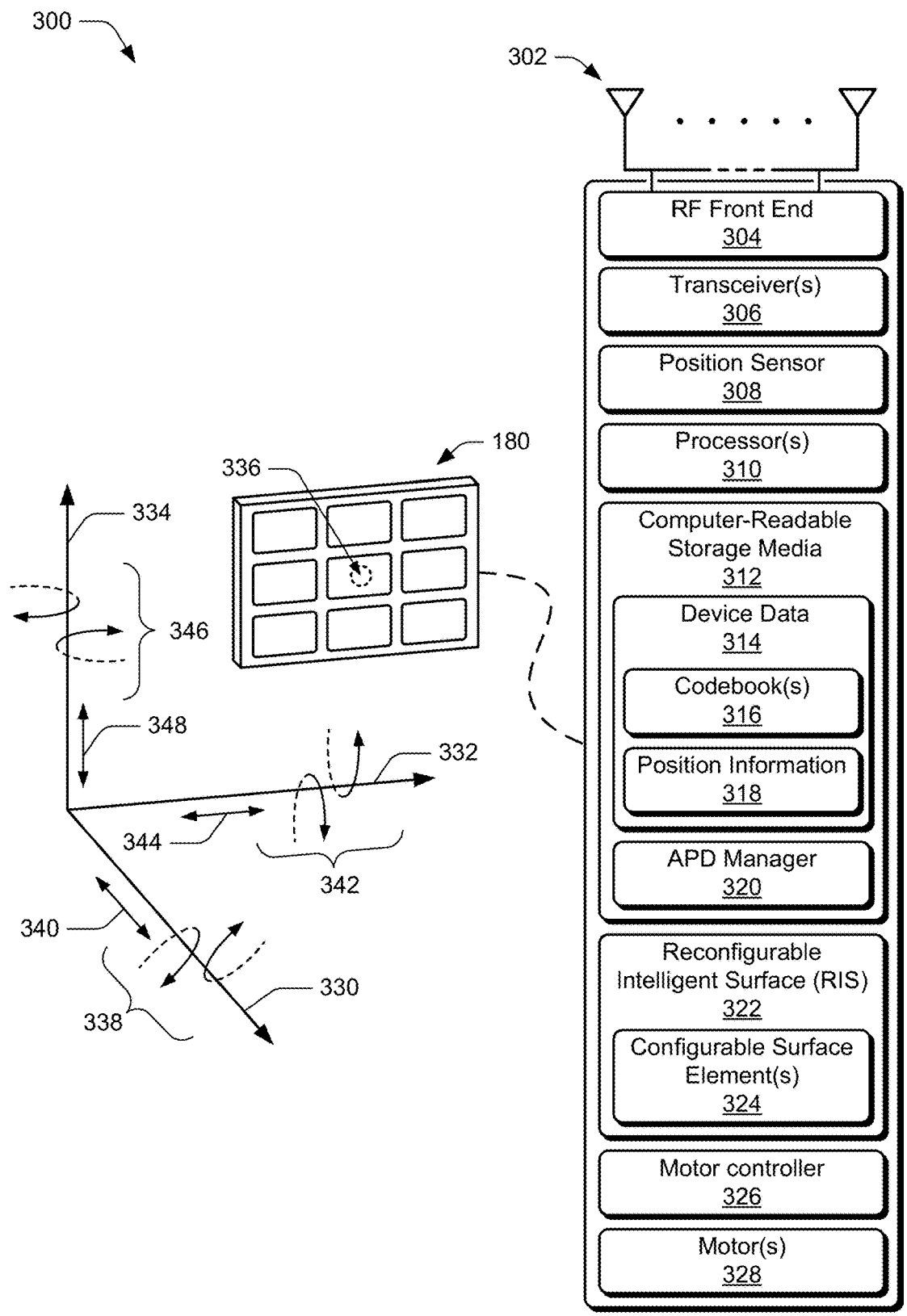
FIG. 3 illustrates an example device diagram of an adaptive phase-changing device that can be used to determine a position of user equipment in accordance with one or more aspects.

FIG. 3 illustrates an example device diagram 300 of the APD 180. Generally, the device diagram 300 describes an example entity that can be used to determine a position of user equipment in accordance with one or more aspects. The example APD 180 described with reference to FIG. 3 may include additional functions and interfaces that are omitted from the device diagram 300 for the sake of visual brevity.

The adaptive phase-changing device (APD) 180 is an apparatus that includes a Reconfigurable Intelligent Surface (RIS) 322, and components for controlling the RIS 322 (e.g., by modifying the surface configuration of the RIS), as further described below. In some implementations, the APD 180 may also include components for modifying the position (or location) of the APD 180 itself, which in turn modifies the position of the RIS 318. The APD 180 includes one or more antenna(s) 302, a radio frequency front end 304 (RF front end 304), and one or more radio-frequency transceivers 306 for wirelessly communicating with the base stations 120 and/or the UE 110. The APD 180 can also include a position sensor, such as a GNSS module, that provides position information based on a location of the APD 180.

The antenna(s) 302 of the APD 180 may include an array of multiple antennas that are configured similar to or differently from each other. Additionally, the antennas 302, the RF front end 304, and the transceiver(s) 306 may be configured to support beamforming for the transmission and reception of communications with the base stations 120. By way of example and not limitation, the antennas 302 and the RF front end 304 can be implemented for operation in sub-gigahertz bands, sub-6 GHz bands, and/or above 6 GHz bands. Thus, the antenna 302, the RF front end 304, and the transceiver(s) 306 provide the APD 180 with an ability to receive and/or transmit communications with the base station 120, such as information transmitted using APD-control-channels (e.g., an APD-slow-control channel or APD-fast-control channel) as further described.

The APD 180 includes processor(s) 310 and computer-readable storage media 312 (CRM 312). The processor 310 may be a single core processor or a multiple core processor implemented with a homogenous or heterogeneous core structure. The computer-readable storage media described herein excludes propagating signals. CRM 312 may include any suitable memory or storage device such as RAM, SRAM, DRAM, NVRAM, ROM, or Flash memory useable to store device data 314 of the APD 180. The device data 314 includes user data, multimedia data, applications, and/or an operating system of the APD 180, which are executable by processor(s) 310 to enable dynamic configuration of the APD 180 as further described. The device data 314 also includes one or more codebooks 316 of any suitable type or combination, and position information 318 of the APD 180. The position information 318 may be obtained or configured using the position sensor 308 or programmed into the APD 180, such as during installation. The position information 318 indicates a position of the APD 180 and may include a location, geographic coordinates, orientation, elevation information, or the like. A base station 120 or APF 272 can use the position information 318 in computing angular or distance information, such as between the base station 120 and APD 180 and/or between the APD 180 and a UE 110 of interest. The codebooks 316 can include surface-configuration codebooks that store surface-configuration information for a RIS of an APD and beam sweeping codebooks that store patterns, sequences, or timing information (e.g., phase vectors and reflection identifiers) for implementing multiple surface configurations useful to direct an APD to perform a variety of directional reflecting of incident wireless signals. In some aspects, the surface-configuration codebooks and beam sweeping codebooks include phase vector information, angular information (e.g., calibrated to respective phase vectors), and/or beam configuration information.

In aspects of determining a user equipment's position by using APDs, the CRM 312 of the APD 180 includes an adaptive phase-changing device manager 320 (APD manager 320). Alternatively or additionally, the APD manager 320 may be implemented in whole or part as hardware logic or circuitry integrated with or separate from other components of the APD 180. Generally, the APD manager 320 manages a surface configuration of the APD 180, such as by processing information exchanged with a base station over wireless link(s) 133, and using the information to configure a reconfigurable intelligent surface 322 (RIS 322) of the APD 180. To illustrate, the APD manager 320 receives an indication of a surface configuration over the wireless links 133 (an APD control channel), extracts the surface configuration from the codebooks 316 using the indication, and applies the surface configuration to the RIS 322. Alternatively or additionally, the APD manager 320 initiates the transmission of uplink messages to the base station over the wireless links 133, such as acknowledgements/negative acknowledgements (ACKs/NACKs) for various APD configuration or management commands. In some aspects, the APD manager 320 receives an indication of a beam sweeping pattern (e.g., beam sweeping pattern index) over the wireless links 133, and applies a sequence of various surface configurations to the RIS based on the beam sweeping pattern and/or in accordance with a synchronization or pattern timing indicated by or received with the indication. Optionally, the beam sweeping pattern may include reflection identifier information by which the APD 180 modulates or applies (e.g., using the RIS) one or more reflection identifiers to a downlink signal or reference signal reflected by the APD 180.

The RIS 322 of the APD 180 includes one or more configurable surface element(s) 324, such as configurable electromagnetic elements, configurable resonator elements, or configurable reflectarray antenna elements. Generally, the configurable surface elements 324 can be selectively or programmatically configured to control how the RIS 322 reflects (e.g., directionality) and/or transforms incident waveforms. By way of example and not of limitation, configurable electromagnetic elements include scattering particles that are connected electronically (e.g., through PIN diodes). Implementations use the electronic connection to arrange the scattering particles, such as based on principles of reflection, to control a directionality, phase, amplitude, and/or polarization of the transformed waveform (from the incident waveform). The RIS 322 can include array(s) of configurable surface element(s) 324, where an array can include any number of elements having any size.

In some aspects, a position and/or orientation of the APD 180 is configurable, and the APD 180 includes a motor controller 326 communicating with one or more motor(s) 328 that are operably coupled with a physical chassis of the APD 180. Based on command and control information, such as received from a base station 120, the motor controller 326 can send commands to the motors 328 that alter one or more kinematic behaviors of the motors 328, which may include any suitable type of stepper motor or servo. For example, the motor controller 326 may issue commands or control signals that specify a shaft rotation of a stepper motor in degrees, a shaft rotation rate of a stepper motor in revolutions per minute (RPM), a linear movement of a linear motor millimeters (mm), a linear velocity of a linear motor in meters/second (m/s)). The one or more motors 328 may, in turn, may be linked to mechanisms that mechanically position the physical chassis or a platform (e.g., avionics of a drone, a drive of a linear rail system, a gimble within a base station, a linear bearing within a base station) supporting the APD 180. Through the commands and signals that the motor controller 326 generates and sends sent to the motors 328, a physical position, location, or orientation of the APD 180 (and/or the platform supporting the APD 180) may be altered. In response to receiving a position configuration from a base station, the APD manager 320 communicates movement commands to the motor controller 326, such as through a software interface and/or hardware addresses, based on the position configuration. In aspects of using APDs to determine a position of user equipment, a base station 120 may reposition or reorient one or more APDs 180 to improve or enable wireless signal reflections to be directed to the user equipment.

Generally, the APD 180 can include multiple motors, where each motor corresponds to a different rotational or linear direction of movement. Examples of motor(s) 328 that can be used to control orientation and location of the APD include, linear servo motors that might be part of a (i) rail system mounting for the APD, (ii) motors controlling a direction and pitch, yaw, roll of a drone carrying the APD, (iii) radial servo or stepper motors that rotate an axis if the APD is in a fixed position or on a gimbal, and so on. For clarity, the motor controller 326 and the motors 328 are illustrated as being a part of the APD 180, but in alternative or additional implementations, the APD 180 communicates with motor controllers and/or motors external to the APD. To illustrate, the APD manager 320 communicates a position configuration to a motor controller that mechanically positions a platform or chassis that supports the APD 180. In aspects, the APD manager 320 communicates the position configuration to the motor controller using a local wireless link, such as Bluetooth™, Zigbee, IEEE 802.15.4, or a hardwire link. The motor controller then adjusts the platform based on the position configuration using of one or more motors. The platform can correspond to, or be attached to, any suitable mechanism that supports rotational and/or linear adjustments, such as a drone, a rail propulsion system, a hydraulic lift system, and so forth.

As shown in FIG. 3, a position of the APD 180 may be defined with respect to a three dimensional coordinate system in which an X-axis 330, Y-axis 332, and Z-axis 334 define a spatial area and provide a framework for indicating a position configuration through rotational and/or linear adjustments. While these axes are generally labeled as the X-axis, Y-axis, and Z-axis, other frameworks can be utilized to indicate the position configuration. To illustrate, aeronautical frameworks reference the axes as vertical (yaw), lateral (pitch), and longitudinal (roll) axes, while other movement frameworks reference the axes as vertical, sagittal, and frontal axes. As one example, position 336 generally points to a center position of the APD 180 that corresponds to a baseline position (e.g., position (0,0,0) using XYZ coordinates).

In aspects, the APD manager 320 communicates a rotational adjustment (e.g., rotational adjustments 338) around the X-axis 330 to the motor controller 326, where the rotational adjustment includes a rotational direction (e.g., clockwise or counterclockwise), an amount of rotation (e.g., degrees), and/or a rotation velocity. Alternatively or additionally, the APD manager 320 communicates a linear adjustment 340 along the X-axis, where the linear adjustment includes any combination of a direction, a velocity, and/or a distance of the adjustment. At times, the APD manager 320 communicates adjustments around the other axes as well, such as any combination of rotational adjustments 342 around the Y-axis 332, linear adjustments 344 along the Y-axis 332, rotational adjustments 346 around the Z-axis 334, and/or linear adjustments 348 along the Z-axis 334. Thus, the position configuration can include combinations of rotational and/or linear adjustments in all three degrees of spatial freedom. This allows the APD manager 320 to communicate physical adjustments to the APD 180. Alternatively or additionally, the APD manager communicates RIS surface configurations as further described.

Determining a Position of UE by Using APDs

To address inaccuracy and latency issues of pre-existing techniques for determining positions of user equipment, such as those associated with multipath effects and network-based communication, various aspects of determining a position of user equipment by using APDs enable a base station to determine a position of one or more user equipment based on reflections of wireless signals. By so doing, the base station can accurately and quickly determine the position of the user equipment with low-latency, high-frequency signals (e.g., mmWave signals) with reduced multipath effects. Additionally, by using multiple adaptive phase-changing devices, a base station may determine the position of the user equipment without involvement of other network entities (e.g., other base stations), thereby reducing complexity, latency, and network overhead associated with determining user equipment positions.

FIGS. 4A through 8B illustrate some examples of a base station using adaptive phase-changing devices to communicate with a user equipment in accordance with one or more aspects. The described examples include using an APD to reflect wireless signal rays to a UE (e.g., FIGS. 4A and 4B), modulating various beam identifiers onto wireless signals and reflections of the wireless signals to provide reflection identifiers (e.g., FIGS. 5A and 5B), beam sweeping signal ray reflections with an APD (e.g., FIGS. 6A and 6B), determining a position of a UE using multiple APDs (e.g., FIG. 7), and using APDs to determine respective positions of multiple UEs (e.g., FIGS. 8A and 8B). Aspects described with reference to one example may be combined with others to implement operations for determining a position of user equipment (UE-position) by using adaptive phase-changing devices in various ways or scenarios. For example, a base station may control or manage the APDs to implement horizontal or vertical beam sweeping in refining or determining a position of one or more user equipment. The examples are illustrated in the context of various combinations of entities, communications, and scenarios, which may be separated or combined differently than shown to implement various aspects of determining user equipment's position using adaptive phase-changing devices.

Figure 4A:
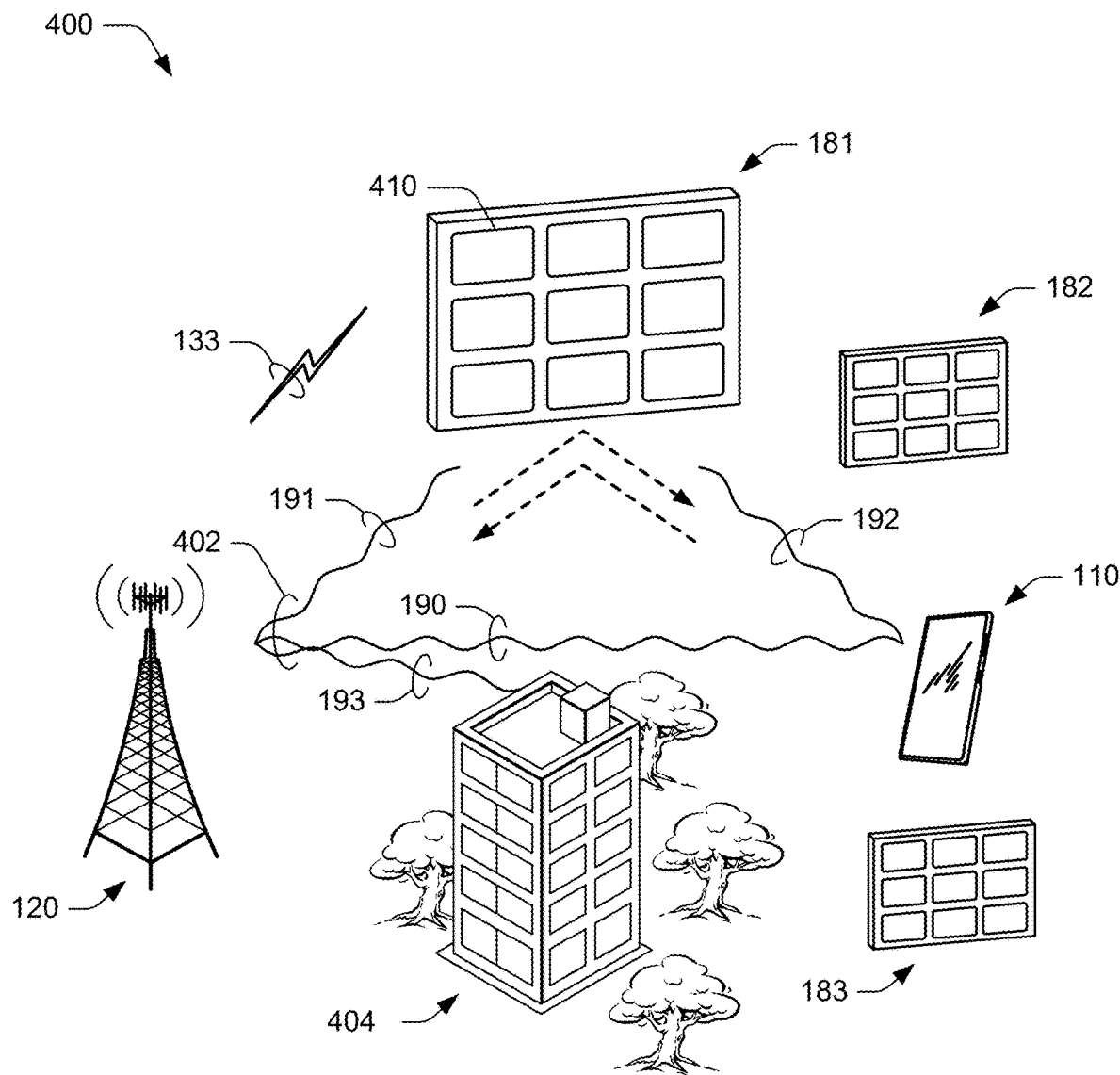
FIGS. 4A and 4B illustrate an example of a base station using an adaptive phase-changing device to communicate with a user equipment in accordance with one or more aspects.
Figure 4B:
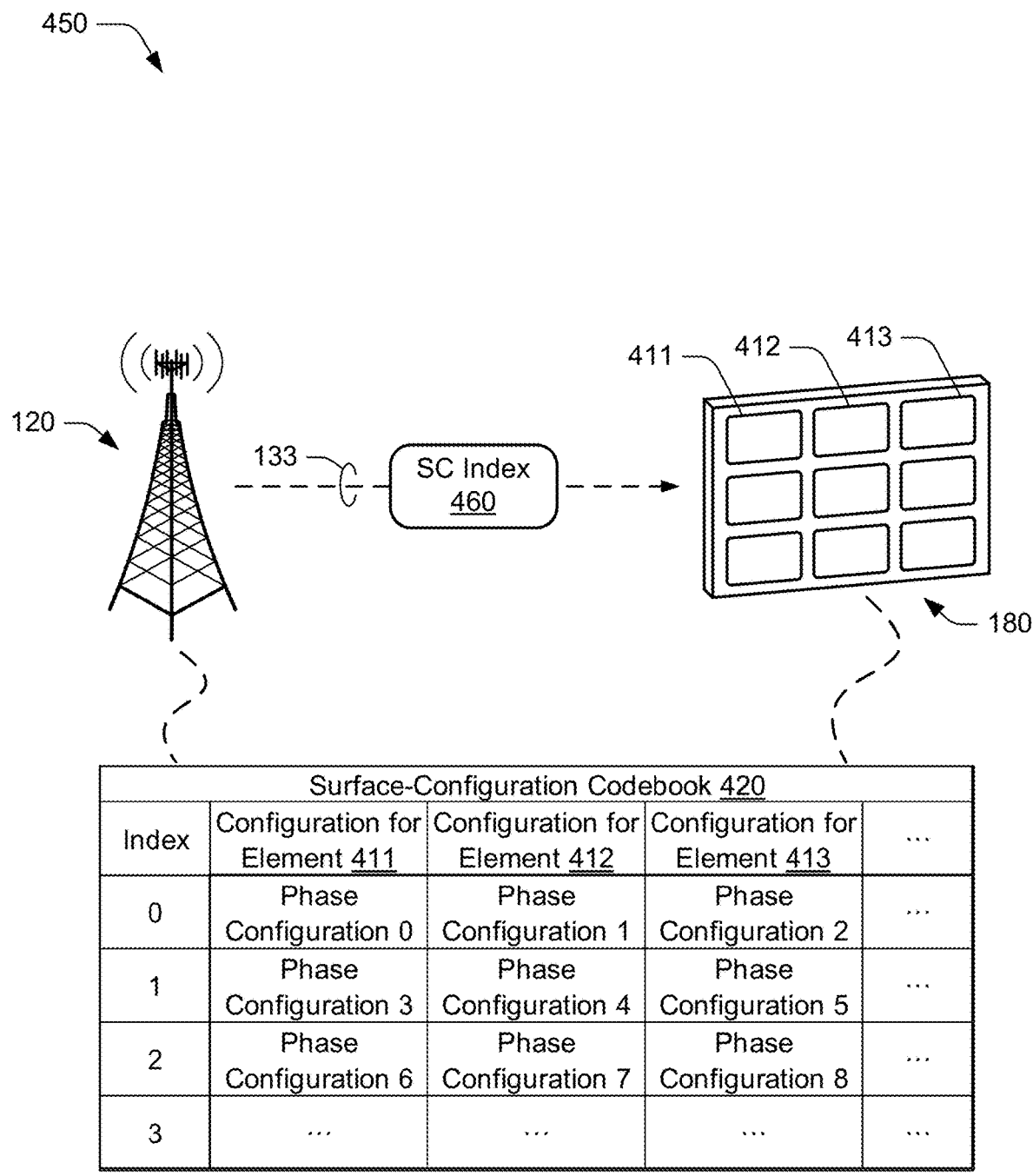

FIGS. 4A and 4B illustrate examples of a base station using an adaptive phase-changing device to communicate with a user equipment in accordance with one or more aspects. With reference to FIG. 4A, an example 400 shows a base station 120 using an APD 180 (e.g., APD 181) to direct or steer a reflection of a wireless signal to a user equipment 110. The example 400 includes the base station 120, the UE 110, and multiple instances of the generic APD 180 of FIG. 1, which are illustrated as APDs 181, 182, 183. FIG. 4B illustrates an example 450 of configuring an APD 180 in accordance with one or more aspects. The APDs 181, 182, 183 may be selected as a subset of APDs from a larger set of APDs 180 deployed within communication range of the base station 120. Thus, the base station 120 may select or configure any of the APDs 181, 182, 183, or other APDs 180 within range for use in communicating with the UE 110 (or other UEs). Alternatively or additionally, the operations described with reference to FIGS. 4A and 4B may be used to implement various aspects of determining a position of user equipment, such as those described with reference to FIGS. 5A through 12B or methods of FIGS. 13 through 16.

Generally, the base station 120 communicates with the UE 110 over the wireless link 131 (see FIG. 1) by transmitting a downlink wireless signal 402 that covers a spatial region determined by a transmitting antenna radiation pattern (e.g., narrow beam or broad beam). Alternatively or additionally, the base station 120 may transmit a reference signal or position reference signal (e.g., independent of an active wireless link) toward the APD 181 and/or the UE 110 to implement aspects of using APDs to determine a position of user equipment. To illustrate, the wireless signal 402 transmitted by the base station 120 includes the signal ray 190 that propagates toward the UE 110 in a LoS manner, the signal ray 191 that propagates toward the APD 181, and the signal ray 193 that propagates toward obstructions 404 (illustrated as structures and foliage) that block the signal ray 193 from reaching the UE 110. To implement various aspects of determining a position of user equipment by using APDs, the base station 120 generally transmits a wireless signal 402 with a direct signal ray (e.g., signal ray 191) propagating toward the APD 180 and optionally with direct signal rays (e.g., signal ray 190) propagating toward the UE 110. In alternative or additional implementations, the base station 120 may transmit a wireless signal in a direction toward the UE 110 such that the wireless signal 402 includes a direct signal ray (e.g., signal ray 190) that propagates directly toward the UE 110 and optionally with direct signal rays (e.g., signal ray 191) propagating toward the APD 181. In aspects, the base station 120 transmits wireless signals to the APDs 180 in a high-frequency band that is at or above 6 GHz, such that signal rays 190 and/or 193 may be blocked by obstructions (e.g., temporary LoS obstructions of signal ray 190, not shown). Individual signal rays 190, 191, 193 of the wireless signal 402 may be transmitted simultaneously (e.g., broad beam) or at different times (e.g., narrow beams). Alternatively or additionally, the UE 110 communicates with the base station 120 by transmitting an uplink wireless signal over the wireless link 131 or another wireless connection with the base station 120 (e.g., a low-frequency anchor connection below 6 GHZ). In the context of FIG. 4A, various implementations of wireless communication between the base station 120 and the UE 110 are described with reference to the APD 181 and may be implemented similarly or differently with the APD 182 and 183, or any other APD 180 within transmit range of the base station 120.

In various implementations, the APD 181 (or other APDs) participate in the uplink, downlink, and/or position-determining related communications (e.g., reference signals) between the base station 120 and the UE 110 by transforming (e.g., reflecting) waveforms using an RIS of the APD 181 with a surface configuration determined by the base station 120. To illustrate, the signal ray 191 strikes the surface of the APD 181, shown as a reconfigurable intelligent surface 410 (RIS 410), and transforms into the signal ray 192, which is directed toward the UE 110. As part of receiving the wireless signal 402, the UE 110 may receive the signal ray 190 and the signal ray 192 (but not the signal ray 193). In implementations, the base station 120 configures the RIS 410 to direct how the signal ray 191 transforms into the signal ray 192 and reflects from the APD 181 for downlink and/or reference signal (e.g., positioning reference signal (PRS)) communications. Alternatively or additionally, for uplink communications, the base station 120 directs how the RIS 410 transforms an incident signal ray from the UE 110 on a path similar to signal ray 192 into another signal ray that follows a path similar to that of signal ray 191 to the base station 120.

In aspects of determining a position of user equipment by using APDs, a base station 120 or an APF 272 associated with a base station 120 may selectively determine to use and configure multiple APDs 180 to communicate downlink or reference signals (e.g., positioning referencing signals (PRS)) with one or more UEs 110. For example, based on an initial estimated position of the UE 110, the base station 120 may select a subset of APDs 180 located within a first radius (e.g., first threshold distance) of the base station 120 and also located within a second radius (e.g., second threshold distance) of the UE 110. The two radius distances may be the same or different. For example, the base station 120 may estimate an initial position of the UE 110 based on a GNSS-based position reported by the UE 110, an angle-of-arrival of a UE uplink signal, an RSRP of a UE uplink signal, or the like. As such, various link quality parameters can be used by the base station 120 to obtain or determine an initial estimated UE-location, such as through power levels, angles of departure or arrival, and/or timing information (e.g., observed time of arrival) of uplink or downlink communications with the UE 110. These link quality parameters may be determined or obtained by the base station 120 through an anchor connection (e.g., wireless link 131 or 132) in a low-band channel (e.g., a channel below 6 GHz, such as, but not limited to, a 700 MHz channel, 800 MHZ channel, or 900 MHz channel). Using this general location information, the base station 120 may identify APDs that are within the geographic overlap of (1) a first circle centered at the base station 120 with a first radius equal to 110% of the estimated distance between the BS 120 and the UE 110 and (2) a second circle centered at an estimated location for the UE with a second radius equal to 80% of the estimated distance between the BS 120 and the UE 110. Of course, these percentages for determining radii may differ and change based on deployment terrain for a BS 120, a history of positioning success for a UE near the estimated location, the metrics used for the initial estimated UE-location, and other factors. Alternatively or additionally, the base station 120 can use the estimated UE-location to access historical data records that indicate a history of successful APD-enabled communication (e.g., which APDs 180 and respective RIS configurations) with UEs 110 proximate the estimated UE-location.

In response to estimating an approximate UE-location (e.g., within 3-10 meters of accuracy), the base station 120 selects and configures multiple APDs 180 for determining a position of the UE 110 with increased precision. In the context of the present example, the base station 120 or APF 272 selects a surface configuration for the RIS 410 of the APD 181 that transforms at least a portion of a wireless signal (e.g., signal ray 191) into a reflection (e.g., signal ray 192) that is reflected toward the UE 110. In aspects, the base station 120 modulates a base station beam identifier (e.g., BS beam ID) onto the wireless signal (e.g., signal ray 191), which the reflection (e.g., signal ray 192) conveys to the UE 110 as an identifier of the reflection or reflection identifier. Generally, the beam identifier (e.g., BS beam ID) that the base station 120 modulates onto the wireless signal may correspond with or be useful as the identifier of the reflection of the wireless signal that reaches the UE 110. In other aspects, the base station 120 transmits a broad beam including signal rays 190, 191, and 193 without a BS beam ID. The APD 181 may also modulate, as at least part of a reflection identifier, an APD beam ID or reflected beam ID onto ray 191 to produce signal ray 192 with the reflection identifier. At the UE, a received ray 192 with the reflection identifier may be compared to or differentiated from a received LoS ray 190 of the broad beam that does not include a reflection identifier or carries only a BS-modulated beam identifier. And still other aspects, an identifier of a reflection of a wireless signal reaching the UE 110 may include or indicate both a BS beam ID modulated on the wireless signal by the base station 120 and an APD beam ID modulated on the reflection of the wireless signal by an APD 180 (e.g., a combined or layered reflection identifier).

In aspects, the UE 110 decodes the identifier (e.g., BS beam ID and/or APD reflection ID) received with the reflection of the wireless signal (e.g., signal ray 192). The UE may also obtain or determine signal quality parameters indicative of a quality or strength of the reflection of the wireless signal. In other aspects, the UE 110 receives the LoS signal ray 190 with an identifier containing only the BS beam ID and the reflected signal ray 192 with an identifier containing both the BS beam ID and the APD reflection ID. To enable the base station 120 to determine angular information related to the APDs, the UE 110 provides the identifier of reflections of the wireless signals and/or identifier of directly received wireless signals to the base station 120 via a wireless connection, such as the anchor connection (e.g., wireless link 133) between the base station 120 and the UE 110. Generally, the UE 110 may report to the base station 120 identifiers of received reflections and/or non-reflected wireless signals (e.g., direct or LoS signal rays), and optionally respective signal quality parameters for any received reference signal or reflection of the reference signal (e.g., 190 and 192).

Based on the UE 110 feedback (e.g., reflection information) of the reflection identifier and/or signal quality parameter of the reflection of the wireless signal (e.g., signal ray 192 or reflection from APD 181), the base station can determine angular information for the reflected wireless signal reaching the UE 110. The reflection identifier may indicate this angular information (e.g., a specific phase vector), which may include an angle of reflection of the wireless signal from the APD 181 and an angle of incidence at which the wave form of the wireless signal reaches the UE 110. In aspects, the various configurations of the surface of the APD 181 (e.g., RIS 410) may be calibrated such that specific or reference angular information is associated with a surface configuration (e.g., a respective phase vector), which enables the base station 120 to determine angular information relating to signals transmitted to the APD 181, signals reflected by the APD 181, and/or signals reaching the UE 110. Leveraging this angular information and other signal quality parameters, such as reference signal received power, the base station 120 can compute angular information regarding a direction and/or estimated distance of the UE 110 from the APD 181. In aspects, similar operations and computations are performed using multiple APDs 180 (e.g., at least two APDs) and combined to provide angular information that enables the base station 120 to quickly and accurately determine the position of the UE 110 (e.g., within centimeters). This is but one example of using APDs to determine a position of user equipment, others of which are described throughout this disclosure.

To enable various implementations of determining a position of user equipment by using APDs, the base station 120 configures the RIS 410 such that the APD 180 transforms and/or reflects a wireless signal (e.g., signal ray 191) to direct or steer a reflection of the wireless signal (e.g., signal ray 192) toward the UE 110 of interest. In aspects, the base station 120 selects the surface configuration from a surface-configuration codebook. As one example, the base station 120 analyzes the codebook to identify a surface configuration that modifies and/or transforms various signal characteristics of an incident wireless signal, such as modifying one or more desired directionality, phase characteristic(s), one or more amplitude characteristic(s), a polarization characteristic, modulating APD reflected beam identifiers onto the incident wireless signal, and so forth. In some implementations, the base station 120 uses calibrated angular information or historical data records to select a surface configuration. For instance, the base station obtains an estimated UE-location and the UE's current link quality parameters and accesses calibrated angular information using the estimated UE-location, where the historical data records include surface configurations that have previously resulted in wireless signals (e.g., reference signals) reaching UEs 110 at the estimated UE-location.

By way of example, consider FIG. 4B which illustrates an example 450 of configuring an APD 180 in accordance with one or more aspects. The example 450 includes instances of a base station 120 and an APD 180, which may be implemented similarly as described with reference to FIGS. 1 through 3. The RIS implemented by the APD 180 includes an array of "N" configurable surface elements, such as configurable surface element 411, configurable surface element 412, configurable surface element 413, and so forth, where "N" represents the number of configurable surface elements of the RIS.

In implementations, the base station 120 manages a configuration of the RIS 410 of the APD 180 through use of a surface-configuration codebook 420, which can be pre-configured and/or known by both the base station 120 and the APD 180. Alternatively or additionally, the base station 120 may also manage a time-varying configuration of the RIS of the APD 180 through use of a beam sweeping codebook, such as described with reference to FIGS. 6A, 6B, 11, and 15. In some cases, the base station 120 transmits a surface-configuration codebook 420 and/or a beam sweeping codebook using the wireless link 133, such as over an APD-slow-control channel using one or more messages. In aspects, the base station 120 uses the APD-slow-control channel to communicate large quantities of data, to communicate data without low-latency requirements, and/or to communicate data without timing requirements. At times, the base station 120 transmits multiple surface-configuration codebooks to the APD 180, such as a first surface-configuration codebook for downlink communications, a second surface-configuration codebook for uplink communications, a phase vector codebook, a beam sweeping codebook, or the like. In response, the APD 180 stores the surface-configuration codebook(s) 420 and/or other codebooks in CRM, which is representative of codebook(s) 316 in CRM 312 as described with reference to FIG. 3. Alternatively or additionally, the APD 180 obtains the surface-configuration and other codebooks through manufacturing (e.g., programming), calibration, or installation processes that store the surface-configuration codebook(s) 420 and other codebooks in the CRM 312 of the APD 180 during assembly, installation, calibration, verification, or through an operator manually adding or updating the codebook(s).

The surface-configuration codebook 420 includes configuration information that specifies a surface configuration for some or all of the configurable surface elements (e.g., elements 324) forming the RIS of the APD 180. As one example, each index of the codebook corresponds to a phase vector with configuration information for each configurable surface element of the APD 180. Index 0, for instance, maps phase configuration 0 to configurable surface element 411, phase configuration 1 to configurable surface element 412, phase configuration 2 to configurable surface element 413, and so forth. Similarly, index 1 maps phase configuration 3 to configurable surface element 411, phase configuration 4 to configurable surface element 412, phase configuration 5 to configurable surface element 413, and so forth. The surface-configuration codebook 420 can include any number of phase vectors that specify configurations for any number of configurable surface elements such that a first phase vector corresponds to a first surface configuration for the APD 180 (by way of configurations for each configurable surface element in the RIS), a second phase vector corresponds to a second surface configuration for the APD 180, etc. In aspects, one or more surface configurations or phase vectors may be mapped or calibrated to specific angle information of incident and/or reflected wireless signals (e.g., reference signals), signal rays, beam swept transmissions of the base station 120, or the like. In various implementations, the base station 120 may use this angle information corresponding to the surface configuration or phase vector to determine the angular information used for computing the position of the UE 110.

While the surface-configuration codebook 420 of FIG. 4B includes phase vector information, alternative or additional codebooks store beam configuration information, such as a first surface configuration that specifies a first beam with a first (propagation) direction, a second surface configuration that specifies a second beam with a second direction, etc. Thus, in various implementations, the surface-configuration codebook 420 corresponds to a beam-codebook, which may enable the APD 180 to implement directional reflecting or reflective steering of incident wireless signals. Similarly, to configure the surface of the APD 180, the base station determines the desired beam configuration for the transformed signal and identifies an entry in the beam-codebook corresponding to the desired beam configuration. In some aspects, a beam-sweeping codebook indicates a pattern of surface configurations and/or beam configurations, such as surface configurations and/or beam configurations, as indicated by the surface-configuration codebook 420 and beam configurations specified by the beam-codebook. To illustrate, the beam-sweeping codebook indicates an order of surface configurations and optionally APD reflected beam identifiers to cycle through in order to beam sweep in a horizontal direction or vertical direction. Alternatively or additionally, the beam-sweeping codebook indicates a time duration for applying each surface configuration effective to steer a reflected beam or wireless signal in a specific direction for the duration of time.

The surface-configuration information stored in a codebook can correspond to a full configuration that specifies an exact configuration (e.g., configure with this value), or a delta configuration that specifies a relative configuration (e.g., modify a current state by this value). In one or more implementations, the phase configuration information specifies a directional increment and/or angular adjustment between an incident signal and a transformed signal. For instance, the phase configuration 0 can specify an angular adjustment configuration for element 411 such that the configurable surface element 411 reflects the incident waveform with a "phase configuration 0" relative angular or directional shift. As shown in FIG. 4B, the base station 120 communicates an indication to the APD 180 that specifies a surface configuration. In the present example, the indication specifies a surface configuration index 460 (SC index 460) that maps to a corresponding surface configuration of the APD 180. In response to receiving the indication, the APD manager 320 retrieves the surface configuration from the surface-configuration codebook 420 using the index and applies the surface configuration to the RIS. For example, the APD manager 320 configures each configurable surface element as specified by a respective entry in the surface-configuration codebook 420.

In various implementations, the base station 120 communicates timing information (not shown) to the APD 180, which may be included with a surface configuration or beam sweeping index. For instance, the base station 120 sometimes indicates, to the APD 180 and using the wireless link 133, a start time for the application of an indicated surface configuration or beam sweeping pattern. In aspects, the base station 120 communicates a transition time that indicates when to remove and/or change the surface configuration or beam sweeping pattern. In changing the surface configuration, the APD 180, by way of the APD manager 320, can apply a default surface configuration, return to a previous surface configuration (e.g., a surface configuration used prior to the indicated surface configuration), and/or apply a new surface configuration to control a direction in which the APD 180 reflects wireless signals. To maintain synchronized timing with the base station 120, the APD 180 receives and/or processes a base station synchronizing signal.

By specifying the timing information, the base station 120 can synchronize and/or configure the APD 180 to a particular UE (e.g., UE 110) for position-determining operations even when the UE is moving. For example, the base station 120 configures the APD 180 with a revised beam sweeping pattern to track the particular UE by specifying start and stop times that correspond to a time slot assigned to the particular UE. In aspects, the base station 120 transmits surface-configuration indications and/or timing information using an APD-fast-control channel, which allows the base station 120 to dynamically configure the APD 180 on a slot-by-slot basis. For example, the base station 120 transmits a surface-configuration schedule to the APD that indicates when to apply different surface configurations to the RIS/configurable surface elements. Alternatively or additionally, the base station 120 communicates surface configuration changes on a slot-by-slot basis using signaling on the APD fast-control channel. These allow the base station to configure the APD for multiple UEs, such as in scenarios where different UEs are assigned different time slots or different numerologies, and enable concurrent determination of respective positions of multiple UEs, improve data rates, spectral efficiency, data throughput, and reliability for the multiple UEs and the corresponding wireless network.

Figure 5A:
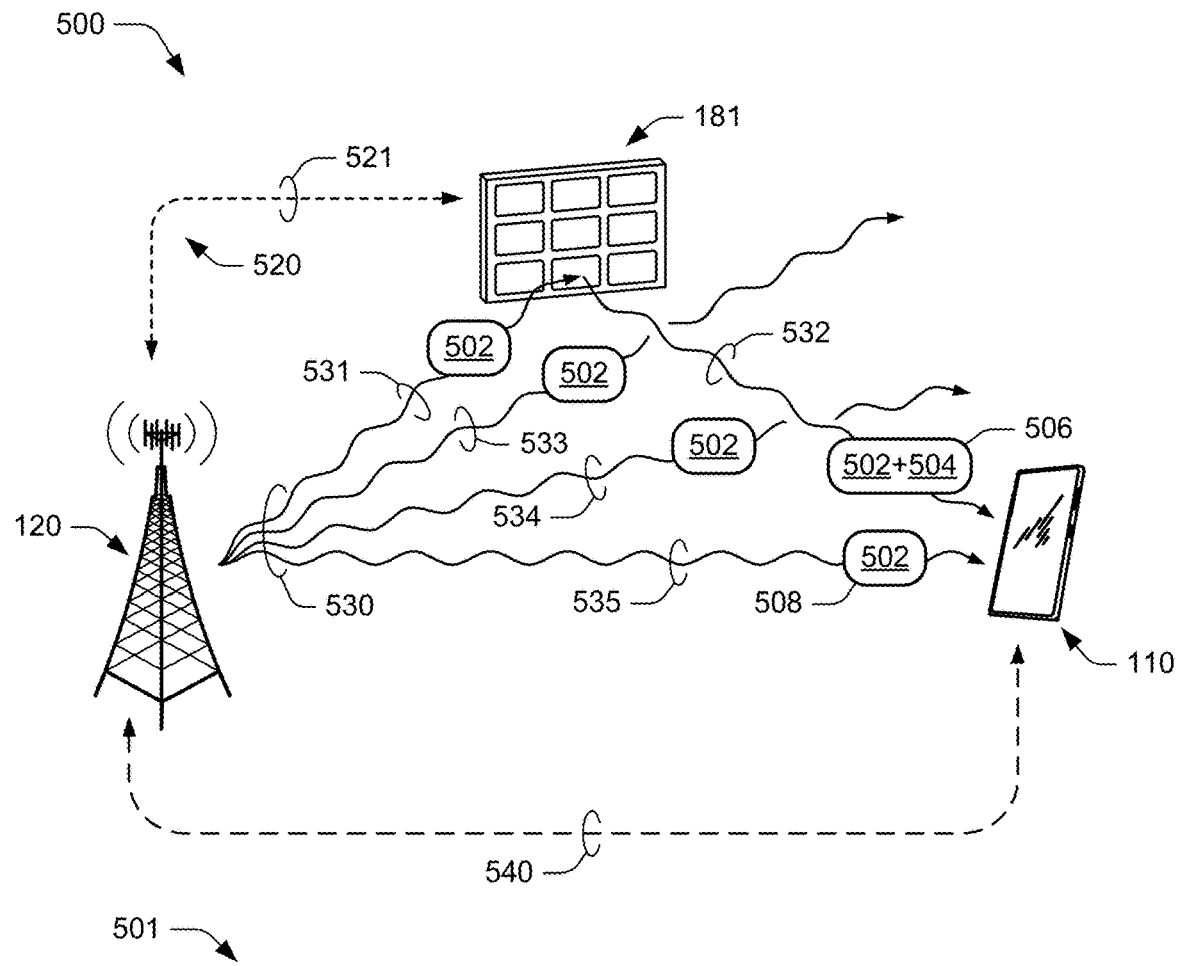
FIGS. 5A and 5B illustrate respective examples of a base station using an adaptive phase-changing device to reflect a wide beam transmission or narrow beam transmissions to a user equipment using in accordance with one or more aspects.
Figure 5B:
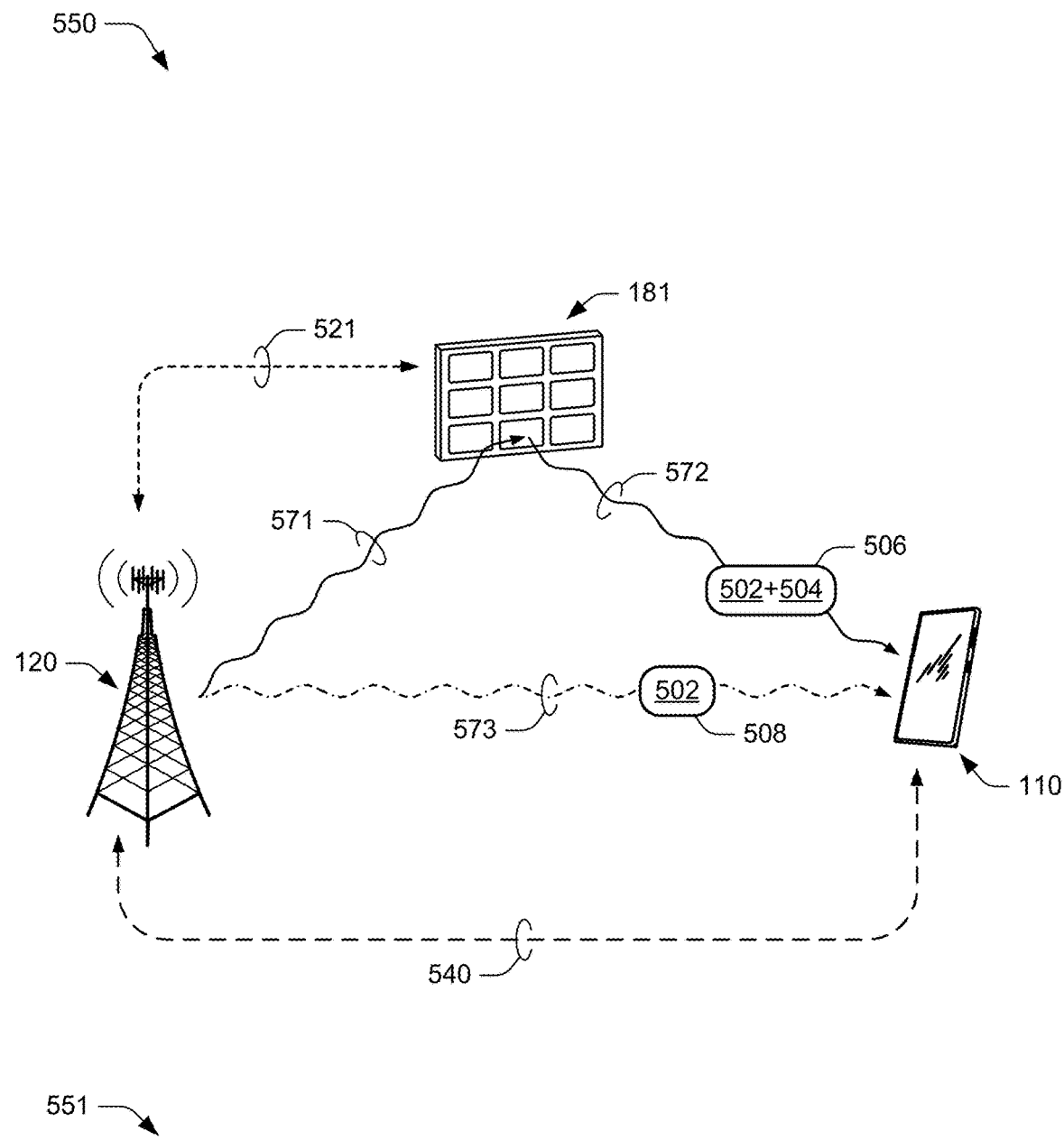

FIGS. 5A and 5B illustrate respective examples 500 and 550 of a base station using an adaptive phase-changing device to reflect signal rays to a user equipment using in accordance with one or more aspects. Specifically, the example 500 shows a base station 120 using an APD 181 to reflect a signal ray of a wide beam transmission towards a UE 110. The example 550 shows the base station 120 using the APD 181 to reflect a signal ray of a narrow beam transmission towards the UE 110. In the examples 500 and 550, the base station 120 and/or APD 180 modulate or encode wireless signals with identification information, which can be used when selecting APDs 180 or determining a position of UE 110. Aspects described with reference to examples 500 and/or 550 may be implemented by or with any suitable entities, which may include those shown or other entities described with reference to FIGS. 1 through 4 or FIGS. 6A through 15. In some aspects, the APD 181 is selected as part of a subset of APDs from multiple APDs 180 deployed within communication range of the base station 120 as previously described. Thus, the base station 120 may use APD 181 and other APDs 180 within range of the base station 120 for reflecting wireless signals toward the UE 110 (or other UEs). Prior to implementing or while using the APDs 180 to reflect identifiable wireless signals and reflections of the wireless signals toward the UE 110, the base station 120 may select, configure, manage, or use the APDs 180 as described with reference to FIG. 4 and FIGS. 6A through 12B, or the methods of FIGS. 13 through 16.

In aspects, a base station 120 (or APD-enabled position function (APF) 272 implemented by the base station 120) manages or interacts with multiple APDs 180 of a wireless network to determine a position of the UE 110. Generally, each of the APDs 180 has a known position, which may include a location of the APD 180 and an orientation of a surface of the APD 180. For example, the APD 181 may have a fixed location that is set at a time of installation or determined by a position sensor 308 (GNSS receiver) of the APD 180. In aspects, the base station 120 or APF 272 obtains position and/or orientation information from the APD 181 via an APD control channel 520, which may include the APD-slow-control channel or APD-fast-control channel implemented via the wireless link 133. In this example, an APD control channel is implemented as a separate APD control channel 521 between the base station 120 and the APD 181. Alternatively or additionally, the base station 120 can query a server for position information and/or capabilities of APDs proximate the UE 110, such as by contacting a server included in the core network 150 of FIG. 1.

To determine angular information or other information between the APDs 181, 182, and 183 and the UE 110, the base station transmits wireless reference signals toward the APDs, which in turn transform the wireless reference signals to provide respective reflections that may be steered and directed toward the UE 110 in a controlled manner. Generally, the transmitted reference signals and reflections of the reference signals include or convey identifiers to the UE 110, which may include BS-specific and/or APD-specific identification information that enables the UE 110 or base station 120 to identify a source of the reference signal or reflection. The UE 110 decodes these identifiers and optionally measures signal quality parameters, which are provided to the base station 120 as feedback information via an anchor connection 540. In aspects, the base station 120 establishes and maintains an anchor connection 540 with a UE 110 when computing a position of the UE 110. Based on the feedback information that includes the identifiers of the reflections reaching the UE 110, the base station 120 can determine which reflected wireless signals reach the UE 110 from which particular APDs 181, 182, 183. Alternatively or additionally, the base station 120 may communicate directly with the UE 110, such as through narrow band or wide band beams that include signal rays that do not reflect off an APD prior to reaching the UE 110. In some cases, the base station 120 modulates the direct or LoS signal rays with a beam ID, which enables the UE 110 to provide the base station with feedback information for the LoS or non-APD-based signals.

In reference to FIG. 5A, the base station 120 transmits a broad beam 530 toward the APD 181, the UE 110, or any point between the APD 181 and the UE 110 (e.g., a geometric mid-point) such that signal rays of the beam might reach both the APD 181 and the UE 110. The broad beam 530 includes multiple signal rays, some of which may reach the UE 110 indirectly by reflecting from the APD 181 and directly without reflection off of the APD 180. In this example, the broad beam 530 includes a signal ray 531 that is transformed by the APD 181 as a reflection 532 toward the UE 110. The broad beam 530 also includes signal rays 533, 534, and 535, of which signal ray 535 is a LoS signal ray that reaches the UE 110 directly. To enable identification and use of reflected signal rays (reflections) or LoS signal rays (e.g., direct or non-APD signal rays) that reach the UE 110, the base station 120 and/or APD 180 can modulate respective signal beam identifiers on transmitted wireless signals or reflected beam identifiers on reflected wireless signals.

In various aspects of modulating wireless signals with identification information, a reference signal or reflection of the reference signal can include or convey different combinations of BS-based or APD-based identification information. By way of example, a table at 501 illustrates some combinations of modulated or encoded identifiers that a wireless signal or reflection of the wireless signal may include. As shown in the table at 501, incident wireless signals and reflections of the wireless signals may be modulated with the same or different identification information. Generally, a base station 120 modulates a transmitted beam or wireless signal (e.g., signal ray or PRS) with a beam identifier modulation (beam ID modulation) 502 (e.g., base station identifier (BS-ID) of table 501) and/or the APD modulates a reflection of the wireless signal (e.g., reflected signal ray) with a reflected beam ID modulation 504 (e.g., APD identifier (APD-ID) of table 501). In various implementations, an identifier of a reflection, or reflection ID 506, may include or carry information from one or both identification modulations implemented by the base station 120 (BS-ID) and/or the APD 180 (APD-ID). In this example, the reflection ID 506 for the reflection 532 of a wireless signal 531 may include the BS-ID modulation (beam ID 502), APD-ID modulation (reflected beam ID 504), or both of the BS-ID and APD-ID modulations. Because the APD 181 does not modulate the direct or LoS signal ray (e.g., signal ray 535), a signal ray ID 508 may include null information or the BS-ID modulation (beam ID 502).

For cases in which both of the direct signal ray 535 and the reflected signal ray 532 include only the base station-ID modulation (e.g., BS-ID), the UE 110 and/or base station 120 may use a difference in observed time-of-arrival to determine which of the received signal rays is reflected by an APD 180 and which signal ray is received directly from the base station 120. As shown in a table at 511, the reflection information modulated onto a signal ray or reflection of a signal ray may include any suitable information useful to distinguish from which APD 180 a reflection is received. In this example, the base station 120 modulates the signal rays 512 of FIG. 5A (which include signal rays 531, 533, 534, and 535) with a beam ID 502 prefix (e.g., 1.x), and the APD 180 modulates the reflection 514 of the signal ray (reflected signal ray 532) with a reflected beam ID 504 suffix (e.g., x.3). When received at or by the UE 110, the UE 110 decodes the reflection identifier 506 (e.g., "1.3") of the reflected signal ray 532 and the signal ray identifier 508 (e.g., "1.0") of the LoS signal ray 535, which the UE 110 provides the decoded information as feedback to the base station 120 via the anchor connection 540 to facilitate analysis of angular information for computing the position of the UE 110.

In the context of narrow beam transmission, FIG. 5B illustrates the base station 120 transmitting a narrow beam that includes signal ray 571 toward an RIS of the APD 181, which is reflected as signal ray 572 toward the UE 110. The base station 120 may also transmit concurrently, or at a different time, another narrow beam that includes signal ray 573 transmitted directly toward the UE 110, which does not reflect off the APD 181. In this example and with reference to the table shown at 551, the direct signal ray 512 (e.g., signal ray 573) and the reflection 514 (e.g., reflected signal ray 572) that reach the UE 110 may carry different identification information when the APD 181 modulates or adds APD-specific information to the reflected signal ray. Alternatively or additionally, as shown in a table at 551, because the narrow beam transmissions are separate transmissions, the base station 120 may modulate the signal rays 571 and 573 with different information, enabling the UE 110 or base station 120 to distinguish the signals rays that reach the UE 110 from one another without resolving timing information in contrast with some broad beam transmissions. When received by the UE 110 in this example, the UE 110 can decode the reflection identifier 506 (e.g., "11.9") of the reflected signal ray 572 and the signal ray identifier 508 (e.g., "15.0") of the LoS signal ray 573 without timing information. To facilitate calculations to determine the position of the UE 110, the UE 110 provides the reflection identifier 506 and the signal ray identifier 508 as feedback to the base station 120 via the anchor connection 540. These are but a few examples of how a base station 120 or APD 180 can modulate or encode signal rays or reflected signal rays with information useful to identify various signal rays of wireless signals that reach the UE 110.

Figure 6A:
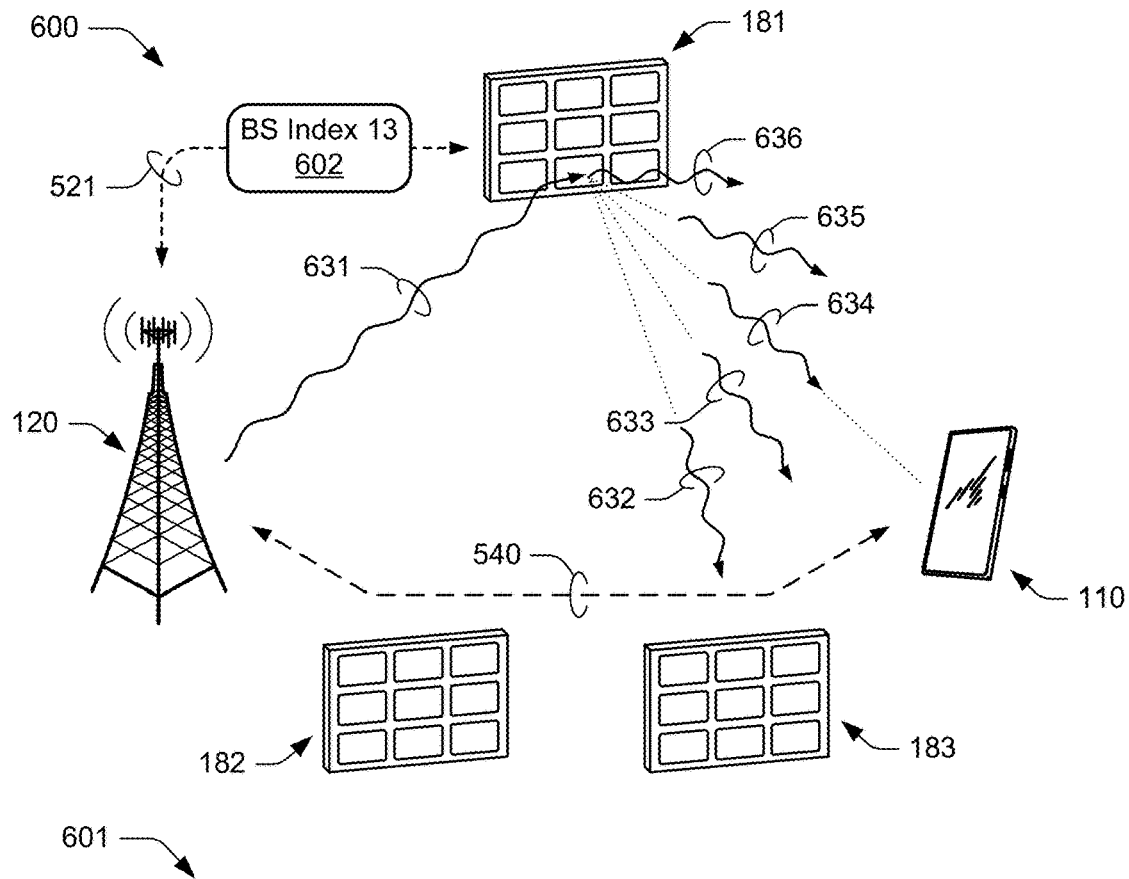
FIGS. 6A and 6B illustrate an example of a base station using adaptive phase-changing devices to beam sweep reflections of wireless signals toward a user equipment in accordance with various aspects.
Figure 6B:
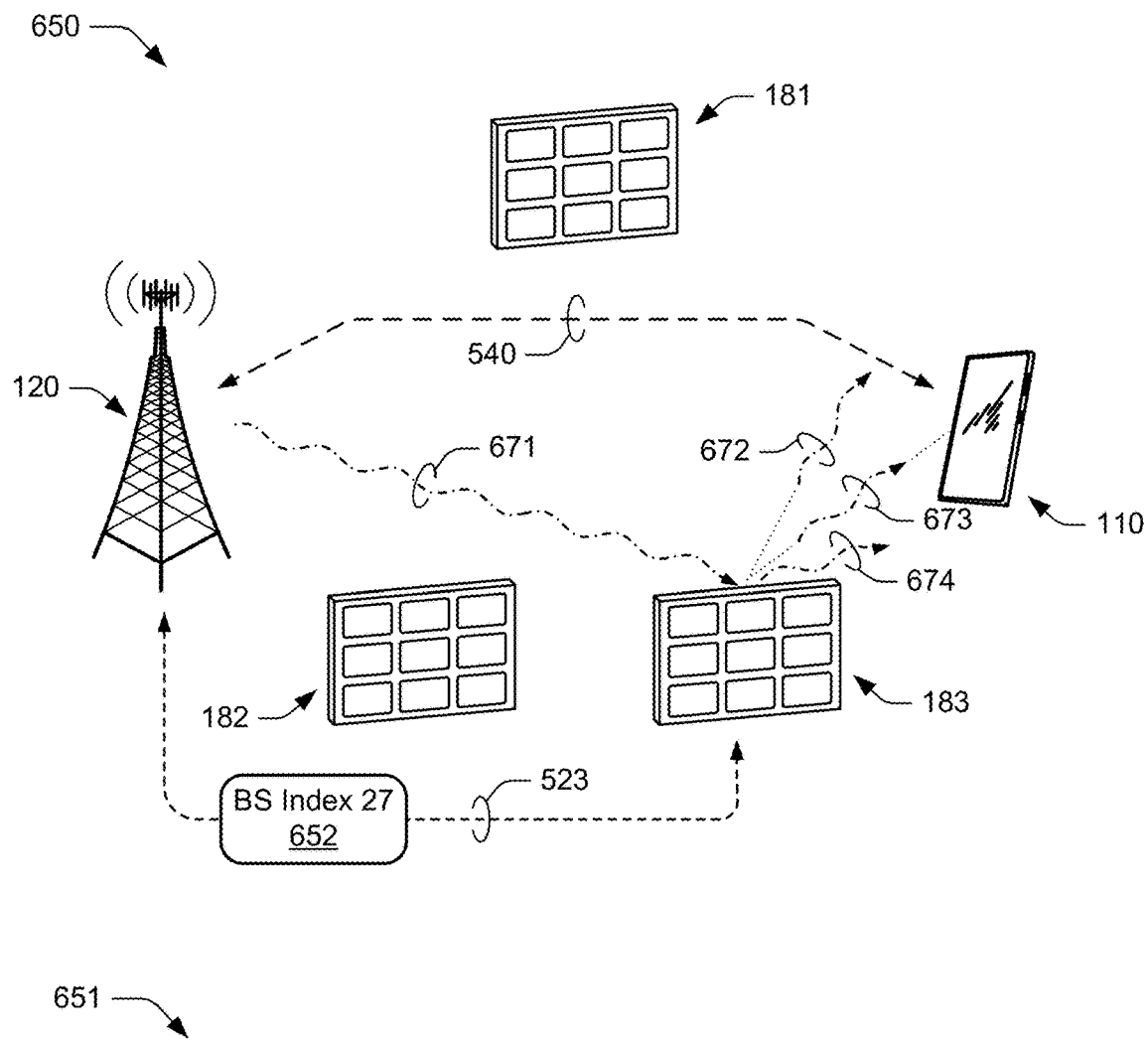

FIGS. 6A and 6B illustrate examples 600 and 650 of a base station using adaptive phase-changing devices to beam sweep reflections of wireless signals toward a user equipment in accordance with various aspects. The examples 600 and 650 include a base station 120 managing APDs 181, 182, 183 to beam sweep wireless signal reflections toward the UE 110. Aspects described with reference to the examples 600 and 650 may be implemented by or with any suitable entities, including those shown in FIGS. 6A and 6B, or other entities described with reference to FIGS. 1 through 5B or FIGS. 7 through 16. Prior to implementing or while using the APDs 180 to beam sweep reflections of wireless signals toward the UE 110, the base station 120 may select, configure, manage, or use the APDs 180 as described with reference to FIGS. 4A through 5B, FIGS. 7 through 12B, or the methods of FIGS. 13 through 15.

The examples 600 and 650 correspond to communications that may occur during different durations of time. As illustrated, the example 600 corresponds to a first point in time (or first duration of time) and the example 650 corresponds to a second, arbitrary later point in time (or second duration of time) during which respective beam sweeping operations are implemented. Thus, the examples 600 and 650 illustrated in FIGS. 6A and 6B collectively illustrate aspects of using APDs to beam sweep reflections of wireless signals, which can be useful in computing a position of the user equipment. An environment of the examples 600 and 650 includes the base station 120, the APDs 180, and UE 110, which may be implemented as described with reference to FIGS. 4A through 5B, FIG. 7, FIG. 8A, or FIG. 8B. For visual brevity, FIGS. 6A and 6B illustrate the base station 120 determining a position of a single UE 110 using the APDs 180. However, for alternative or additional aspects that include multiple UEs, the base station can alternate APD use while implementing simultaneous beam sweeping, directional reflecting, or operations to determine positions of multiple UEs, such as that described with reference to FIGS. 8A, 8B, 12A, 12B, and 16. For example, use of one APD 180 may be time-cycled to enable the base station 120 to determine respective positions of multiple UEs 110.

In aspects, the base station 120 may use the APDs 180 to implement beam sweeping to steer or direct reflections of wireless signals toward the UE 110. Based on feedback provided by the UE 110 for the reflections of the wireless signals that reach the UE (e.g., reflection identifiers and RSRP), the base station 120 can compute the respective angular information for each APD. The base station 120 may then combine the angular information associated with the multiple APDs with known positions of the APDs to determine the position of the UE through triangulation and/or trilateration. Alternatively or additionally, the base station 120 can augment non-APD based UE-position information, such a UE-reported GNSS-based position of the UE with the APD-based position information from one or more APDs to determine or refine the position of the UE 110. In some implementations, the base station 120 uses or controls an APD 180 to perform horizontal beam sweeping and/or vertical beam sweeping to obtain information useful to determine a more-precise position for the UE 110. In the present example, aspects of APD-based beam sweeping for determining a position of user equipment are described in reference to beam sweeping operations in a generally horizontal direction, and may be similarly applied to beam sweeping in a generally vertical direction, or beam sweeping across an arbitrary axis selected by the base station 120 for determining a position of user equipment.

When determining a position of one or multiple UEs 110, the base station 120 may configure multiple APDs 180 with surface configurations or beam sweeping patterns by which the base station 120 or APF 272 selectively controls or manages directionality of reflected wireless signals in association with determining a position of user equipment. In some cases, a beam sweeping pattern may include a sequence of surface configurations, phase vectors, calibrated angle information, timing information (e.g., slot timing), APD reflected beam IDs 504, or the like. Thus, a beam sweeping pattern implemented by an APD 180 may include a sequence of surface configuration indexes, reflected beam IDs 504, and timing information by which an APD manager 320 configures a RIS of the APD 180 prior to or during beam sweeping operations. Alternatively or additionally, the base station 120 may select and coordinate encoding or modulation of a BS beam ID 502 on a transmitted reference signal(s) (e.g., reference signal 631) or position reference signal(s), which may indicate an associated APD or correspond to the sequence of surface configurations of a beam sweeping pattern. As such, the base station 120 may use an APD 180 to beam sweep, via a selected phase vector, a reference signal having a reflection identifier 506 (e.g., BS beam ID 502 and/or APD reflected beam ID 504) toward the UE 110. In other cases, the base station may use the APD 180 to beam sweep, via a sequence phase vectors, portions of a reference signal each encoded with a reflection identifier 506 (e.g., BS beam ID 502 and/or APD reflected beam ID 504) toward the UE 110 at different respective directions or angles. To enable identification of phase vectors associated with received reflections of the wireless signals, the base station 120 may temporally align encoding of the BS beam IDs 502 on the transmitted signal with the sequence of phase vectors implemented at the APD. In other words, the APD 180 may sweep (e.g., advance) through a sequence of APD surface configurations while reflecting the incident signal transmitted by the base station 120 with multiple BS beam IDs 502 to beam sweep a sequence of identifiable signal rays towards the UE 110. Alternatively or additionally, the APD 180 can also sweep through a sequence of APD reflected beam IDs 504 to module the sequence of signal rays with reflection identifiers 506. Thus, in some cases, a reflection identifier 506 of a reflected signal ray or reference signal that reaches the UE 110 may include information of a BS beam ID 502 modulated on the incident signal ray by the base station 120 and information of an APD reflected beam ID 504 modulated on the reflected signal ray the APD 180 (e.g., a combined or layered reflection identifier). In other cases, a reflection identifier 506 of a reflected signal ray or reference signal received by the UE 110 may include information from either one of a BS beam ID 502 modulated on the incident signal ray by the base station 120 or information of an APD reflected beam ID 504 modulated on the reflected signal ray the APD 180.

By way of example, consider the example 600 in which the base station 120 implements beam sweeping with a first APD 181 of a set of multiple APDs 180 selected for use in determining a position of the UE 110. Based on an initial estimated location of the UE 110 (e.g., GNSS-based UE-position or base station-UE low-band signaling), the base station 120 or APF 272 may select a broad beam sweeping pattern, such as a pattern that spans or sweeps a spatial region of approximately 70 degrees to 90 degrees. In the present example, the base station 120 sends a beam sweeping pattern index 602 (BS index 602, e.g., BS index 13) to the APD 181 via the APD control channel 521. The beam sweeping index 602 may indicate or convey to the APD 181 which beam sweeping codebook, beam sweeping pattern, APD beam IDs, or phase vector sequence to use when implementing operations to beam sweep incident wireless signals (e.g., BS-originated position reference signals). Based on the beam sweeping index 602, the APD manager 320 accesses a beam sweeping codebook (not shown) of the APD 181 and selects a corresponding beam sweeping pattern 604 (e.g., beam sweeping pattern 13). As shown at 601 in a table of beam sweeping information for APD 181, the example beam sweeping pattern 13 includes entries for a set of phase vectors 606 and corresponding reflection angles 608, which may be calibrated or verified for one or more of the phase vectors 606. Note that the beam sweeping pattern 604 may also include reflected beam IDs 504 for modulation onto reflected wireless signals by the APD 181, which are omitted from this example.

To enable identification of signals or reflections received by the UE 110, the base station 120 modulates or encodes beam IDs 502 on signals or portions of signals transmitted to the UE 110 via the APDs 180. Note in this example, the base station 120 modulates beam IDs 502 onto signal rays that correspond to reflection identifiers 506 received by the UE 110 and the APD 180 does not modulate or add reflected beam IDs 504 on reflections of the signal rays. As described with reference to FIGS. 5A and 5B, the APDs 180 may also modulate reflected beam IDs 504 on incident signals transformed by an RIS of an APD 180, such that reflection identifiers 506 include information of the APD reflected beam IDs 504 in addition or instead of the BS beam IDs 502. In this example, the base station 120 selects and modulates a set of BS beam IDs 502 (beam IDs 502) onto a reference signal 631 transmitted to the APD 181 to implement beam sweeping. In other aspects, the base station 120 may select and modulate one BS beam ID 502 onto each reference signal transmitted toward an RIS of the APD 181. Thus, the reference signal 631 may represent a continuous transmission of a reference signal modulated with a sequence BS beam IDs 502 (and/or reflected beam IDs 504, not shown) or a series of individually transmitted reference signals each modulated with a different BS beam ID 502 (and/or reflected beam ID 504, not shown). By coordinating or synchronizing respective timing of a transmission of wireless signals (e.g., reference signal 631) and RIS reconfigurations at the APD 181 that implement beam sweeping, each reflection 514 may have and/or correspond with a reflection identifier 506 (reflection ID 506) useful by the UE 110 and/or base station 120 to identify an APD 180 and phase vector 606 associated with the reflection.

The BS beam IDs 502 and/or APD reflected beam IDs 504 (not shown) may be configured with any suitable structure or syntax, and may identify an associated APD 180, a reference signal, and/or a specific portion of a reference signal involved in communication of a wireless signal or reflection of the wireless signal received by the UE 110. In some aspects, a base station 120 modulates a reference signal with a BS beam ID 502 as a first portion of reflection identification information and an APD 180 modulates a reflection of the reference signal with a reflected beam ID 504 as a second portion of the reflection identification information (e.g., a combined or layered reflection identifier). In the present example, each beam ID 502 includes a prefix designating an APD (1.x) and a suffix (x.10 through x.60) that corresponds to a reflection ID 506 of a reflection and is useful to identify the transformed wireless signal or reflection (e.g., reflection ID "1.30") received by the UE 110. The base station 120 coordinates transmission of the reference signal 631 and implementation of the beam sweeping pattern 604 by the APD 181 to beam sweep a set of reflected wireless signals, or reflections 514 that include a reflection ID 506, toward the UE 110. For visual brevity, these reflections are illustrated as reflections 632, 633, 634, 635, and 636, which cover a horizontal sweep toward the UE 110 of approximately 90 degrees. Note that for a first or preliminary beam sweeping operation to determine the position of the user equipment, the base station 120 or APF 272 may configure the beam sweeping pattern 604 to cover a relatively broad area based on an initial or rough estimation of a location of the UE 110. In aspects, the base station 120 can refine or narrow beam sweeping patterns of subsequent beam sweeping operations based on updated or revised UE-position information provided by previous APD-enabled beam sweeping operations. By so doing, the position of the UE 110 may be accurately determined more-quickly and with less power consumption by the base station 120 alone.

Returning to example 600, the UE 110 receives one or more of the reflections 514 of the reference signal 631 with reflection IDs 506 that the APD 181 beam sweeps toward the UE 110. In aspects, the UE 110 may decode or demodulate a reflection ID 506 and/or obtain one or more signal quality parameters (e.g., RSRP) for the wireless signal reflections received at the UE 110. In the present example, the UE 110 receives and is able to decode reflection IDs 506 for five of the reflections 514, which includes the reflection 634 of the reference signal 631. The UE 110 also determines or obtains RSRP values 610 for each of the received reflections 514. As shown in the table at 601, others of the reflections 514 may not reach the UE 110, or reach the UE 110 with insufficient signal strength (e.g., less than-140 dBm) or signal quality to permit decoding of a reflection ID 506. In aspects, the user equipment 110 sends the reflection IDs 506 (e.g., BS beam IDs 502) and RSRP values 610 of the received reflections 514 to the base station 120 via the anchor connection 540. Based on the reflection IDs 506 and RSRP values 610 the base station 120 can determine angular information and/or estimate a distance between the APD 181 and the UE 110. For example, based on the RSRP values 610, the base station 120 may determine that use of phase vector 91 in beam sweeping resulted in the reflection 634 reaching the UE 110 with a highest level of signal power. As such, the base station 120 can determine based on the phase vector 191 that a position of the UE 110 is at approximately 89 degrees from an incident angle of the reference signal 631 on the RIS of the APD 181. Alternatively or additionally, the base station 120 may estimate a distance to the UE 110 based on the signal quality parameters measured for the reflection at the UE 110 or other low-band base station-UE communications. As described herein, the base station 120 may combine the angular information and/or distance information determined with one APD 180 with respective angular and/or distance information associated with other APDs 180 to compute a position of the UE 110.

In aspects, the base station 120 or APF 272 performs multiple iterations of beam sweeping with one or more of the APDs 180. In some cases, the base station 120 implements beam sweeping with one APD 180 in a generally horizontal direction to compute first angular information and then implements beam sweeping with the APD 180 in a generally vertical direction to compute second angular information. Alternatively or additionally, the base station 120 implements a first beam sweeping operation with one APD 180 to compute first angular information and also a second beam sweeping operation with another APD 180 to compute second angular information. In aspects, the base station 120 or APF 272 revises a position calculation for the UE 110 based on the angular information and/or distance information determined by a current or previous beam sweeping operation. Thus, parameters of a subsequent beam sweeping operation may be refined or revised based on the angular information of preceding beam sweeping operations or a revised estimation the location of the UE 110 (e.g., GNSS-based UE-position reported by the UE).

Continuing from example 600, FIG. 6B illustrates the example 650 in which the base station 120 implements another beam sweeping operation. As noted, the example 650 corresponds to a second, arbitrary later point in time (or second duration of time) during which subsequent beam sweeping operations may be implemented after the operations of example 600. In the example 650, the base station 120 implements beam sweeping with a third APD 183 of a set of multiple APDs 180 selected for use in determining a position of the UE 110. Here, assume that the base station 120 has already implemented a second round of beam sweeping with the second APD 182 of the set of multiple APDs 180. Based on a revised or updated estimated location of the UE 110 enabled by previous beam sweeping operations, the base station 120 or APF 272 may select a narrow or less broad beam sweeping pattern, such as a pattern that spans or sweeps a spatial region of approximately 25 degrees to 35 degrees (e.g., less than previous beam sweeping patterns). In the present example, the base station 120 sends a beam sweeping pattern index 652 (BS index 652, e.g., BS index 27) to the APD 183 via the APD control channel 523. The beam sweeping index 652 may indicate or convey to the APD 183 which beam sweeping codebook, beam sweeping pattern, or phase vector sequence to use when implementing beam sweeping of incident wireless signals (e.g., BS-originated position reference signals (PRS)). Based on the beam sweeping index 652, the APD manager 320 accesses a beam sweeping codebook (not shown) of the APD 183 and selects a corresponding beam sweeping pattern 604 (e.g., beam sweeping pattern 27). As shown at 651 in a table of example beam sweeping information at 601, the example beam sweeping pattern 27 includes entries for a set of phase vectors 606 and corresponding reflection angles 608, which may be calibrated or verified for one or more of the phase vectors 606.

The base station 120 also selects and modulates a set of BS beam IDs 502 onto a reference signal 671 transmitted to the APD 183 to implement beam sweeping. In other implementations, the base station 120 may select and modulate one BS beam ID 502 or APD reflected beam ID 504 (not shown) onto each reference signal transmitted toward an RIS of the APD 183. Thus, the reference signal 671 may represent a continuous transmission of a reference signal modulated with a set of multiple BS beam IDs 502 (each BS beam ID modulated onto the reference signal at a different point in time) or a series of individually transmitted reference signals each modulated with a different BS beam ID 502. By coordinating or synchronizing respective timing of a transmission of wireless signals (e.g., reference signal 671) and RIS reconfigurations at the APD 183 that control beam directionality, each reflection 514 may have and/or correspond with a reflection ID 506 (e.g., BS beam ID 502 and/or APD reflected beam ID 504, not shown) useful by the UE 110 and/or base station 120 to identify an APD 180 and phase vector 606 associated with the reflection.

As described with reference to FIG. 6A, the beam IDs 502 for reference signal 671 or reflection IDs 506 of reflections 514 may be configured with any suitable structure or syntax, and may identify an associated APD 180, a reference signal, and/or a specific portion of a reference signal involved in communication of a wireless signal or reflection of the wireless signal received by the UE 110. In the present example, each beam ID 502 includes a prefix designating an APD (3.x) and a suffix (x.10 through x.40) useful to identify a transformed wireless signal or reflection (e.g., reflection ID "3.25") received by the UE 110. The base station 120 coordinates transmission of the reference signal 671 and implementation of the beam sweeping pattern 604 (e.g., beam sweeping pattern 27) by the APD 183 to beam sweep a set of reflected wireless signals, or reflections 514 that include reflection IDs 506, toward the UE 110. For visual brevity, these reflections are illustrated as reflections 672, 673, and 674, which cover a horizontal sweep toward the UE 110 of approximately 30 degrees. Note that for a second or subsequent beam sweeping operation to determine the position of the user equipment, the base station 120 or APF 272 may configure the beam sweeping pattern 604 to cover a relatively narrow area based on a revised or updated estimation of the location of the UE 110. By so doing, the position of the UE 110 may be accurately determined more-quickly and with less power consumption by the base station 120 and/or APD 180.

Returning to example 650, the UE 110 receives one or more of the reflections 514 of the reference signal 671 that the APD 183 beam sweeps toward the UE 110. In aspects, the UE 110 may decode or demodulate a reflection ID 506 and/or obtain one or more signal quality parameters (e.g., RSRP) for the wireless signal reflections received at the UE 110. In the present example, the UE 110 receives and is able to determine reflection IDs 506 for three of the reflections 514, which includes the reflection 673 of the reference signal 671. The UE 110 also determines or obtains RSRP values 610 for each of the received reflections 514. As shown at 651, others of the reflections 514 may not reach the UE 110, or reach the UE 110 with insufficient signal strength (e.g., less than -140 dBm) or signal quality to permit decoding of a reflection ID 506. In aspects, the user equipment 110 sends the reflection IDs 506 and RSRP values 610 of the received reflections 514 to the base station 120 via the anchor connection 540 (e.g., low-band wireless link). Based on the reflection IDs 506 (e.g., BS beam ID 502 and/or APD reflected beam ID 504) and RSRP values 610 the base station 120 can determine angular information and/or estimate a distance between the APD 183 and the UE 110. For example, based on the RSRP values 610, the base station 120 may determine that use of phase vector 431 by the APD 183 in beam sweeping resulted in the reflection 673 reaching the UE 110 with a highest level of signal power. As such, the base station 120 can determine based on the phase vector 431 that the position of the UE 110 is at approximately 102 degrees from an incident angle of the reference signal 631 on the RIS of the APD 181. Alternatively or additionally, the base station 120 may estimate a distance to the UE 110 based on the signal quality parameters measured for the reflection at the UE 110. As described with herein, the base station 120 may combine the angular information and/or distance information determined with one APD 180 with respective angular and/or distance information associated with other APDs 180 to compute a position of the UE 110.

Figure 7:
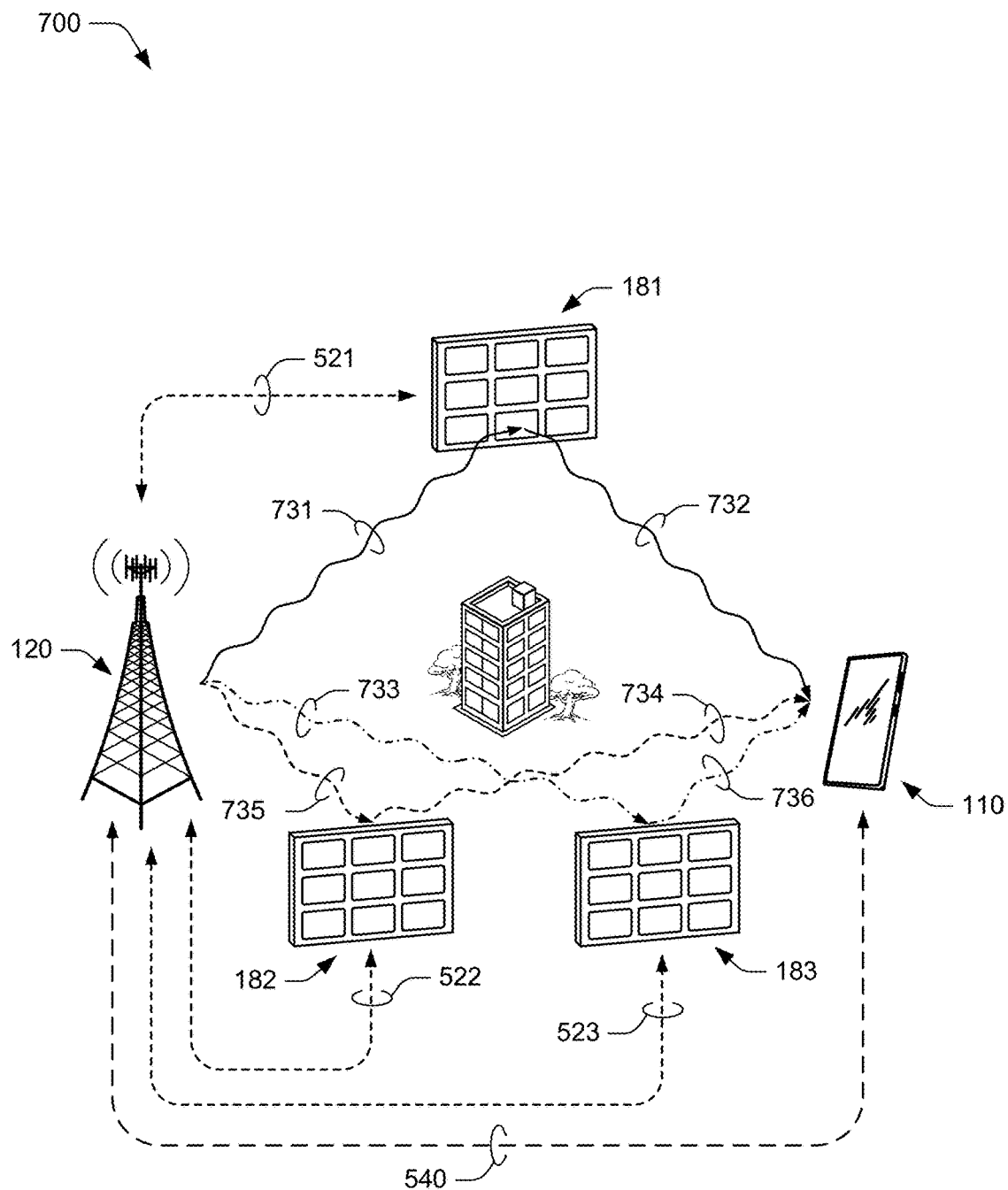
FIG. 7 illustrates an example of a base station using adaptive phase-changing devices to determine a position of a user equipment in accordance with one or more aspects.

FIG. 7 illustrates an example 700 of a base station using adaptive phase-changing devices to determine a position of a user equipment in accordance with one or more aspects. The example 700 is illustrated as a base station 120 determining a position of a user equipment 110 using multiple APDs 180 that includes APDs 181, 182, 183. Aspects described with reference to example 700 may be implemented by or with any suitable entities, which may include those shown or other entities described with reference to FIGS. 1 through 6B or FIGS. 8A through 16. In some aspects, the APDs 181, 182, 183 are selected as a subset of APDs from a larger set of APDs 180 deployed within communication range of the base station 120 as previously described. Thus, the base station 120 uses any of the APDs 181, 182, 183, or other APDs 180 within range of the base station 120 for determining the position of the UE 110 (or other UEs). Prior to implementing or while performing operations to determine the position of the UE 110, the base station 120 may select, configure, manage, or use the APDs 180 as described with reference to FIGS. 4A through 6B, 8A through 12B, or methods of FIGS. 13 through 16.

In aspects, a base station 120 (or APD-enabled position function (APF) 272 implemented by the base station 120) manages or interacts with multiple APDs 180 of a wireless network to determine a position of the UE 110. Generally, each of the APDs 180 has a known position, which may include a location of the APD 180 and an orientation of a surface of the APD 180. To determine angular information between the APDs 181, 182, and 183 and the UE 110, the base station transmits wireless reference signals 731, 733, and 735 (e.g., PRS) toward the APDs, which in turn transform the wireless reference signals to provide respective reflections 732, 734, and 736 that may be steered and directed toward the UE 110 in a controlled manner. As described with reference to FIGS. 4A through 6B, the base station 120 may use the APDs 180 and implement operations that steer or beam sweep identifiable reflections of wireless signals toward the UE 110. Based on feedback (e.g., reflection identifiers 506) provided to the base station 120 by the UE 110 via an anchor connection 540, the base station 120 may determine which reflected wireless signals reach the UE 110 from which particular APDs 181, 182, 183.

In aspects, the feedback of the UE 110 includes a BS-modulated beam ID 502 or APD-modulated reflected beam ID 504 (e.g., as described with reference to FIGS. 5A-6B, not shown) indicating a specific APD, reflective angle (or phase vector), and/or a signal quality parameter (e.g., RSRP) of the reflected wireless signal(s) received. Using this information, the base station 120 computes angular information and/or distance information for the UE 110 in relation to the known positions of the APDs 181, 182, 183. The base station can then perform triangulation and/or trilateration by using the angular information (e.g., multiple angles), to determine or compute the position of the UE 110. In aspects, the base station 120 may use the APD position signaling and/or APD-based position information to augment or refine any low-band location signaling (e.g., base station-UE based triangulation, trilateration, multi-lateration) and/or GNSS-based UE-location determinations. For example, the base station 120 may use angular information determined through high-band communication through two APDs in combination with one of a reported GNSS-based location of a UE 110 or direct base station-UE low-band position signaling (e.g., angle-of-arrival, RSRP, or timing advance information) to determine the position of the UE with increased precision.

In various implementations, the base station 120 communicates in separate frequency bands to implement aspects of determining a user equipment's position by using APDs. For example, the base station 120 communicates position reference signals with the UE in a first operating frequency band (e.g., wireless link 131), such as above 6 GHz bands that are defined by the 3GPP LTE and 5G NR communication standards and communicates with the UE in a second operating frequency band (e.g., low-band anchor connection 540). In other words, the base station 120 can transmit wireless signals (e.g., position reference signals) via the APDs 180 to reach the UE 110 in a high frequency operating band (e.g., mmWave), while communicating with the UE 110 through a different operating frequency (e.g., low-band anchor connection) in a carrier aggregation configuration, multi-connectivity, or other setting. The base station 120 may also communicate with the APD using APD control channels in a third operating frequency band (e.g., signals used for wireless link 133) that is different from the first and second operating frequency bands. In other aspects, the base station uses a same operating frequency band for both APD communications and at least one connection with the UE.

In this example, the base station 120 communicates with the APDs 181, 182, and 183 using APD control channels, illustrated as respective APD control channels 521, 522, and 523 with each APD. The base station 120 also implements a low-band anchor connection 540 to communicate with the UE 110, such as to receive information associated with wireless signals (e.g., high-band reference signals) received by the UE 110 (e.g., reflection identifiers 506 and signal quality parameters). In some cases, the base station 120 implements carrier aggregation to communicate with the UE 110 with high-band communications in a first frequency band (e.g., above 6 GHz) and low-band communications in a second frequency band (e.g., below 6 GHZ). Generally, the APD control channels 521, 522, 523 and/or low-band anchor connection 540 with the UE(s) augments or complements high frequency (mmWave) communications from the base station to the APDs 180, which may include reference signals 731, 733, and 735 sent to the UE 110 via the APDs 180 for determining a position of user equipment. In other words, the APD control channels and UE anchor connection may operate in different frequency bands (e.g., below 6 GHZ) than operating bands used by the base station 120 to communicate downlink signals or position reference signals to the UE 110 for determining the position of the UE (e.g., above 6 GHz). In various implementations, the base station 120 communicates surface-configuration information and/or beam sweeping information to the APDs 180 over APD control channels 521, 522, and 523, which may be implemented via one or more wireless links (e.g., an APD-slow-control channel or APD-fast-control channel) operating in one or more frequency bands.

In aspects, the base station 120 configures the APDs 181, 182, 183 with surface configurations or beam sweeping patterns to direct or steer reflections of wireless signals to the UE 110 as shown in FIG. 7. With respect to surface configurations of an APD 180, one or more phase vectors applied by the surface of the APD to an incident waveform may be calibrated such that the base station 120 can compute, using the phase vector knowledge and identifier 506 of the reflection, a direction of a wave front of the wireless signal or reflection that reaches the UE 110. In some implementations, the base station 120 combines respective APD phase vectors (e.g., angular information) and UE reported RSRP for each specific APD device, along with the known positions of the APDs, to compute a position of the UE. Alternatively or additionally, the base station 120 can use other UE information associated with non-reflected base station-UE signals (e.g., anchor connection 540 or wireless link 131), such as a timing advance value or RSRP, in combination with APD phase vectors and RSRP information of reflections from the APDs 180 when determining the precise position of the UE 110.

Figure 8A:
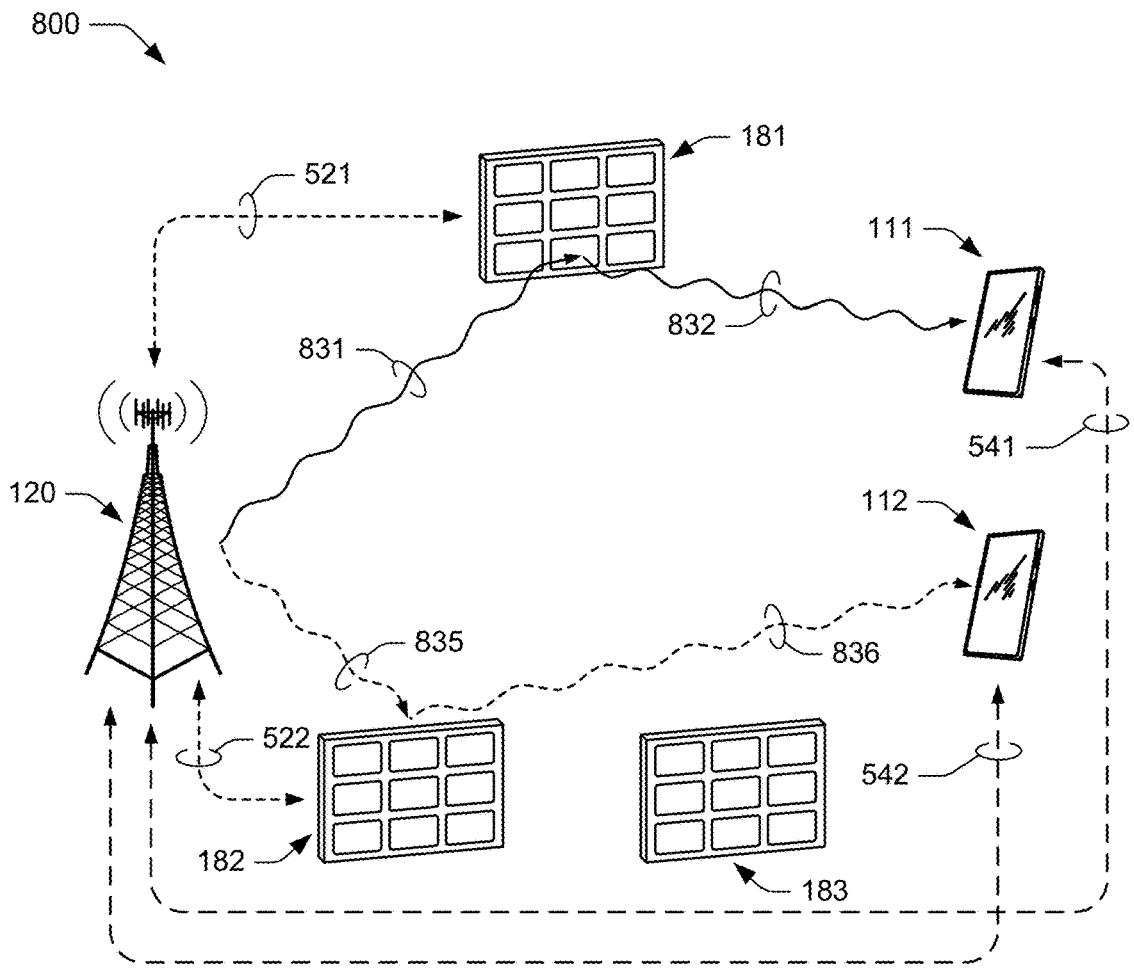
FIGS. 8A and 8B illustrate an example of using adaptive phase-changing devices to determine positions of multiple user equipment in accordance with various aspects.
Figure 8A:
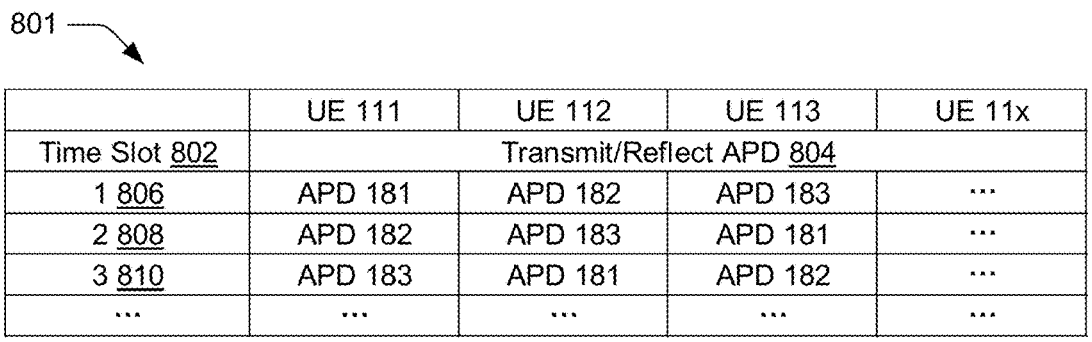
Figure 8B:
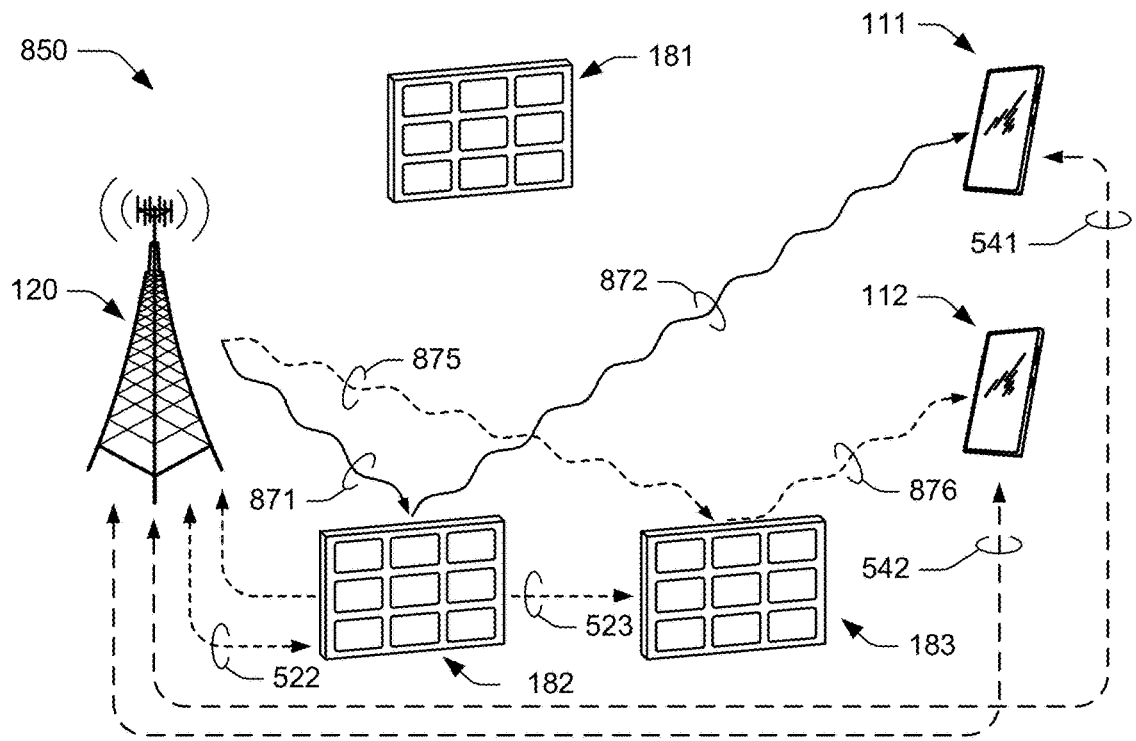
Figure 8B:
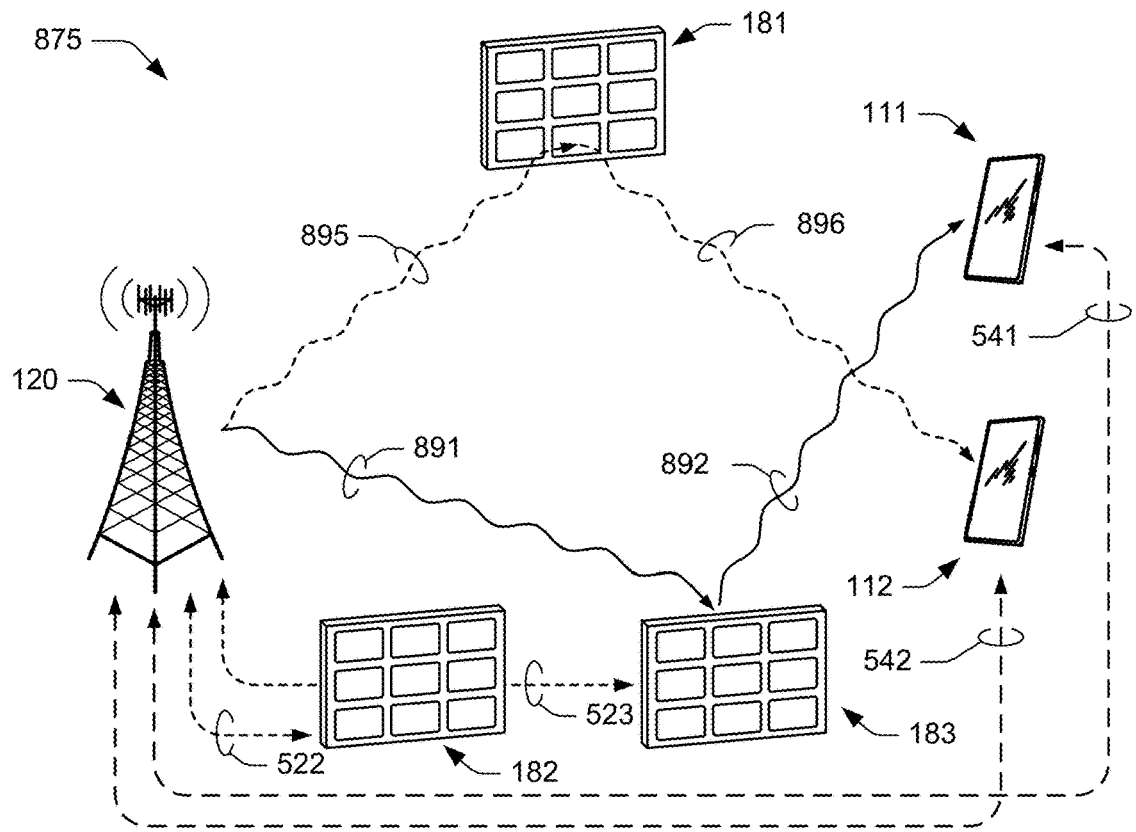

FIGS. 8A and 8B illustrate an example 800 of using adaptive phase-changing devices to determine respective positions of multiple user equipment in accordance with various aspects. The example 800 is illustrated as a base station 120 using APDs 181, 182, and 183 to determine respective positions of UEs 111 and 112. Aspects described with reference to example 800 may be implemented by or with any suitable entities, which may include those shown in FIGS. 8A and 8B, or other entities described with reference to FIGS. 1 through 7 or FIGS. 9 through 16. In some aspects, the APDs 181, 182, and 183 are selected as a subset of APDs from a larger set of APDs 180 deployed within communication range of the base station 120. Thus, the base station 120 uses any of the APDs 181, 182, and 183 or other APDs 180 within range of the base station 120 for determining the positions of the UEs 111 and 112 (or other UEs). In aspects, use of one APD 180 may be time-cycled to enable the base station 120 to determine respective positions of multiple UEs 110. Prior to implementing or while performing operations to determine the positions of the UEs 111 and 112 with the APDs 181, 182, and 183, the base station 120 may select, configure, manage, or use the APDs 180 as described with reference to FIGS. 4A through 7, FIGS. 9 through 12B, or the methods of FIGS. 13 through 16.

Generally, a base station 120 may implement at least some operations for determining respective positions of multiple UEs 110 concurrently or in parallel to reduce an amount of time consumed when determining respective positions the multiple UEs. For example, while the base station 120 is performing transmit and reflection (e.g., reflection feedback/information collection) operations with a first APD 181 for a first UE 111, the base station may also perform transmit and reflection operations with a second APD 182 for a second UE 112. The base station 120 may perform the respective sets of operations with each APD 180 in an asynchronous manner, such as in response to detection of a UE 110 within communication range of the base station 120, in response to detecting that an APD 180 is able to reach the UE 110 with reflections, or in response to a request from a location based service. In some aspects, the base station coordinates or schedules the position-determining operations with different combinations of APDs 180 and UEs 110 using a time division multiplexing (TDM) scheme. For example, the base station can use a first APD 181 for transmit and reflection operations with a first UE 111 and use a second APD 182 for transmit and reflection operations with a second UE 112 in a same time slot. In a subsequent time slot, the base station can use the second APD 182 for transmit and reflection operations with the first UE 111 and use the first APD 181 for transmit and reflection operations with the second UE 112, and so forth. Thus, in scenarios in which an APD 180 serves multiple UEs 110, the base station 120 can implement a TDM-based scheme to enable the APD 180 to support operations for determining respective positions of the multiple UEs 110 at different times (e.g., in different predefined time slots). By so doing, a base station 120 can perform concurrent transmit and reflection operations with the APDs 180 to quickly determine respective positions of the multiple UEs 110.

By way of example, consider a table of TDM schedule information at 801, which includes time slots 802 during which a base station schedules to use a transmit and reflect APD 804 for interacting with different ones of the multiple APDs, which include APDs 181, 182, and 183. For visual brevity, FIGS. 8A and 8B include the first UE 111 and second UE 112 and omit a third UE 113 that is listed in the table of TDM information. Although not shown, the described transmit and reflection operations may be implemented for the third UE 113, or any number of additional UEs provided that a sufficient number of APDs are available to the base station for implementing at least some of the transmit and reflection operations in parallel. Alternatively or additionally, the base station may communicate with a subset of the multiple UEs during one or more time slots 802 of a TDM schedule. For example, when fewer APDs (e.g., three APDs) than UEs (e.g., four UEs) are available, the base station may use the available APDs (e.g., through time-cycling) to implement concurrent transmit and reflection operations with fewer than all of the UEs in a given time slot. Thus, even with fewer APDs that UEs, the base station can still reduce an amount of time consumed to determine the positions of multiple UEs by implementing concurrent transmit and reflection operations.

With reference to FIGS. 8A and 8B, three examples of concurrent transmit and reflection operations implemented by the base station 120 are illustrated at 800, 850, and 875, which correspond to time slot 1 806, time slot 2 808, and time slot 3 810 of the TDM information table. Generally, to determine angular information between the APDs 181, 182, and/or 183 the UEs 111 and 112 for determining a position of user equipment, the base station 120 transmits a series of reference signals (e.g., PRS) for each UE toward different ones of the APDs and collects reflection information from the UEs 111 and 112 as specified by the time slots 802 of the TDM information table.

At 800, during time slot 1 806, the base station 120 selects the APD 181 for transmit and reflection operations with the first UE 111 and selects the APD 182 for transmit and reflection operations with the second UE 112. Prior to the transmit and reflection operations, the base station 120 may send RIS and/or beam sweeping pattern information to the APD 181 or the APD 182 via the APD control channels 521 or 522. The base station 120 transmits a reference signal 831 for the first UE 111 toward the APD 181 and transmits a reference signal 835 for the second UE 112 toward the APD 182. Based on respective surface configurations, the APDs 181 and 182 transform the reference signals 831 and 835 to direct reflections 832 and 836 of the reference signals toward the UE 111 and UE 112. Based on the received reflections 832 and 836, the UEs 111 and 112 provide reflection information, such as reflection identifiers 506 and RSRP values 610, to the base station 120 via respective anchor connections 541 and 542, which may be implemented as described with reference FIGS. 5A through 7. The base station then determines angular information for the current combinations of APDs and UEs, which may be used to refine subsequent transmit and reflection operations (e.g., narrowed beam sweeping) and/or combined with angular information of other combinations of the APDs and UEs to enable determination of the positions of the UEs. In the context of the present example, the base station 120 advances from time slot 1 806 to time slot 2 808 to obtain additional reflection information for different combinations of the APDs and UEs.

At 850, during time slot 2 808, the base station 120 selects the APD 182 for transmit and reflection operations with the first UE 111 and selects the APD 183 for transmit and reflection operations with the second UE 112. Prior to the transmit and reflection operations, the base station 120 may send RIS and/or beam sweeping pattern information to the APD 182 or the APD 183 via the APD control channels 522 or 523. As shown in FIG. 8B, the base station 120 transmits reference signal 871 for the first UE 111 toward the APD 182 and transmits reference signal 875 for the second UE 112 toward the APD 183. Based on respective surface configurations, the APDs 182 and 183 transform the reference signals 871 and 875 to direct reflections 872 and 876 of the reference signals toward the UE 111 and UE 112. Based on the received reflections 872 and 876, the UEs 111 and 112 provide reflection information, such as reflection identifiers 506 and RSRP values 610, to the base station 120 via respective anchor connections 541 and 542. The base station 120 then determines angular information for the current combinations of APDs and UEs, which may be used to refine subsequent transmit and reflection operations (e.g., narrowed beam sweeping) and/or combined with angular information of other combinations of the APDs and UEs to enable determination of the positions of the UEs. In the context of the present example, the base station 120 advances from time slot 2 808 to time slot 3 810 to obtain additional reflection information for different combinations of the APDs and UEs.

At 875, during time slot 3 810, the base station 120 selects the APD 183 for transmit and reflection operations with the first UE 111 and selects the APD 181 for transmit and reflection operations with the second UE 112. Prior to the transmit and reflection operations, the base station 120 may send RIS and/or beam sweeping pattern information to the APD 183 or the APD 181 via the APD control channels 523 or 521. The base station 120 transmits reference signal 891 for the first UE 111 toward the APD 183 and transmits reference signal 895 for the second UE 112 toward the APD 181. Based on respective surface configurations, the APDs 183 and 181 transform the reference signals 891 and 895 to direct reflections 892 and 896 of the reference signals toward the UE 111 and UE 112. Based on the received reflections 892 and 896, the UEs 111 and 112 provide reflection information, such as reflection identifiers 506 and RSRP values 610, to the base station 120 via respective anchor connections 541 and 542. The base station 120 then determines angular information for the current combinations of APDs and UEs, which may be used to refine subsequent transmit and reflection operations (e.g., narrowed beam sweeping) and/or combined with angular information of other combinations of the APDs and UEs to enable determination of the positions of the UEs.

In the context of the present example, the base station 120 combines the angular information for the different combinations of the APDs and UEs. Because the transmit and reflection operations for the UEs 111 and 112 are performed at least partially in parallel, the base station is able to generate the angular information in much less time than if these operations were performed sequentially. Such time reductions and efficiency gains are multiplied further when using APDs to concurrently determine respective positions of three or more user equipment. Concluding the present example, the base station 120 implements triangulation and/or trilateration by using the angular information (e.g., multiple angles), to determine the position of the UE 111 and UE 112.

Signaling and Control Transactions for Using APDs to Determine a UE's Position

Various aspects of determining a position of user equipment by using adaptive phase-changing devices enable a base station to determine a position of one or more user equipment based on reflections of wireless signals. By so doing, the base station can accurately and quickly determine the position of the user equipment with low-latency, high-frequency signals (e.g., mmWave signals) with reduced multipath effects. Additionally, by using multiple adaptive phase-changing devices, a base station may determine the position of the user equipment without involvement of other network entities (e.g., other base stations) thereby reducing complexity, latency, and network overhead associated with determining user equipment positions.

FIGS. 9 through 12B provide some examples of signaling and control transactions performed between entities, such as a base station, adaptive phase-changing devices, and user equipment, to implement in accordance with one or more aspects. The described examples include determining a position of a UE using multiple APDs (e.g., FIG. 9), selecting and configuring APDs for use in determining a UE's position (e.g., FIG. 10), using an APD to beam sweep reflections of wireless signals toward a UE (e.g., FIG. 11), and using APDs to determine respective positions of multiple UEs (e.g., FIGS. 12A and 12B). Various operations described with reference to FIGS. 9 through 12B can be performed by any entity described with reference to FIGS. 1 through 8B, combined with operations of other examples of FIGS. 9 through 12B, or combined with operations of the methods illustrated in FIGS. 13 through 16. For example, a base station 120 may estimate an approximate location (e.g., initial position within 3-10 meters) of a UE 110 based on radio resource management (RRM) measurements, reported GNSS-based UE-position, or observed time difference of arrival (OTDOA). Based on the approximate location of the UE 110, the base station 120 selects a set of APDs near the approximate location and configures respective RISs the APDs to reflect signals toward the UE 110. The base station 120 may then transmit wireless signals to the configured RISs of the APDs and steer or directionally sweep reflections from each APD 180 toward the UE 110. Using feedback received from the UE 110 on a low-frequency anchor connection, such as reflection identifiers 506 and indications of signal strength (e.g., RSRP) or signal quality of the reflections, the base station 120 determines angular information for the reflections and respective APD from which the UE 110 receives the reflection. Based on the known locations of the APDs 180 and the angular information, the base station 120 can determine a position of the UE 110 with sub-meter accuracy (e.g., centimeters).

Figure 9:
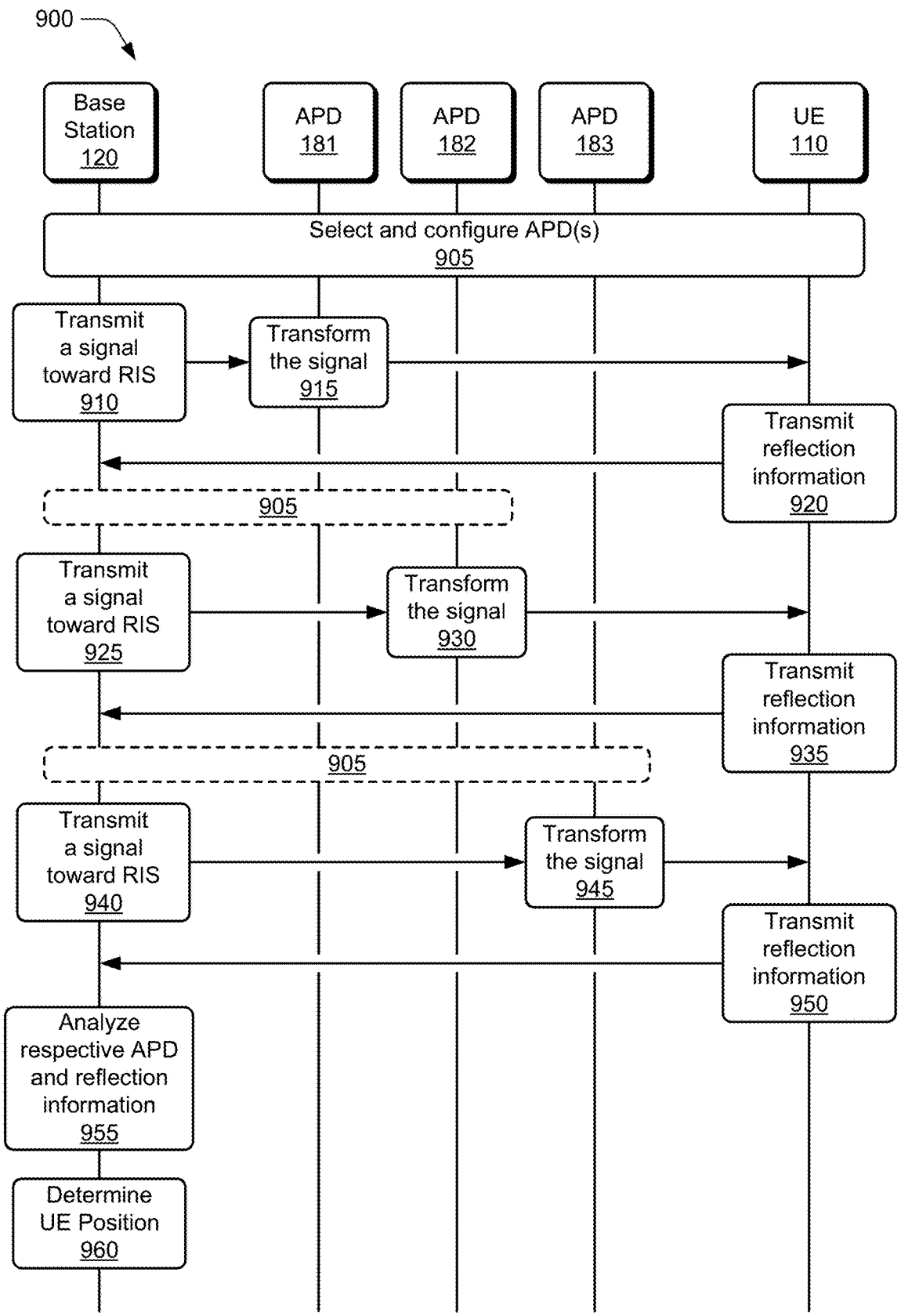
FIG. 9 illustrates example details of signaling and control transactions between entities determining a position of user equipment by using adaptive phase-changing devices in accordance with one or more aspects.

FIG. 9 illustrates at 900 example details of signaling and control transactions between entities that enable a base station 120 or APD-enabled position function 272 to determine a position of a user equipment 110 based on wireless signals reflected by APDs 180 in accordance with one or more aspects. The base station 120, the APDs 181, 182, 183, and/or the UE 110 may be implemented similar to the entities described with reference to FIGS. 1 through 8B. The example is presented in the context of determining a position of user equipment, though operations described with reference to FIG. 9 may be initiated or performed by the entities independent of determining the position of the user equipment, such as described with reference to FIGS. 9 through 12B or methods of FIGS. 13 through 16. For example, the base station 120 may select and/or configure multiple APDs 180 as described with reference to FIG. 10, FIG. 11, FIG. 14, and/or FIG. 15 before or while determining a position of user equipment.

In an example, the base station 120 selects and configures, at 905, multiple APDs 181, 182, 183 for determining a position of the UE 110. The base station 120 may select the APDs based on analyzing the one or more identifiers for the wireless signal reflections reaching the UE. In addition to analyzing the one or more reflection identifiers 506, the base station may also analyze or compare respective signal quality parameters (e.g., RSRP) for wireless signal reflections received by the UE 110. In some cases, the base stations configure the APDs by determining a surface configuration or beam sweeping pattern for one or more of the APDs 181, 182, 183.

At 910, the base station 120 transmits a wireless signal (e.g., a first wireless signal) toward an RIS of the APD 181. The wireless signal may include a reference signal or position reference signal that includes one or more identifiers (e.g., BS beam ID 502 and/or APD reflected beam ID 504) that are modulated or encoded on the wireless signal. The APD 181 transforms, at 915, the wireless signal to direct a reflection of the wireless signal toward the UE 110. In some cases, the base station 120 may use the APD 181 to beam sweep, via a selected phase vector, a reflection of the reference signal having a reflection identifier 506 toward the UE 110. In other cases, the base station may use the APD 181 to beam sweep, via a sequence phase vectors, reflections that correspond to portions the reference signal that are each encoded with a reflection identifier 506 toward the UE 110 at different respective directions or angles.

At 920, the UE 110 transmits information associated with the reflection (e.g., a first reflection) of the wireless signal that is received by the UE 110. In some cases, the UE 110 decodes or demodulates a reflection identifier 506 (e.g., BS beam ID 502 or APD reflected beam ID 504) and/or obtains one or more signal quality parameters (e.g., RSRP) for the wireless signal reflection received at the UE 110. The UE 110 then sends an indication of the reflection identifier 506 and/or one or more signal quality parameters back to the base station 120, which enables the base station 120 to determine angular information and/or estimate a distance between the APD 181 and the UE 110.

Optionally, prior to implementing operation 925, the base station 120 may implement operation 905 to select a different APD 180 or reconfigure the APD 182. For example, the base station 120 may determine that another APD with better signal performance is available for use in transmit and reflection operations. Alternatively or additionally, the base station 120 may select a different beam sweeping pattern or refine (e.g., narrow) a current selected beam sweeping pattern of the APD 182 based on a revised estimate of the location of the UE 110 (e.g., by analyzing previously received reflection information or non-APD UE-position information).

At 925, the base station transmits a wireless signal (e.g., a second wireless signal) toward an RIS of the APD 182. The wireless signal may include a reference signal or position reference signal that includes one or more identifiers (e.g., BS beam IDs 502) that are modulated or encoded on the wireless signal. The APD 182 transforms, at 930, the wireless signal to direct a reflection of the wireless signal toward the UE 110. In some cases, the base station 120 may use the APD 182 to beam sweep, via a selected phase vector, a reflection of the reference signal having a single reflection identifier 506 toward the UE 110. In other cases, the base station may use the APD 182 to beam sweep, via a sequence phase vectors, reflections that correspond to portions of the reference signal that are each encoded with a reflection identifier 506 toward the UE 110 at different respective directions or angles.

At 935, the UE 110 transmits information associated with the reflection (e.g., a second reflection) of the wireless signal that is received by the UE 110. In some cases, the UE 110 decodes or demodulates a reflection identifier 506 and/or obtains one or more signal quality parameters (e.g., RSRP) for the wireless signal reflection received at the UE 110. The UE 110 then sends an indication of the reflection identifier 506 and/or one or more signal quality parameters back to the base station 120, which enables the base station 120 to determine angular information and/or estimate a distance between the APD 182 and the UE 110.

Optionally, prior to implementing operation 940, the base station 120 may implement operation 905 to select a different APD 180 or reconfigure the APD 183. For example, the base station 120 may determine that another APD with better signal performance is available for use in transmit and reflection operations. Alternatively or additionally, the base station 120 may select a different beam sweeping pattern or refine (e.g., narrow) a current selected beam sweeping pattern of the APD 183 based on a revised estimate of the location of the UE 110.

At 940, the base station transmits a wireless signal (e.g., a third wireless signal) toward an RIS of the APD 182. The wireless signal may include a reference signal or position reference signal that includes one or more identifiers (e.g., BS beam IDs 502) that are modulated or encoded on the wireless signal. The APD 183 transforms, at 945, the wireless signal to direct a reflection of the wireless signal toward the UE 110. In some cases, the base station 120 may use the APD 183 to beam sweep, via a selected phase vector, a reflection of the reference signal having a single reflection identifier 506 toward the UE 110. In other cases, the base station may use the APD 183 to beam sweep, via a sequence phase vectors, reflections that correspond to portions of the reference signal that are each encoded with a reflection identifier 506 toward the UE 110 at different respective directions or angles.

At 950, the UE 110 transmits information associated with the reflection (e.g., a third reflection) of the wireless signal that is received by the UE 110. In some cases, the UE 110 decodes or demodulates a reflection identifier 506 and/or obtains one or more signal quality parameters (e.g., RSRP) for the wireless signal reflection received at the UE 110. The UE 110 then sends an indication of the reflection identifier 506 and/or one or more signal quality parameters back to the base station 120, which enables the base station 120 to determine angular information and/or estimate a distance between the APD 183 and the UE 110.

The base station 120 analyzes, at 955, respective APD and reflection information to determine angular information for the reflections of the wireless signals that reach the UE 110. Based on an analysis of the reflection identifiers 506 and/or signal quality parameters for the reflections reaching the UE 110, the base station can determine which surface configurations (e.g., phase vectors) are associated with those reflections received by the UE 110. The surface configurations may be calibrated or predetermined to correspond to respective angles of reflection, which the base station uses to determine angular information for the reflections of the wireless signals received by the UE 110. Alternatively or additionally, the base station can use the signal quality parameters, such as the RSRP values of the reflections, in the determination of the angular information for an APD 180 and/or to estimate distance between the APDs 181, 182, and/or 183 and the UE 110.

At 960, the base station 120 determines a position of the UE 110 based on the angular information determined for the APDs 181, 182, and 183. Alternatively or additionally, the base station 120 may determine the position by using non-APD position information, such as UE-position information based on low-band base station-UE communication or a UE-reported GNSS-based position of the UE 110. The angular information derived from the APD reflections may indicate relative angles and/or distances between the APDs 181, 182, 183 and the UE 110. Using the angular information and known locations of the multiple APDs 181, 182, and 183, and optionally other non-APD-based supplemental position information, the base station triangulates and/or trilaterates a position of the UE 110.

Figure 10:
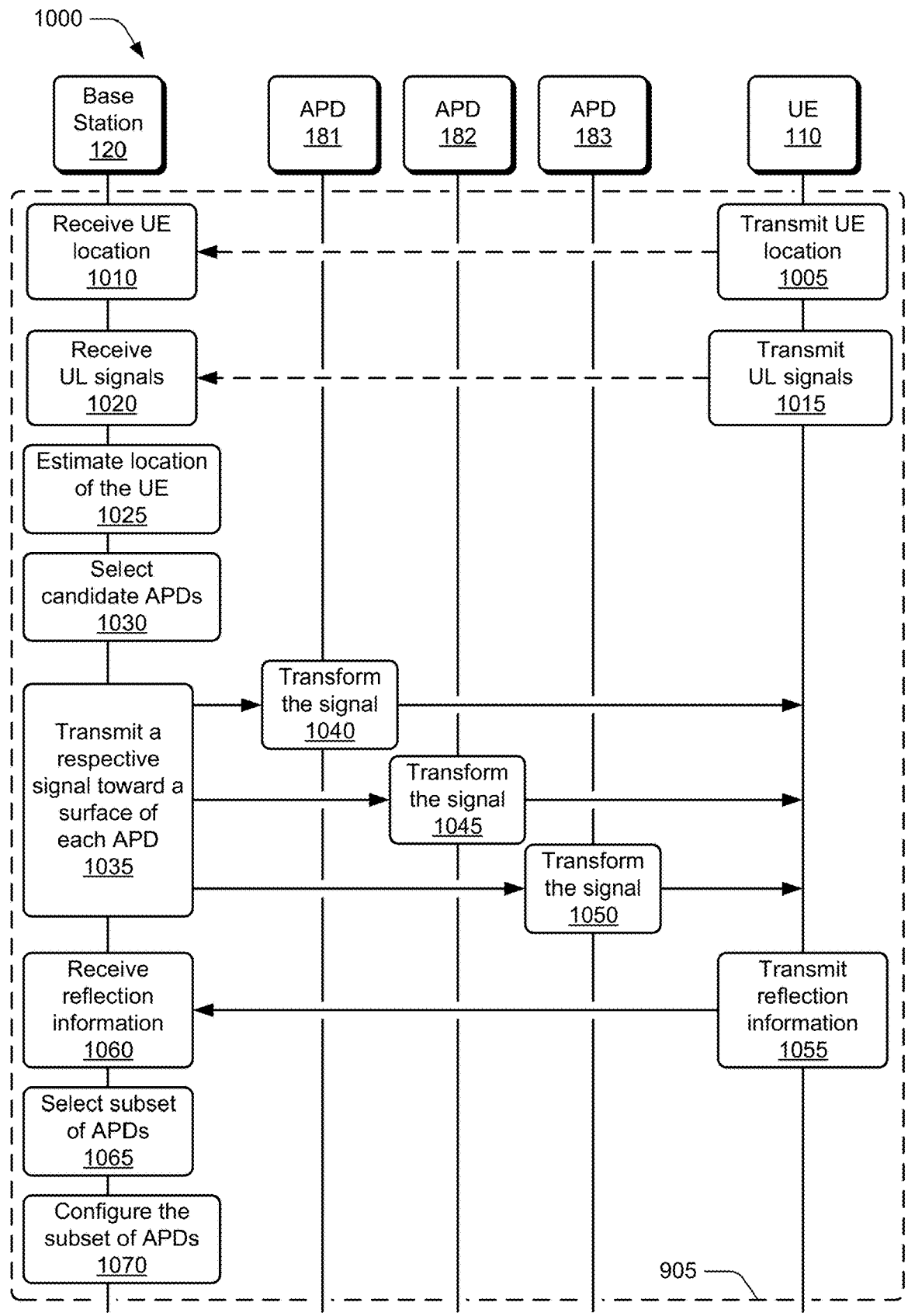
FIG. 10 illustrates example details of signaling and control transactions between entities selecting and configuring a set of adaptive phase-changing devices for use in determining a position of user equipment in accordance with one or more aspects.

FIG. 10 illustrates at 1000 example details of signaling and control transactions between entities that enable a base station 120 to select and/or configure multiple adaptive phase-changing devices for use in determining a position of user equipment in accordance with one or more aspects. The base station 120, the APDs 181, 182, and 183, and/or the UE 110 may be implemented similar to the entities described with reference to FIGS. 1 through 8A. The example is presented in the context of a base station selecting or configuring adaptive phase-changing devices, though operations described with reference to FIG. 10 may be initiated or performed by the entities independent of determining a position of user equipment, such as described with reference to FIG. 9, FIG. 11, FIGS. 12A and 12B, or methods of FIGS. 13 through 16. For example, a base station 120 may implement the operations of FIG. 10 to select and/or configure multiple APDs 180 and then determine a position of user equipment or perform beam sweeping operations as described with reference to FIG. 9, FIGS. 11 through 13, FIG. 15, and/or FIG. 16.

In an example, the user equipment 110 optionally transmits a UE location to the base station 120 at 1005. The UE 110 may transmit an indication of an approximate UE location (e.g., within 3 meters), such as one obtained via a GNSS sensor or GPS receiver of the UE 110. The base station 120 receives, at 1010, the indication of the approximate UE location from the UE 110.

Optionally at 1015, the user equipment 110 transmits uplink (UL) signals to the base station 120, which may include uplink reference signals or sounding reference signals (SRS) transmitted by the UE 110. At 1020, the base station 120 receives the UL signals transmitted by the UE 110 and/or transmits additional downlink (DL) signals to the UE 111 (e.g., DL PRS, not shown). In some aspects, the UE 110 and/or base station 120 communicate one or more reference signals (e.g., DL PRS and/or UL SRS) or any other suitable wireless signals that yield measurements for estimating an approximate location of the UE (e.g., initial UE-position). For example, the base station and/or UE 110 may measure one or more of an uplink angle-of-arrival (UL-AOA), uplink time difference of arrival (UL-TDOA), uplink relative time of arrival (UL-RTOA), downlink time difference of arrival (DL-TDOA), downlink reference signal time difference (DL RSTD), downlink angle-of-departure (DL-AoD), multi-cell round trip time (RTT), or enhanced cell ID (E-CID) based on radio resource management (RRM) measurements.

At 1025, the base station 120 estimates a location of the UE 110 based on information provided by one or more of operations 1005, 1010, 1015, and/or 1020. The base station may estimate the UE-location based on the indication of UE location received from the UE 110. Alternatively or additionally, the base station 120 may estimate the location of the UE 110 based on one or more of the UL-AOA, UL-TDOA, UL-RTOA, DL-TDOA, DL RSTD, DL-AOD, multi-cell RTT, or E-CID as determined by communications between the UE 110 and the base station 120 and/or other base stations. Alternatively or an addition, the base station 120 may generate non-APD position information useful to refine or narrow down the position of the UE. In some cases, the base station 120 augments the non-APD-based position information with APD-based position information to accurately determine or resolve the position of the UE 110.

At 1030, the base station 120 selects a set of multiple candidate APDs to evaluate for potential use in determining a position of user equipment. The set of multiple candidate APDs includes at least two APDs. The base station 120 may select the candidate APDs based on proximity with the estimated location of the UE 110. Alternatively or additionally, the base station 120 can query a server for position information and/or capabilities of APDs proximate the UE 110, such as by contacting a server included in the core network 150 of FIG. 1.

At 1035, the base station transmits a respective wireless signal (e.g., reference signal) toward a surface of each APD of the set of candidate APDs. The base station 120 transmits a respective signal toward a surface of each APD in the set of candidate APDs 181, 182, and 183 and other proximate candidate APDs. In aspects, the base station 120 modulates a different BS beam ID 502 and/or APD reflected beam ID 504 on the respective wireless signal transmitted to each of candidate APD. By so doing, the base station 120 may determine, based on feedback from the UE 110, whether reflections of a particular candidate APD reach the UE 110.

At 1040, the APD 181 transforms the wireless signal transmitted by the base station 120 to direct a reflection of the wireless signal toward the UE 110. In some cases, the base station 120 may use the APD 181 to steer, via a selected phase vector, the wireless signal toward the UE 110. At 1045, the APD 182 transforms the wireless signal transmitted by the base station 120 to direct a reflection of the wireless signal toward the UE 110. In some cases, the base station 120 may use the APD 182 to steer, via a selected phase vector, the wireless signal toward the UE 110. At 1050, the APD 183 transforms the wireless signal transmitted by the base station 120 to direct a reflection of the wireless signal toward the UE 110. In some cases, the base station 120 may use the APD 183 to steer, via a selected phase vector, the wireless signal toward the UE 110. Alternatively or in addition, an APD 180 may modulate an APD beam ID 502 onto a respective reflection, such that an identifier of the reflection includes information provided by the BS beam ID of the base station 120 and/or the APD reflected beam ID 504 provided by an APD 180.

At 1055, the UE 110 transmits reflection information to the base station 120. For reflections reaching the UE 110, the UE 110 can decode or demodulate a reflection identifier 506 and/or obtains at least one signal quality parameter (e.g., RSRP) for one or more of the reflections received from respective ones of the candidate APDs. The UE 110 then sends an indication of the reflection identifier 506 and/or the signal quality parameters back to the base station 120, which enables the base station 120 to determine which candidate APDs' reflections are able to reach the UE 110 and/or an associated signal strength of the reflections.

At 1060, the base station 120 receives the reflection information transmitted by the UE 110. As noted, the reflection information may include reflection identifiers 506 and/or the signal quality parameters for reflection provided by the candidate APDs. At 1065, the base station selects, from the set of multiple candidate APDs, a subset of at least two APDs for use in determining a position of user equipment. In some cases, the base station analyzes the RSRP level of the reflections provided by the candidate APDs and determines that the RSRP level meets a predefined threshold value. In response to determining the RSRP level meets the threshold value, the base station 120 determines to include the particular APD in the subset. Alternatively, if the RSRP level does not meet the threshold, the base station may exclude the APD from the subset or reconfigure the APD (e.g., an RIS configuration) and transmit another wireless signal to determine whether the reconfigured APD's performance improves sufficiently for use in position-determining operations.

At 1070, the base station configures the subset of APDs. In some aspects, the base station 120 determines a respective RIS configuration for each selected APD and directs each APD to apply the respective RIS configuration to a respective RIS as described with reference to FIGS. 4A through 7. Alternatively or additionally, the base station may select a beam sweeping pattern for one or more of the selected APDs and send an indication (e.g., beam sweeping index) to the selected APDs of the selected beam sweeping pattern, such as described with reference to FIGS. 6A and 6B or FIGS. 8A and 8B.

Figure 11:
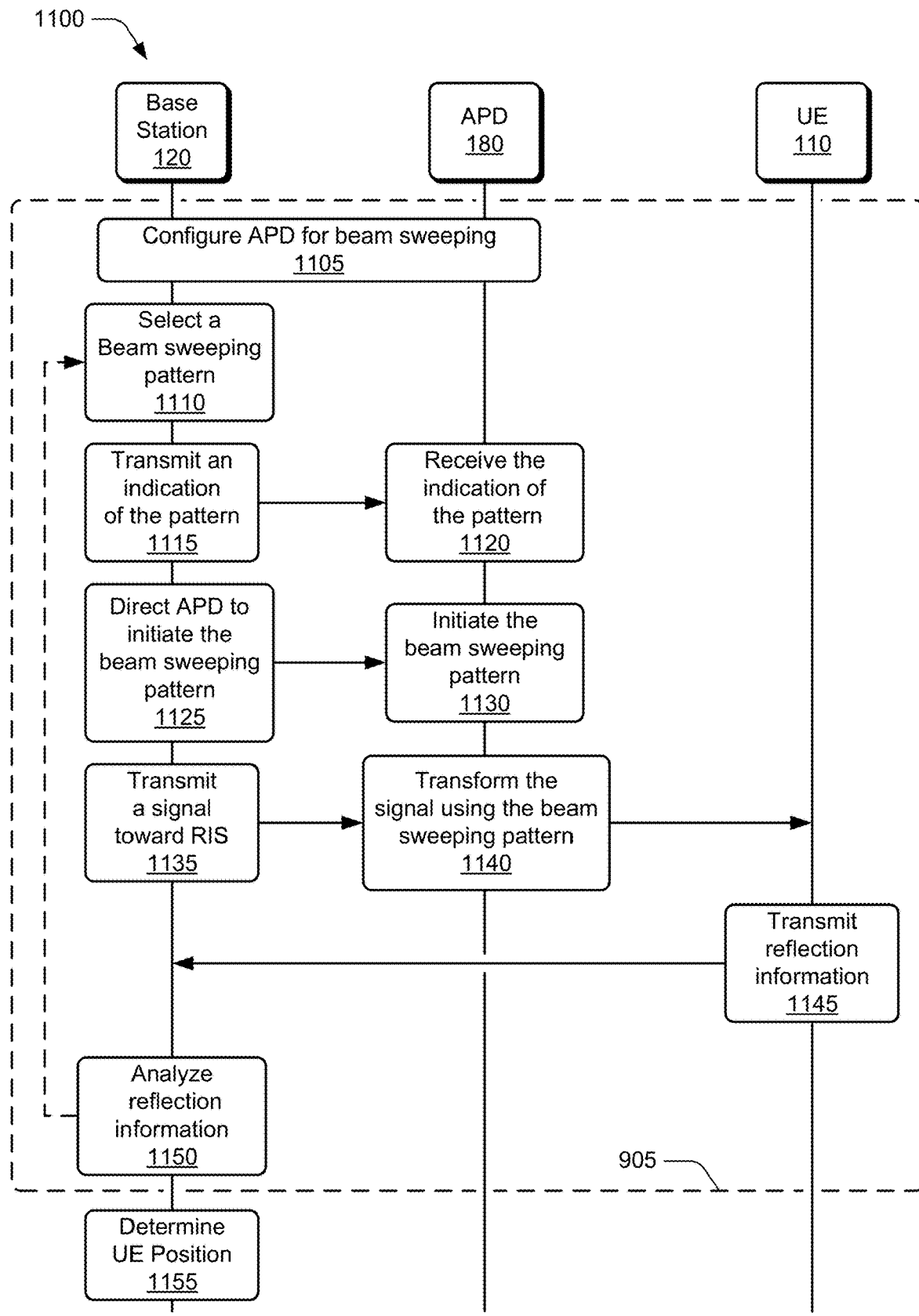
FIG. 11 illustrates example details of signaling and control transactions between devices using an adaptive phase-changing device to beam sweep reflections of a wireless signal toward user equipment in accordance with one or more aspects.

FIG. 11 illustrates at 1100 example details of signaling and control transactions between entities that enable a base station 120 to use an adaptive phase-changing device to beam sweep reflections of a wireless signal toward user equipment in accordance with one or more aspects. The base station 120, the APDs 181, 182, and 183, and/or the UE 110 may be implemented similar to the entities described with reference to FIGS. 1 through 8B. The example is presented in the context of beam sweeping reflections of a wireless signal toward user equipment, though operations described with reference to FIG. 11 may be initiated or performed by the entities independent of determining a position of user equipment, such as described with reference to FIG. 9, FIG. 10, FIGS. 12A and 12B, or methods of FIGS. 13 through 16. For example, a base station 120 may implement the operations of FIG. 11 to beam sweep reflections of a wireless signal in order to select APDs 180 or determine a position of the user equipment 110 as described with reference to FIG. 9, FIG. 10, FIGS. 12A through 14, and/or FIG. 16.

In an example, the base station 120 configures, at 1105, the APD 180 for beam sweeping. In some cases, the base station 120 sends one or more beam sweeping pattern codebooks to the APD 180. Alternatively or additionally, the base station 120 may reposition or reorient a surface or RIS of the APD 180 based on an approximate location of the UE 110.

At 1110, the base station 120 selects a beam sweeping pattern for the APD 180. In some cases, the beam sweeping pattern is selected based on an estimated location of a UE or using a revised estimation of the location of the UE. The selected beam sweeping pattern may be configured to implement a directional sweep of wireless signal reflections in a horizontal or vertical direction. Alternatively or additionally, the base station 120 may select a broad or narrow beam sweeping pattern preconfigured to span or sweep a corresponding spatial region.

At 1115, the base station 120 transmits an indication of the beam sweeping pattern to the APD 180. In aspects, the base station transmits a beam sweeping pattern index to the APD 180 via the APD control channel 520, such as described with reference to FIG. 6A or 6B. The beam sweeping index 602 may indicate or convey to the APD 180 which beam sweeping codebook, beam sweeping pattern, APD reflected beam IDs, or phase vector sequence to use when implementing beam sweeping of incident wireless signals (e.g., BS-originated reference signals or PRS).

At 1120, the APD receives the indication of the selected beam sweeping pattern transmitted by the base station 120. Based on the beam sweeping index, an APD manager 320 of the APD can access a beam sweeping codebook of the APD and select a corresponding beam sweeping pattern for use in directing or steering reflections of incident signals. In some cases, the parameters of the selected beam sweeping pattern are loaded into a memory of the APD 180. Execution of the beam sweeping pattern may be scheduled for a timeslot selected by the base station 120. Alternatively or additionally, the APD 180 may implement or initiate the beam sweeping pattern in response to a synchronization field or preamble of an incident reference signal transmitted by the base station 120, which may be received via a receiver of the APD 180.

At 1125, the base station 120 directs the APD 180 to initiate the beam sweeping pattern. The base station 120 may direct the APD to initiate, at a predefined time, the beam sweeping pattern to configure the RIS of the APD in accordance with the beam sweeping pattern. Alternatively, the base station 120 may use an APD control channel to initiate the beam sweeping pattern or use a synchronization field or preamble modulated onto a reference signal transmitted to the APD 180. At 1130, the APD 180 initiates the beam sweeping pattern in response to direction of the base station 120.

At 1135, the base station 120 transmits a wireless signal toward the RIS of the APD 180. In some cases, the base station transmits one or more reference signals toward the RIS of the APD 180. The base station 120 may also modulate the wireless signal with a BS beam ID 502 that corresponds to an identifier of a reflection resulting from a transformation of the wireless signal by the APD. In such cases, transmission of the wireless signal can be synchronized with implementation of the beam sweeping pattern by the APD 180 to direct identifiable reflections in accordance with the beam sweeping pattern. At 1140, the APD 180 transforms, via the RIS, the wireless signal using or in accordance with the beam sweeping pattern. In aspects, this enables the base station 120 to use the APD 180 to beam sweep, via one or more selected phase vectors, identifiable reflections (e.g., reflection identifiers 506) of the wireless signal toward the UE 110.

At 1145, the UE 110 transmits reflection information to the base station 120. For beamformed reflections that reach the UE 110, the UE 110 can decode or demodulate a reflection identifier 506 and/or obtain at least one signal quality parameter (e.g., RSRP) for one or more of the reflections. The UE 110 then sends an indication of the reflection identifier 506 and/or the signal quality parameters back to the base station 120, which enables the base station 120 to determine angular information and/or estimate distance information between the APD 180 and the UE 110.

At 1150, the base station analyzes the reflection information received from the UE 110. The base station may also analyze APD information to determine angular information for the reflections of the wireless signals that reach the UE 110 from the APD 180. In some cases, the base station 120 updates or revises an estimated location for the UE 110 based on the angular information of one or two APDs before determining a position of the UE 110. In such cases, the base station 120 may select, based on the updated estimated position, a beam sweeping pattern for a next iteration of beam sweeping implemented by returning to 1110. Alternatively or additionally, the base station 120 can reduce a number of phase vectors in the beam sweeping pattern to narrow the beam sweeping pattern (e.g., from 70 degrees to 30 degrees) based on the updated estimated position of the user equipment.

In some aspects, after multiple iterations of operations 1110 through 1150 to determine angular information for multiple APDs 180, the base station determines, at 1155, a position of the UE 110 with respective angular information for the APD 180 and other APDs. The angular information may indicate relative angles and/or estimated distances between the at least two APDs 180 (e.g., three APDs 180) and the UE 110. Using the angular information, estimated distances, and/or known locations of the multiple APDs 180, and optionally non-APD-based position information, the base station triangulates and/or trilaterates a position of the UE 110.

Figure 12A:
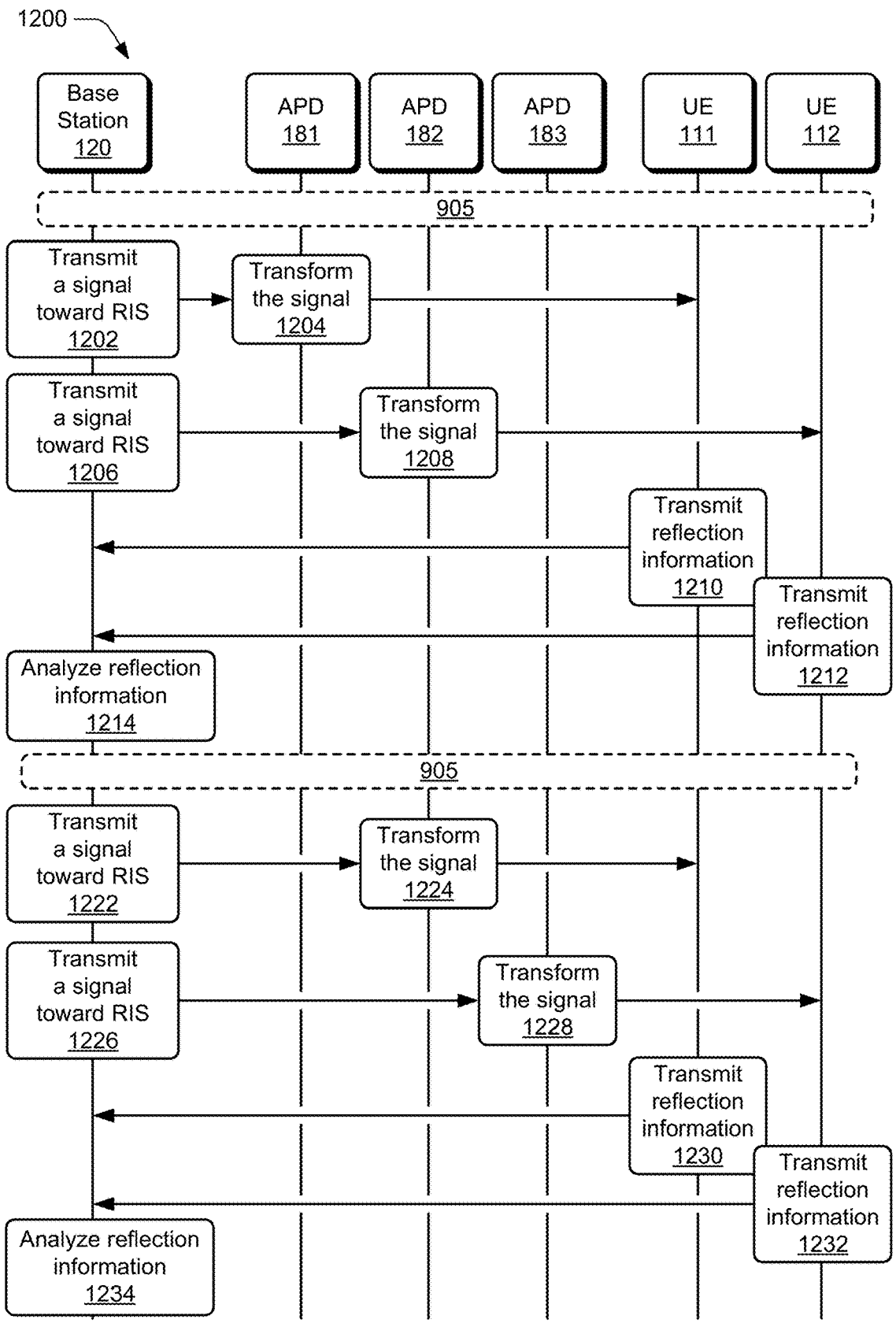
FIGS. 12A and 12B illustrate example details of signaling and control transactions between devices using adaptive phase-changing devices to determine respective positions of multiple user equipment.
Figure 12B:
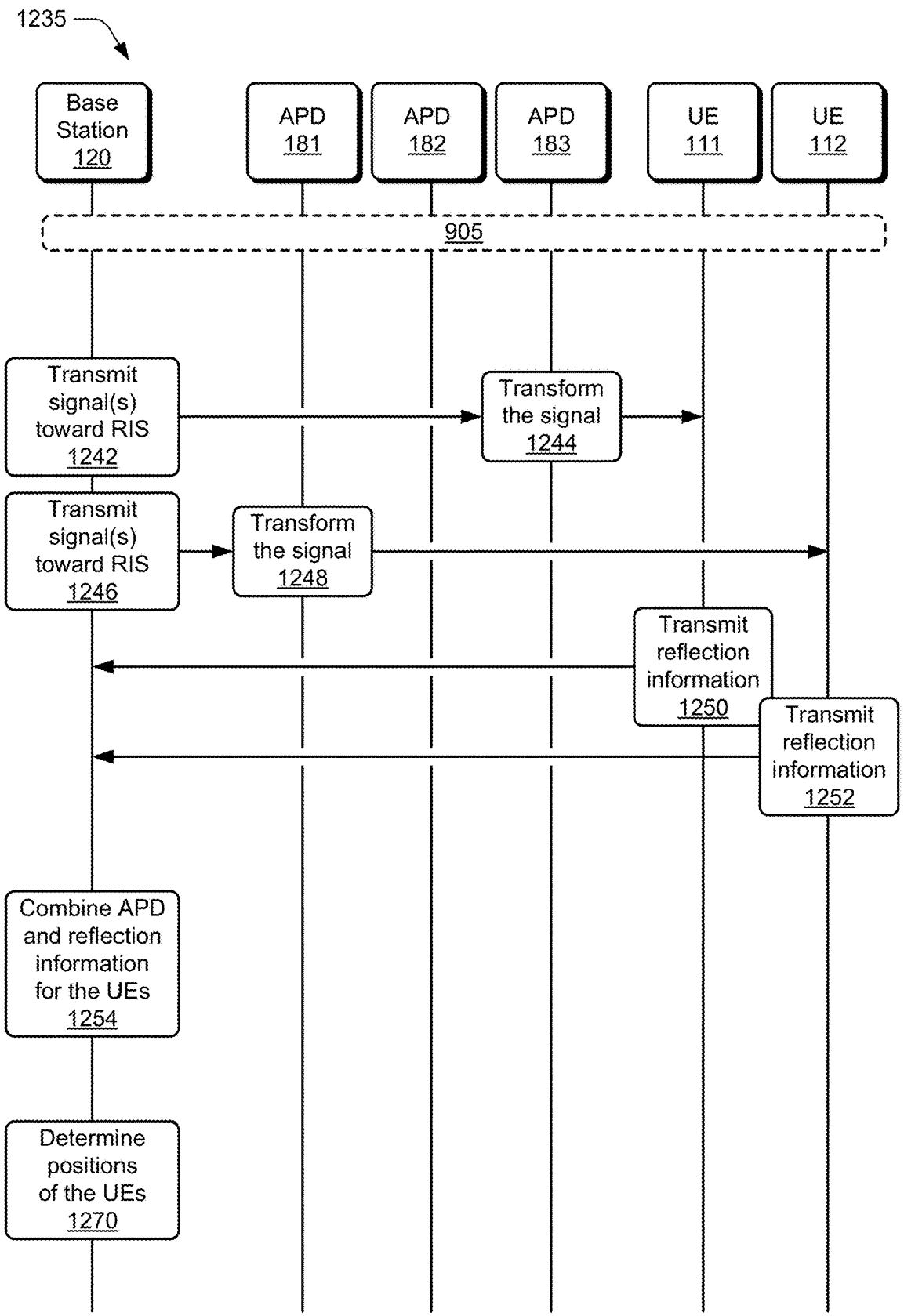

FIGS. 12A and 12B illustrate at 1200 and 1235 example details of signaling and control transactions between entities that enable a base station to use adaptive phase-changing devices to determine respective positions of multiple user equipment in accordance with one or more aspects. The base station 120, the APDs 181, 182, and 183, and/or the UEs 111 and 112 may be implemented similar to the entities described with reference to FIGS. 1 through 8B. The example is presented in the context of concurrently performing at least some operations to determine positions of multiple user equipment, though operations described with reference to FIGS. 12A and 12B may be initiated or performed by the entities independent of determining respective positions of multiple UEs, such as described with reference to FIGS. 9 through 11 or methods of FIGS. 13 through 16. For example, the base station 120 may select and/or configure multiple APDs 180 as described with reference to FIG. 10, FIG. 11, FIG. 14, and/or FIG. 15 before or while implementing operations to determine positions of multiple UEs with the APDs.

In an example, the base station 120 selects and configures, at 905, multiple APDs 181, 182, and 183 for determining positions of the UE 111 and the UE 112. The base station 120 may select the APDs based on analyzing the one or more identifiers 506 and/or respective signal quality parameters (e.g., RSRP) for wireless signal reflections received by the UEs 111 and 112. Alternatively or additionally, the base station configures the APDs by determining a surface configuration or beam sweeping pattern for one or more of the APDs 181, 182, and 183.

At 1202, the base station 120 transmits a wireless signal (e.g., a reference signal) toward an RIS of the APD 181. The APD 181 transforms, at 1204, the wireless signal to direct a reflection of the wireless signal toward the UE 111. In some cases, the base station 120 may use the APD 181 to beam sweep, via a selected phase vector, a reflection of the reference signal having a reflection identifier 506 toward the UE 111. At 1206, the base station 120 transmits a wireless signal (e.g., a reference signal) toward an RIS of the APD 182. The APD 182 transforms, at 1208, the wireless signal to direct a reflection of the wireless signal toward the UE 112. In some implementations, the base station 120 may use the APD 182 to beam sweep, via a selected phase vector, a reflection of the reference signal having a reflection identifier 506 toward the UE 112.

At 1210 and 1212, the UEs 111 and 112 transmit information associated with the reflections of the wireless signals received by the UEs 111 and 112. In some cases, the UEs 111 and 112 decode or demodulate a reflection identifier 506 and/or obtain one or more signal quality parameters (e.g., RSRP) for the respective wireless signal reflections received at the UEs 111 and 112. The UEs 111 and 112 then send respective indications of the reflection identifier 506 and/or one or more signal quality parameters back to the base station 120, which enables the base station 120 to determine angular information and/or estimate a distance between the APD 181 and the UE 111 and/or between the APD 182 and the UE 112.

At 1214, the base station analyzes the reflection information received from the UEs 111 and 112. The base station may analyze the reflection information and respective APD information (e.g., APD position) to determine angular information for the reflections of the wireless signals that reach the UE 111 and/or the UE 112. Based on an analysis of the reflection identifiers 506 (e.g., BS beam IDs 502 and/or APD reflected beam IDs 504) and/or signal quality parameters for the reflections reaching the UEs 111 and/or 112, the base station can determine which surface configurations (e.g., phase vectors) are associated with those reflections received by the UEs. The surface configurations may be calibrated or predetermined to correspond to specific angles of reflection, which the base station uses to determine angular information for the reflections of the wireless signals received by the UEs 111 and/or 112 from the APDs 181 and 182.

Optionally, prior to implementing operation 1222, the base station 120 may implement operation 905 to select different APD 180s or reconfigure the APDs 182 and 183. For example, the base station 120 may determine that another APD with better signal performance is available for use in transmit and reflection operations. Alternatively or additionally, the base station 120 may select a different beam sweeping pattern or refine (e.g., narrow) a current selected beam sweeping pattern of the APDs 182 and 183 based on a revised estimate of the location of the UE 110 (e.g., updated based on analysis of previously received reflection information at 1214).

At 1222, the base station 120 transmits a wireless signal (e.g., a reference signal) toward an RIS of the APD 182. The APD 182 transforms, at 1224, the wireless signal to direct a reflection of the wireless signal toward the UE 111. In some cases, the base station 120 may use the APD 182 to beam sweep, via a selected phase vector, a reflection of the reference signal having a reflection identifier 506 based on a BS beam ID 502 and/or APD reflected beam ID 504 toward the UE 111. At 1226, the base station 120 transmits a wireless signal (e.g., a reference signal) toward an RIS of the APD 183. The APD 183 transforms, at 1228, the wireless signal to direct a reflection of the wireless signal toward the UE 112. In some cases, the base station 120 may use the APD 183 to beam sweep, via a selected phase vector, a reference signal having a reflection identifier 506 toward the UE 112.

At 1230 and 1232, the UEs 111 and 112 transmit information associated with the reflections of the wireless signals received by the UEs 111 and 112. In some cases, the UEs 111 and 112 decode or demodulate a reflection identifier 506 and/or obtain one or more signal quality parameters (e.g., RSRP) for the respective wireless signal reflections received at the UEs 111 and 112. The UEs 111 and 112 then send respective indications of the reflection identifiers 506 and/or one or more signal quality parameters back to the base station 120, which enables the base station 120 to determine angular information and/or estimate a distance between the APD 182 and the UE 111 and/or between the APD 183 and the UE 112.

At 1234, the base station analyzes the reflection information received from the UEs 111 and 112. The base station may analyze the reflection information and respective APD information to determine angular information for the reflections of the wireless signals that reach the UE 111 and/or the UE 112, such as described with reference to operation 1214 or FIG. 5. Generally, the base station uses the reflection information to determine angular information for the reflections of the wireless signals received by the UEs 111 and/or 112 from the APDs 182 and 183.

Optionally, prior to implementing operation 1242, the base station 120 may implement operation 905 to select different APD 180s or reconfigure the APDs 181 and 183. For example, the base station 120 may select a different beam sweeping pattern or refine (e.g., narrow) a current selected beam sweeping pattern of the APDs 181 and 183 based on a revised estimate of the location of the UE 110 (e.g., updated based on analysis of previously received reflection information at 1234).

At 1242, the base station 120 transmits a wireless signal (e.g., a reference signal) toward an RIS of the APD 183. The APD 183 transforms, at 1244, the wireless signal to direct a reflection of the wireless signal toward the UE 111. In some cases, the base station 120 may use the APD 183 to beam sweep, via a selected phase vector, a reflection of the reference signal having a reflection identifier 506 toward the UE 111. At 1246, the base station 120 transmits a wireless signal (e.g., a reference signal) toward an RIS of the APD 181. The APD 181 transforms, at 1248, the wireless signal to direct a reflection of the wireless signal toward the UE 112. In some cases, the base station 120 may use the APD 181 to beam sweep, via a selected phase vector, a reflection of the reference signal having a reflection identifier 506 toward the UE 112.

At 1250 and 1252, the UEs 111 and 112 transmit information associated with the reflections of the wireless signals received by the UEs 111 and 112. In some cases, the UEs 111 and 112 decode or demodulate a reflection identifier 506 and/or obtain one or more signal quality parameters (e.g., RSRP) for the respective wireless signal reflections received at the UEs 111 and 112. The UEs 111 and 112 then send respective indications of the reflection identifiers 506 and/or one or more signal quality parameters back to the base station 120, which enables the base station 120 to determine angular information and/or estimate a distance between the APD 183 and the UE 111 and/or between the APD 181 and the UE 112.

At 1254, the base station combines the APD and reflection information for the UEs 111 and 112. The base station may also analyze the reflection information sent by the UEs 111 and 112 at 1250 and 1252, as well as respective APD information to determine angular information for the reflections of the wireless signals that reach the UE 111 and/or the UE 112. At 1270, the base station 120 determines the positions of the UEs 111 and 112 based on the known positions of the APDs 181, 182, and 183 and the angular information. Optionally, the base station 120 may also use non-APD-based position information (e.g., angle-of-arrival, timing advance values, or RSRP of base station-UE communications) to aid in the computation of the position of the UE 110. The angular information may indicate relative angles and/or distances between the APDs 181, 182, and 183 and the UEs 111 and 112. Using the angular information and known locations of the multiple APDs 181, 182, and 183, the base station triangulates and/or trilaterates respective positions of the UE 111 and UE 112.

Example Methods for Determining a Position of a UE by Using APDs

Example methods 1300-1600 are described with reference to FIGS. 13 through 16 in accordance with one or more aspects of determining a position of user equipment by using adaptive phase-changing devices. The order in which the method blocks are described are not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 13:
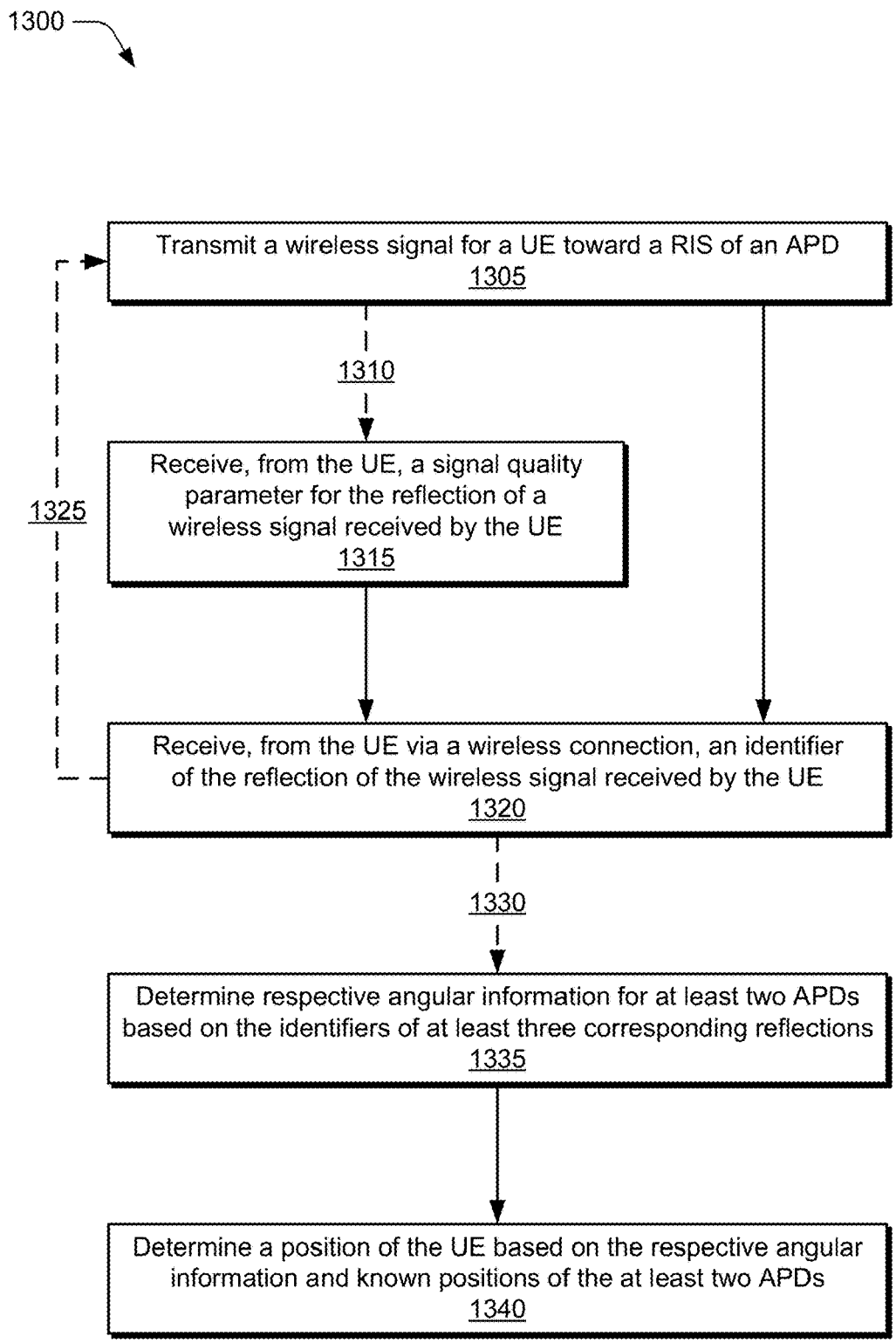
FIG. 13 illustrates an example method for determining a position of a user equipment by using adaptive phase-changing devices in accordance with one or more aspects.

FIG. 13 illustrates an example method 1300 for determining a position of a user equipment by using adaptive phase-changing devices in accordance with one or more aspects. In various implementations, operations of the method 1300 are performed by or using a base station, APD, or APD-enabled position function, such as the base station 120, APDs 180, and/or APF 272 as described with reference to any of FIGS. 1 through 12B. At times, aspects of the method 1300 operate in conjunction with aspects of the method 1400, the method 1500, and/or the method 1600.

At block 1305, the base station transmits a wireless signal for a user equipment (UE) toward a reconfigurable intelligent surface (RIS) of an adaptive phase-changing device (APD). The wireless signal may include a reference signal that the base station modulates or encodes with one or more identifiers (e.g., BS beam IDs 502). For example, and in the context of FIG. 7, the base station 120 transmits a wireless signal (e.g., reference signal 731) toward the APD 181. In some aspects, the base station transmits the wireless signal for the user equipment by implementing operations as described with reference to FIG. 9. From block 1305, the method 1300 may proceed at block 1310 to optionally receive signal quality parameters for a reflection received by the UE at block 1315. Alternatively, the method 1300 may proceed from block 1305 directly to block 1320.

Optionally at block 1315, in response to transmitting the wireless signal, the base station receives, from the UE, a signal quality parameter (e.g., RSRP) of a reflection of the wireless signal that is received by the UE. In some cases, the signal quality parameter is received from the UE via a low-band anchor connection. The signal quality parameter for the reflection may include one of a received signal strength indicator (RSSI) level, signal-to-interference-plus-noise ratio (SINR), or reference signal received power (RSRP) determined by the UE based on reception of the reflection of the wireless signal. In some aspects, the base station receives the signal quality parameters of the reflection when the base station and/or UE implement operations as described with reference to FIG. 9.

At block 1320, in response to transmitting the wireless signal, the base station receives, from the UE, an identifier of a reflection (e.g., reflection identifier 506) of the wireless signal received by the UE. In some cases, the identifier is received from the UE via a low-band anchor connection. The identifier of the reflection of the wireless signal may include a BS beam ID and/or APD beam ID as described with reference to any of FIGS. 5A through 6B. For example, the base station 120 receives, from the UE 110 via the anchor connection 540, a reflection identifier that corresponds to a BS beam ID for reflection 532 that reaches the UE 110. In some aspects, the base station receives the identifier of the reflection when the base station and/or UE implement operations as described with reference to FIG. 9.

In aspects, the base station iteratively transmits wireless signals toward respective RISs of different APDs, and iteratively receives identifiers and/or signal quality parameters of reflections of the wireless signals that are received by the UE. Accordingly, the method 1300 may proceed at 1325 and return to block 1305 to implement another iteration of transmitting a wireless signal and obtaining identifier(s) and signal quality feedback for reflections of the signal that reach the UE.

For example, in the context of iterating blocks 1305, 1315, and 1320, the base station 120 transmits a first wireless signal toward an RIS of a first APD 181 and receives a first identifier 506 and RSRP of a first reflection, such as described with reference to 910 and 920 of FIG. 9. The base station 120 then transmits a second wireless signal toward an RIS of a second APD 182 and receives a second identifier 506 and RSRP of a second reflection as described with reference to 925 and 935 of FIG. 9. Next, in some cases, the base station 120 also transmits a third wireless signal toward an RIS of a third APD 183 and receives a third identifier 506 and RSRP of a third reflection as described with reference to 940 and 950 of FIG. 9, and so forth. While the method 1300 illustrates a sequential progression from block 1305, 1315, and 1320 to either 1325 to perform another iteration or to 1330 to determine angular information, the base station sometimes implements the operations of the blocks 1305, 1315, 1320 and block 1335 to occur concurrently and/or contemporaneously using multiple APDs. To illustrate, the base station may concurrently determine angular information for one APD while the transmitter of the base station transmits wireless signals to an RIS of a next APD in the iterative series of operations. Thus, the base station 120 may use angular information or a revised location of the UE to update or alter scheduled transmissions for other APDs, such as by selecting an appropriate beam sweeping pattern or reducing a spatial area covered by a beam sweeping pattern.

In some aspects, the method optionally proceeds from the block 1320 at 1330 to block 1335, where the base station determines respective angular information for at least two APDs. The base station or APF 272 may also combine respective angular information for the at least two APDs and optionally non-APD-based position information (e.g., GNSS information of the UE 110). For example, the base station 120 determines the angular information by analyzing respective reflection information associated with at least two APDs as described with reference to 955 of FIG. 9. At block 1350, the base station determines a position of the UE based on the respective angular information and known positions of the at least two APDs. For example, the base station 120 determines the position of the UE 110 based on the respective angular information and known positions of three APDs, which include the APDs 181, 182, and 183 as described with reference to 960 of FIG. 9.

Figure 14:
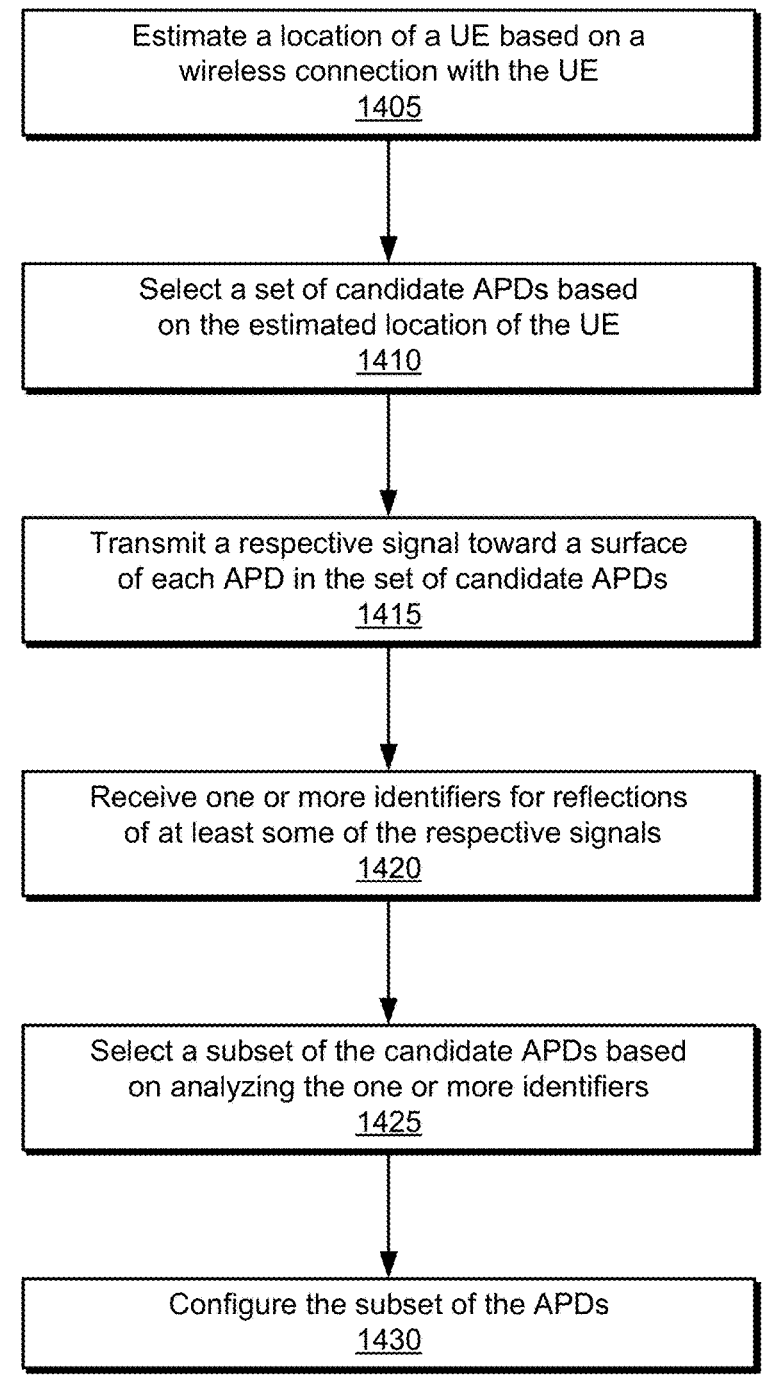
FIG. 14 illustrates an example method for selecting and configuring a subset of adaptive phase-changing devices for use in determining a position of user equipment in accordance with one or more aspects.

FIG. 14 illustrates an example method 1400 for selecting and configuring a subset of adaptive phase-changing devices for use in determining a position of user equipment in accordance with one or more aspects. In various implementations, operations of the method 1400 are performed by or using a base station, APDs, or APD-enabled position function, such as the base station 120, APDs 180, and/or APF 272 as described in any of FIGS. 1 through 12B. At times, aspects of the method 1400 operate in conjunction with aspects of the method 1300, the method 1500, and/or method 1600.

At block 1405, a base station estimates a location of a UE based on a wireless connection with the UE. For example, the base station 120 estimates the location of the UE 110 based on communication through a wireless connection with the UE as described with reference to 1015 and 1020 of FIG. 10. Optionally, the UE 110 may report to the base station an initial position of the UE based on a GNSS sensor of the UE. In some aspects, the base station 120 receives, via the wireless connection, at least one link quality parameter, position reference signal, or time reference signal from the UE, and generates the estimated or initial location of the UE using the at least one link quality parameter, position reference signal, or time reference signal as described at 1025 of FIG. 10. Alternatively or additionally, the base station 120 receives the estimated location of the UE 110 via a low-band communication from the UE 110, such as that described with reference to 1010 of FIG. 10.

At block 1410, the base station selects a set of candidate APDs based on the estimated location of the UE. In some cases, the base station 120 obtains position and/or orientation information from the APDs 180 via an APD control channel, which may include the APD-slow-control channel or APD-fast-control channel. Alternatively or additionally, the base station 120 can query a server for position information and/or capabilities of APDs proximate the UE 110, such as by contacting a server included in the core network 150 of FIG. 1. For example, the base station 120 selects a set of at least two candidate APDs (e.g., APD 181, APD 182, APD 183, and other proximate APDs) based on the estimated location of the UE 110 as described with reference to 1030 of FIG. 10. In some aspects, the base station 120 queries a repository of historical data that indicates combinations of proximate APDs based on the estimated location of the UE.

At block 1415, the base station transmits a respective signal toward a surface of each APD in the set of candidate APDs. For example, the base station 120 transmits a respective signal toward a surface of each APD in the set of candidate APDs 181, 182, and 183 and other proximate candidate APDs as described with reference to 1035 of FIG. 10. In some cases, the base station 120 transmits the respective signal toward a surface of a first APD (e.g., APD 181) in the set of candidate APDs, and directs at least some other APDs (e.g., APD 182, APD 183) in the set of candidate APDs, different from the first APD, to switch into a disabled state. By so doing, the base station 120 can ensure that reflection information is obtained for the active APD and not other proximate APDs that are disabled.

At block 1420, the base station receives one or more identifiers for reflections of at least some of the respective signals transmitted toward the surfaces of each APD. Alternatively or additionally, the base station 120 receives, from the UE, one or more signal quality parameters with the identifiers of the reflections. For example, the base station 120 receives, from the UE 110, one or more reflection identifiers 506 and RSRP values for the reflections via the wireless connection as described with reference to 1060 of FIG. 10. Generally, the one or more identifiers and/or signal quality parameters correspond to reflections of at least some of the respective signals transmitted toward the surfaces of each APD.

At block 1425, the base station selects a subset of at least two APDs from the set of multiple candidate APDs based on analyzing the one or more signal identifiers for the wireless signal reflections reaching the UE. In addition to analyzing the one or more signal identifiers, the base station may also analyze or compare respective signal quality parameters (e.g., RSRP) for the reflections. In some cases, the base station analyzes the RSRP level and determines that the RSRP level meets a predefined threshold value. In response to determining the RSRP level meets the threshold value, the base station 120 determines to include the particular APD in the subset. Alternatively, if the RSRP level does not meet the threshold, the base station may exclude the APD from the subset or reconfigure the APD (e.g., an RIS configuration) and transmit another wireless signal to determine whether the reconfigured APD's performance improves sufficiently for use in position-determining operations. The reflections having a higher RSRP may indicate that an associated APD is closer to the UE, has a clear signal path to the UE, or is better able to reach the UE with reflections of wireless signals. For example, the base station 120 analyzes the respective reflection identifiers and RSRP values provided by the UE 110 for the reflections from the candidate APDs. Based on the RSRP levels and reflection identifiers of the reflections that reach the UE, the base station 120 selects a subset of at least two APDs (e.g., APD 181, APD 182) from the set of candidate APDs to which the wireless signals were transmitted.

At block 1430, the base station configures the selected subset of at least two APDs for use in determining a position of one or more user equipment. For example, the base station 120 may determine a respective RIS configuration for each APD in the selected subset of APDs and directs each APD to apply the respective RIS configuration to a respective RIS as described with reference to FIGS. 4 and 7. Alternatively or additionally, the base station 120 may select a beam sweeping pattern for one or more of the selected APDs and send an indication (e.g., beam sweeping index) of the selected pattern to the selected APDs, such as described with reference to FIGS. 6A and 6B or FIGS. 8A and 8B.

Figure 15:
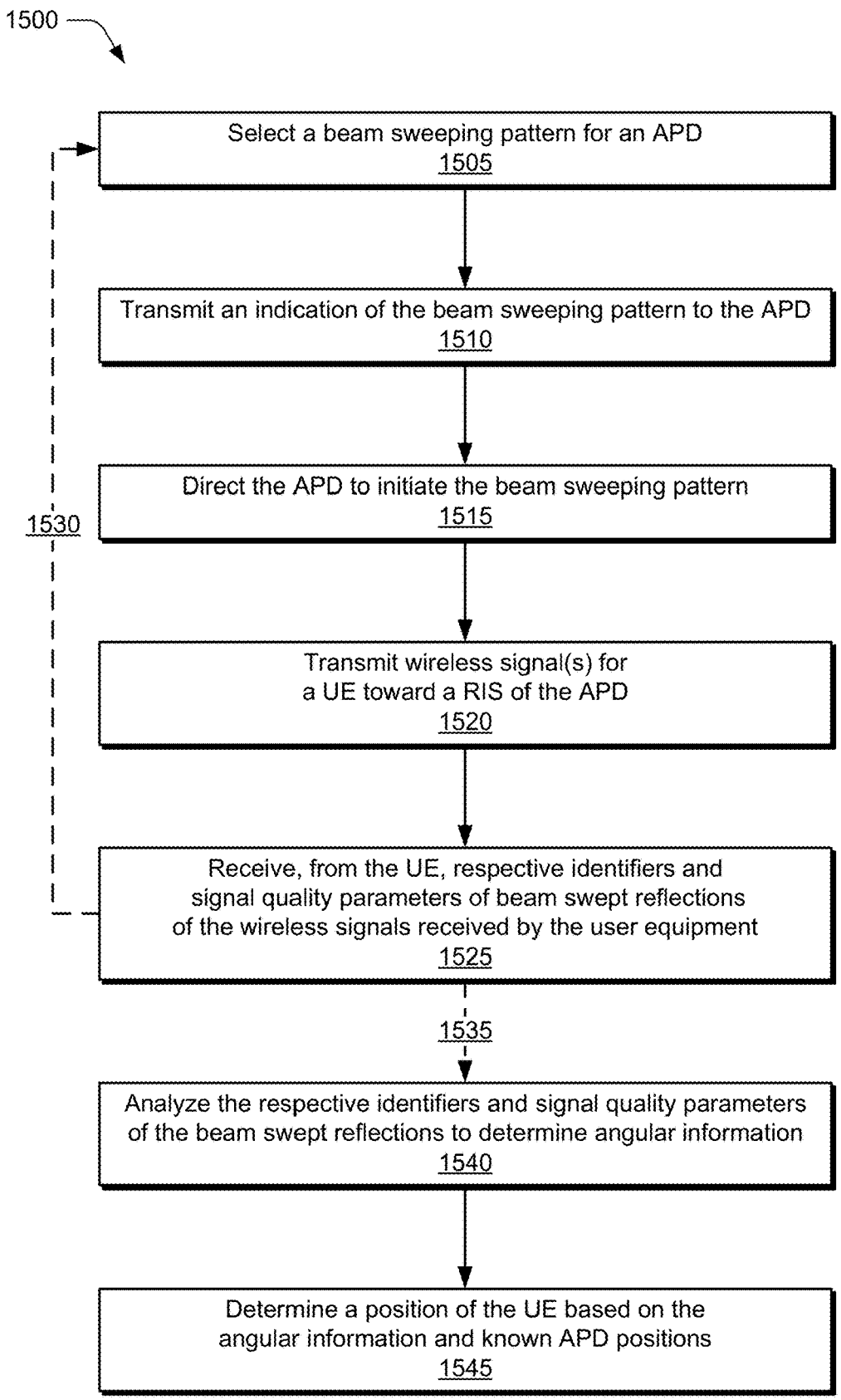
FIG. 15 illustrates an example method for beam sweeping reflections of a wireless signal with an adaptive phase-changing device in accordance with one or more aspects.

FIG. 15 illustrates an example method 1500 for beam sweeping reflections of a wireless signal with an adaptive phase-changing device in accordance with one or more aspects. In various implementations, operations of the method 1500 are performed by or using a base station, APD, or APD-enabled position function, such as the base station 120, APDs 180, and/or APF 272 as described with reference to any of FIGS. 1 through 12B. At times, aspects of the method 1500 operate in conjunction with aspects of the method 1300, the method 1400, and/or the method 1600.

At block 1505, the base station selects a beam sweeping pattern for an APD. In some cases, the beam sweeping pattern is selected based on an estimated location of a UE or using a revised estimation of the location of the UE. The selected beam sweeping pattern may be configured to implement beam sweeping of wireless signal reflections in a horizontal or vertical direction. For example, the base station 120 selects a beam sweeping pattern for an APD 180 as described with reference to 1110 of FIG. 11.

At block 1510, the base station transmits an indication of the beam sweeping pattern to the APD. Prior to transmitting the indication, the base station may transmit one or more surface configuration and/or beam sweeping codebooks to the APD for use in beam sweeping operations. In some cases, the base station transmits a beam sweeping index by which the APD accesses a beam sweeping codebook to determine a sequence of phase vectors for steering or directing reflections of wireless signals. For example, the base station 120 transmits an indication (e.g., beam sweeping index) of the selected beam sweeping pattern to the APD 180 as described with reference to 1115 of FIG. 11.

At block 1515, the base station directs the APD to initiate the beam sweeping pattern. In some cases, the base station directs the APD to initiate implementation of the beam sweeping at a predetermined time, during a selected time slot, or based on a synchronization field of an incident wireless signal. For example, the base station 120 directs the APD 180 to initiate the beam sweeping pattern as described with reference to 1125 of FIG. 11.

At block 1520, the base station transmits wireless signal(s) for a UE toward a RIS of the APD. The base station may transmit one or more reference signals toward the RIS of the APD. In some cases, the base station modulates or encodes the reference signal with beam ID (e.g., BS beam ID 502) or base station-specific identification information. In such cases, transmission of the wireless signal can be synchronized with implementation of the beam sweeping pattern by the APD to direct identifiable reflections in accordance with the beam sweeping pattern. For example, the base station 120 transmits the wireless signal, which is modulated with a sequence of BS beam IDs, toward the RIS of the APD 180 as described with reference to 1135 of FIG. 11.

At block 1525, the base station receives, from the user equipment, respective identifiers and signal quality parameters of reflections of the wireless signals received by the user equipment. The base station may receive the respective reflection identifiers and signal quality parameters via a low-band anchor connection with the UE. For example, the base station 120 receives, from the UE 110, respective reflection identifiers and/or signal quality parameters for beam swept reflections that reach the UE as described with reference to 1145 of FIG. 11.

In some aspects, the method 1500 iteratively implements beam sweeping operations by reselecting a beam sweeping pattern for a same APD or different APD. To illustrate, block 1525 optionally proceeds at 1530 to block 1505 to select a second beam sweeping pattern, indicate the second beam sweeping pattern to the APD at 1510, direct the APD to initiate the second beam sweeping pattern at 1515, transmit signals toward the RIS at 1520, and receive respective reflection identifiers and/or signal quality parameters at 1525.

In other aspects, the block 1525 proceeds at 1535 to block 1540 at which the base station analyzes the respective reflection identifiers 506 and signal quality parameters of the beam swept reflections to determine angular information for the APD in relation to the UE. For example, the base station 120 analyzes the respective identifiers and signal quality parameters of the reflections of the wireless signals to determine angular information as described with reference to 1150 of FIG. 11. At block 1545, the base station determines a position of the user equipment based on the angular information, angular information for others of the APDs, known APD positions, and optionally with non-APD-based position information for the UE. For example, the base station 120 determines a position of the user equipment 110 based on the angular information for APDs 180 (e.g., APDs 181, 182), direct mmWave signaling with the UE 110, and known APD positions as described with reference to 1155 of FIG. 11.

Figure 16:
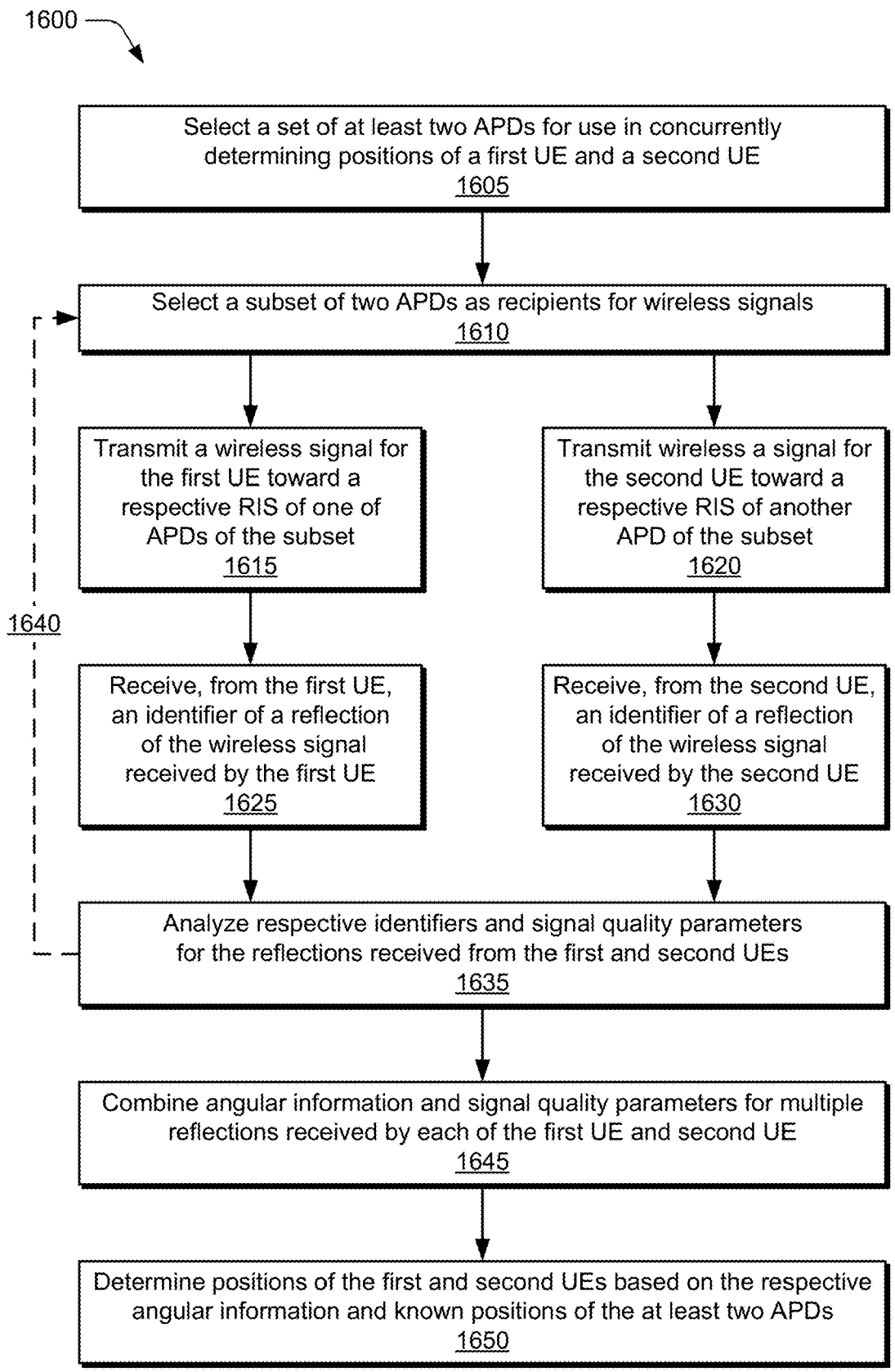
FIG. 16 illustrates an example method for concurrently determining respective positions of multiple user equipment by using adaptive phase-changing devices in accordance with one or more aspects.

FIG. 16 illustrates an example method 1600 for concurrently determining respective positions of multiple user equipment by using adaptive phase-changing devices in accordance with one or more aspects. In various implementations, the operations of the method 1600 may be performed by or using a base station, APD, or APD-enabled position function, such as the base station 120, APD 180, and/or APF 272 as described with reference to any of FIGS. 1 through 12B. At times, aspects of the method 1600 operate in conjunction with aspects of the method 1300, the method 1500, and/or the method 1600.

The method 1600 is described generally in the context of determining respective positions of two UEs 110 with a set of at least two APDs 180 that are associated with a base station 120. Alternatively or additionally, the base station 120 may determine non-APD-based position information for either UE by direct high-band or low-band communications with the UE. The operations of method 1600 may be extended to any suitable number of UEs 110 through the availability and use of a minimum number of APDs 180 that enable concurrent transmission, via a subset the APDs, of respective wireless signals to at least two of the UEs 110. Thus, the position-determining operations of the method 1600 may be implemented by a base station 120 with two APDs 180 to concurrently position two UEs 110.

At block 1605, the base station selects a set of at least two APDs for use in concurrently determining positions of a first UE and a second UE. In some cases, the base station selects a set of three APDs for use in determining the positions of the first UE and the second UE. For example, the base station 120 selects a set of three APDs 180, such as APD 181, APD 182, and APD 183, for use in concurrently determining positions of a first UE 111 and a second UE 112. In other cases, the base station selects a set of at least two APDs 180 with direct LoS communication with the UEs 111 and 112 is available. In some aspects, the set of APDs 180 is selected and/or configured by implementing operations described with reference to FIG. 9 or the method 1400 of FIG. 14.

At block 1610, the base station selects, from the set of APDs, a subset of two APDs as recipients for wireless signals. The two APDs are selected for use in reflecting or directing respective wireless signals to the first UE and the second UE, respectively. An APD of the subset may be selected in order to obtain angular information for that APD in combination with one of the UEs when the base station lacks such angular information. For example, the base station 120 selects APD 181 and APD 182 to receive wireless signals for reflection toward the UE 111 and the UE 112, such as described in reference to FIGS. 8A and 8B. Additionally, the base station may configure the subset of two APDs to reflect or beam sweep the wireless signals by implementing operations described with reference to FIGS. 9 and 10.

At block 1615, the base station transmits a wireless signal for the first UE toward a respective RIS of one of the APDs of the subset of two APDs. Similarly, at block 1620, the base station transmits a wireless signal for the second UE toward a respective RIS of another APD of the subset of two APDs. For example, the base station 120 transmits a first wireless signal (e.g., reference signal 831) toward a RIS of the APD 181 and transmits a second wireless signal (e.g., reference signal 835) toward a RIS of the APD 182. In some aspects, the wireless signals are transmitted by implementing operations (e.g., 1202 and 1206) described with reference to FIGS. 8A, 8B, 12A, and/or 12B.

At block 1625, the base station receives, from the first UE, an identifier of a reflection of the wireless signal received by the first UE. Similarly, at block 1630, the base station receives, from the second UE, an identifier of a reflection of the wireless signal received by the first UE. Additionally, the base station may receive signal quality parameters for the reflections of wireless signals received by the first UE and/or the second UE. For example, the base station 120 receives, from the first UE 111, a reflection identifier 506 (e.g., BS beam ID 502 and/or APD reflected beam ID 504) and an RSRP value for the reflection of the wireless signal received by the first UE 111. The base station 120 also receives, from the second UE 112, a reflection identifier 506 and an RSRP value for the reflection of the wireless signal received by the second UE 112. To illustrate, the base station 120 may receive, from the first UE 111, an identifier of the reflection of the wireless signal received by the first UE as described at 1210, at 1230, and at 1250 of FIGS. 12A and 12B, and may receive, from the second UE 112, an identifier of the reflection of the wireless signal received by the second UE as described at 1212, at 1232, and at 1252 of FIGS. 12A and 12B.

At block 1635, the base station analyzes respective identifiers and signal quality parameters for the reflections received by the first UE and the second UE to determine respective angular information for the subset of two APDs. Additionally, the base station may determine angular information or estimate distance information for the subset of two APDs based on signal quality parameters (e.g., RSRPs) of the reflections. For example, the base station 120 determines first angular information for the APD 181 and the first UE 111 and determines second angular information for the APD 182 and the second UE 112. In some aspects, the respective angular information is determined by implementing operations (e.g., 1260) as described with reference to FIG. 12B.

From block 1635, the method 1600 may progress at 1640 to return to block 1610 to select a different subset of APDs for performing operations to determine positions of the first and second UEs. Alternatively, the method 1600 may progress to block 1645 to combine angular information and signal quality parameters for multiple reflections received by each of the UEs. For example, the base station determines whether to analyze a different subset of APDs by analyzing previously selected subsets of APDs and UEs and/or obtained angular information for the previously selected subsets. If the base station needs additional angular information from other combinations of APDs and UEs, the method 1600 proceeds at 1640 to select another subset of APDs for which to obtain angular information. In response to determining to analyze a different subset of APDs and UEs, the method progresses at 1640, returns to block 1610, and performs another iteration of blocks 1610 through 1635 to determine respective angular information for the different combination of the APDs and UEs.

In response to determining that sufficient angular information has been obtained and/or sufficient combinations of APDs and UEs have been analyzed together computing positions of the first UE and/or second UE, the method 1600 progresses from block 1635 to block 1645. At block 1645, the base station combines the angular information and signal quality parameters for multiple reflections received by each of the UEs. In some cases, the base station combines this APD-based angular and distance information with non-APD-based position information for one of the UEs 110. For example, the base station 120 may combine, for the first UE 111, a first set of angular information that includes angular information for each of the APDs 181 and 182, as well as angular and distance information obtained through direct LoS communication of high-band signals (e.g., mmWave signaling) or low-band signals (e.g., sub-6 GHz signaling). As another example, the base station 120 may combine, for the second UE 112, a second set of angular information that includes angular information for each of the APDs 181, 182, and 183 based on the reflections received by the second UE 112.

At block 1650, the base station determines positions of the first and second UEs based on the respective angular information and known positions of the at least two APDs. For example, the base station 120 determines positions of the first UE 111 and second UE 112 based on the respective angular information and known positions of the APDs 181, 182, and 183, such as described with reference to FIG. 12B. In some aspects, the positions of the first and second UE are determined by implementing operations (e.g., 1254, 1270) described with reference to FIG. 12B.

Although aspects of determining a position of user equipment by using adaptive phase-changing devices have been described in language specific to features and/or methods, the subject of the appended claims is not necessarily limited to the specific features or methods described. Rather, the specific features and methods are disclosed as example implementations of determining a position of user equipment using multiple APDs and other equivalent features and methods are intended to be within the scope of the appended claims. Thus, the appended claims include a list of features that can be selected in "any combination thereof," which includes combining any number and any combination of the listed features. Further, various different aspects are described, and it is to be appreciated that each described aspect can be implemented independently or in connection with one or more other described aspects.

In the following, several examples of determining a position of a UE using APDs are described.

Example 1. A method performed by a base station for determining a position of a user equipment, UE, by using adaptive phase-changing devices, APDs, the method comprising: transmitting a first wireless signal for the UE toward a first reconfigurable intelligent surface, RIS, of a first APD having a first position; receiving, from the UE via a wireless connection, a first identifier of a first reflection of the first wireless signal received by the UE; transmitting a second wireless signal for the UE toward a second RIS of a second APD having a second position; receiving, from the UE via the wireless connection, a second identifier of a second reflection of the second wireless signal received by the UE; determining a first reflected angle off the first APD for the first reflection of the first wireless signal based on the first identifier; determining a second reflected angle off the second APD for the second reflection of the second wireless signal based on the second identifier; and determining the position of the UE based on the first reflected angle, the second reflected angle, the first position of the first APD, and the second position of the second APD.

Example 2. The method as recited in example 1, further comprising receiving, from the UE via the wireless connection, a signal quality parameter for at least one of: the first reflection of the first wireless signal; or the second reflection of the second wireless signal.

Example 3. The method as recited in example 2, wherein the signal quality parameter includes an indication of one of: a received signal strength indicator, RSSI, of the first reflection and/or the second reflection; a signal-to-interference-plus-noise ratio, SINR, of the first reflection and/or the second reflection; or a reference signal received power, RSRP, of the first reflection and/or the second reflection.

Example 4. The method as recited in any of examples 1 to 3, wherein: the first position of the first APD includes a first orientation of the first APD, and/or the second position of the second APD includes a second orientation of the second APD; and the determining the position of the UE further comprises querying the first APD for the first orientation information and/or querying the second APD for the second orientation information.

Example 5. A method performed by a base station for determining a position of a user equipment, UE, by using adaptive phase-changing devices, APDs, the method comprising: transmitting a first wireless signal for the UE toward a first reconfigurable intelligent surface, RIS, of a first APD having a first position; receiving, from the UE via a wireless connection, a first identifier of a first reflection of the first wireless signal received by the UE; transmitting a second wireless signal for the UE toward a second RIS of a second APD having a second position; receiving, from the UE via the wireless connection, a second identifier of a second reflection of the second wireless signal received by the UE; determining a first reflected angle off the first APD for the first reflection of the first wireless signal based on the first identifier; determining a second reflected angle off the second APD for the second reflection of the second wireless signal based on the second identifier; communicating a third wireless signal directly with the UE; determining non-APD-based position information for the UE based on the third wireless signal; and determining a position of the UE based on the first reflected angle, the second reflected angle, the first position of the first APD, the second position of the second APD, and the non-APD-based position information for the UE.

Example 6. The method as recited in example 5, further comprising determining, as at least part of the non-APD-based position information, at least one of: angular information for the UE relating to an angle between the base station and the UE based on the third wireless signal; distance information for the UE relating a distance between the base station and the UE based on the third wireless signal; or an approximate position of the UE based on the third wireless signal.

Example 7. The method as recited in example 6, wherein: the approximate position of the UE includes an estimated position of the UE based on global navigational satellite system, GNSS, signals received by the UE, and the method further comprises: receiving, from the UE and via the third wireless signal, an indication of the estimated position of the UE that is determined by the UE from the GNSS signals.

Example 8. The method as recited in example 6, wherein the angular information for the UE includes at least one of: an angle-of-arrival measurement for an uplink signal or sounding reference signal transmitted by the UE as the third wireless signal; or an angle-of-departure measurement for a downlink signal or position reference signal transmitted by the base station as the third wireless signal.

Example 9. The method as recited in example 6, wherein the distance information for the UE includes at least one of: a time difference of arrival measurement for a downlink signal or position reference signal transmitted by the base station as the third wireless signal; a time difference of arrival measurement for an uplink signal or sounding reference signal transmitted by the UE as the third wireless signal; a timing advance value associated with a downlink transmitted to the UE by the base station as the third wireless signal; a round-trip-time measurement of non-APD-based communications between the base station and the UE that include the third wireless signal; a signal quality parameter measurement associated with a downlink signal or position reference signal transmitted by the base station as the third wireless signal; or a signal quality parameter measurement associated with an uplink signal or sounding reference signal transmitted by the UE as the third wireless signal.

Example 10. A method performed by a base station to select adaptive phase-changing devices, APDs, to use in a user equipment-location computation, UE-location computation, the method comprising: estimating a location of a user equipment, UE; selecting a set of multiple candidate APDs based on the estimated location of the UE; transmitting, by the base station, a respective signal toward a surface of each APD in the set of multiple candidate APDs; receiving, from the UE via a wireless connection, one or more identifiers of reflections of at least some of the respective signals transmitted toward the surfaces of each APD; and selecting, as the APDs to use in the UE-location computation, a subset of at least two APDs from the set of multiple candidate APDs based on analyzing the one or more identifiers of the reflections.

Example 11. The method as recited in example 10, further comprising: receiving, from the UE, one or more signal quality parameters based on the transmitting; and wherein selecting the subset of at least two APDs from the set of multiple candidate APDs further comprises: selecting the subset of at least two APDs based on analyzing the one or more signal quality parameters.

Example 12. The method as recited in example 11, wherein receiving the one or more signal quality parameters further comprises: receiving a reference signal received power, RSRP, level for a particular APD in the set of candidate APDs, and wherein selecting the subset of the set of candidate APDs comprises: determining that the RSRP level exceeds a threshold value; and in response to determining the RSRP level exceeds the threshold value, determining to include the particular APD in the subset.

Example 13. The method as recited in example 12, wherein receiving the RSRP level further comprises: receiving the RSRP level using a low-band communication.

Example 14. The method as recited in any one of examples 10 to 13, wherein estimating the location of the UE comprises: estimating a distance between the base station based on at least one of a base station-originated position reference signal or a UE-originated sounding reference signal; and/or estimating an angle from the base station to the UE based on at least one of the base station-originated position reference signal or the UE-originated sounding reference signal.

Example 15. The method as recited in any one of examples 10 to 14, wherein estimating the location of the UE comprises: receiving, from the UE and in a low-band communication, the estimated location of the UE based on global navigational satellite system, GNSS, signals received by the UE.

Example 16. The method as recited in any one of examples 10 to 15, wherein selecting the set of multiple candidate APDs based on the estimated location of the UE comprises: querying, using the estimated location of the UE, historical data that indicates combinations of APDs based on the location.

Example 17. The method as recited in any one of examples 10 to 16, further comprising: determining a respective reconfigurable intelligent surface, RIS, configuration for each APD in the subset of at least two APDs; and directing each APD in the subset of at least two APDs to apply the respective RIS configuration to a respective RIS.

Example 18. The method as recited in any one of examples 10 to 17, wherein transmitting the respective signal toward the surface of each APD in the set of multiple candidate APDs further comprises: transmitting a first wireless signal toward a first APD in the set of multiple candidate APDs; and directing at least one other APD in the set of multiple candidate APDs, different from the first APD, to switch into a disabled state.

Example 19. The method as recited in any one of examples 10 to 18, further comprising performing the method of any of examples 1 to 9 using two APDs from the subset of at least two APDs as the first APD and the second APD.

Example 20. A base station apparatus comprising: at least one wireless transceiver; a processor; and computer-readable storage media comprising instructions, responsive to execution by the processor, for directing the base station apparatus to perform any one of the methods recited in examples 1 to 19 using the at least one wireless transceiver.

Example 21. A computer-readable storage media comprising instructions that, responsive to execution by a processor, cause a method as recited in any one of examples 1 to 19 to be performed.

What is claimed is:

1. A method performed by a base station for determining a position of a user equipment, UE, by using multiple adaptive phase-changing devices, APDs, the method comprising:
    transmitting a first wireless signal toward a first reconfigurable intelligent surface, RIS, of a first APD among the multiple APDs, the first APD being located at a first position;
    receiving, from the UE via a wireless connection, a first identifier associated with a first reflection of the first wireless signal received by the UE from the first APD;
    transmitting a second wireless signal toward a second RIS of a second APD among the multiple APDs, the second APD being located at a second position;
    receiving, from the UE via the wireless connection, a second identifier associated with a second reflection of the second wireless signal received by the UE from the second APD;
    determining a first reflected angle off the first RIS of the first APD for the first reflection of the first wireless signal based on the first identifier;

determining a second reflected angle off the second RIS of the second APD for the second reflection of the second wireless signal based on the second identifier; and determining the position of the UE based on the first reflected angle of the first reflection, the second reflected angle of the second reflection, the first position of the first APD, and the second position of the second APD.

2. The method as recited in claim 1, further comprising at least one of:
using the first identifier to identify the first APD as a source of the first reflection of the first wireless signal and determining, based on the first identifier, a first phase vector implemented by the first RIS to direct the first reflection toward the UE; or
using the second identifier to identify the second APD as a source of the second reflection of the second wireless signal and determining, based on the second identifier, a second phase vector implemented by the second RIS of the second APD to direct the second reflection toward the UE.

3. The method as recited in claim 2, further comprising at least one of:
if the first identifier is used to identify the first APD as the source of the first reflection, determining the first reflected angle off the first RIS of the first APD for the first reflection based on the first phase vector implemented by the first RIS; or
if the second identifier is used to identify the second APD as the source of the second reflection, determining the second reflected angle off the second RIS of the second APD for the second reflection based on the second phase vector implemented by the second RIS.

4. The method as recited in claim 1, wherein transmitting the first wireless signal comprises:
modulating, by the base station and onto the first wireless signal, a beam identifier that corresponds to at least a portion of the first identifier of the first reflection of the first wireless signal; or
directing the first APD to modulate, onto the first reflection, a reflected beam identifier that corresponds to at least the portion of the first identifier of the first reflection of the first wireless signal.

5. The method as recited in claim 1, further comprising implementing a beam sweep of reflections of the first wireless signal by:
selecting a first beam sweeping pattern for the first APD;
sending an indication of the first beam sweeping pattern to the first APD;
directing the first APD to initiate, at a predefined time, configuration of the first RIS in accordance with the first beam sweeping pattern; and
transmitting the first wireless signal based on the predefined time via the first APD, the reflections of the first wireless signal including at least the first reflection of the first wireless signal.

6. The method as recited in claim 5, wherein:
the first beam sweeping pattern includes a sequence of phase vectors for configuring the first RIS during a beam sweeping procedure to implement the beam sweep of the reflections of the first wireless signal, and the method further comprises modulating, by the base station, a sequence of reflected beam identifiers onto respective portions of the first wireless signal; and
wherein at least a portion of the first identifier associated with the first reflection corresponds to at least part of the sequence of reflected beam identifiers.

7. The method as recited in claim 5, wherein:
the determining of the first reflected angle off the first RIS of the first APD occurs prior to the transmitting of the second wireless signal, and the method further comprises:
updating an estimated position of the UE based on the first reflected angle and the first position of the first APD to provide an updated estimated position of the UE; and
selecting a second beam sweeping pattern for the second APD based on the updated estimated position of the UE; or
reducing a number of phase vectors of the second beam sweeping pattern for the second APD effective to narrow the second beam sweeping pattern based on the updated estimated position of the UE.

8. The method as recited in claim 1, wherein:
the UE is a first UE;
one of the first wireless signal or the second wireless signal for the first UE is transmitted toward the first RIS or the second RIS during a predefined timeslot, and the method further comprises:
transmitting a third wireless signal for a second UE toward a different one of the first RIS or the second RIS during the predefined timeslot to concurrently determine respective positions of at least the first UE and the second UE.

9. The method as recited in claim 1, wherein:
the wireless connection between the base station and the UE is a first wireless connection implemented in a first frequency band that is below 6 GHz, and the method further comprises:
transmitting the first wireless signal and/or the second wireless signal directed to the UE as part of a second wireless connection implemented in a second frequency band that is at or above 6 GHz.

10. The method as recited in claim 9, further comprising using carrier aggregation to communicate with the UE via the first wireless connection implemented in the first frequency band and the second wireless connection implemented in the second frequency band.

11. The method as recited in claim 9, further comprising:
receiving, from the UE in the first frequency band, an indication of a signal quality parameter for the first reflection of the first wireless signal or the second reflection of the second wireless signal;
estimating a first distance from the first APD to the UE or a second distance from the second APD to the UE based on the signal quality parameter for the first reflection or the second reflection, respectively, and
wherein the determining of the position of the UE is also based on the first distance or the second distance.

12. A base station comprising:
a wireless transceiver;
a processor; and
non-transitory computer-readable storage media comprising instructions, responsive to execution by the processor, for directing the base station to:
transmit a first wireless signal toward a first reconfigurable intelligent surface, RIS, of a first APD among multiple APDs, the first APD being located at a first position;
receive, from a UE via a wireless connection, a first identifier associated with a first reflection of the first wireless signal received by the UE from the first APD;

transmit a second wireless signal toward a second RIS of a second APD among the multiple APDs, the second APD being located at a second position;

receive, from the UE via the wireless connection, a second identifier associated with a second reflection of the second wireless signal received by the UE from the second APD;

determine a first reflected angle off the first RIS of the first APD for the first reflection of the first wireless signal based on the first identifier;

determine a second reflected angle off the second RIS of the second APD for the second reflection of the second wireless signal based on the second identifier; and determine the position of the UE based on the first reflected angle of the first reflection, the second reflected angle of the second reflection, the first position of the first APD, and the second position of the second APD.

13. The base station as recited in claim 12, the instructions further executable to direct the base station to:

use the first identifier to identify the first APD as a source of the first reflection of the first wireless signal and determine, based on the first identifier, a first phase vector implemented by the first RIS to direct the first reflection toward the UE; or use the second identifier to identify the second APD as a source of the second reflection of the second wireless signal and determine, based on the second identifier, a second phase vector implemented by the second RIS of the second APD to direct the second reflection toward the UE.

14. The base station as recited in claim 13, the instructions further executable to direct the base station to:

if the first identifier is used to identify the first APD as the source of the first reflection, determine the first reflected angle off the first RIS of the first APD for the first reflection based on the first phase vector implemented by the first RIS; or if the second identifier is used to identify the second APD as the source of the second reflection, determine the second reflected angle off the second RIS of the second APD for the second reflection based on the second phase vector implemented by the second RIS.

15. The base station as recited in claim 12, wherein the instructions to transmit the first wireless signal further direct the base station to:

modulate, onto the first wireless signal, a beam identifier that corresponds to at least a portion of the first identifier of the first reflection of the first wireless signal; or direct the first APD to modulate, onto the first reflection, a reflected beam identifier that corresponds to at least the portion of the first identifier of the first reflection of the first wireless signal.

16. The base station as recited in claim 12, the instructions further executable to implement a beam sweep of reflections of the first wireless signal by directing the base station to:

select a first beam sweeping pattern for the first APD;

send an indication of the first beam sweeping pattern to the first APD;

direct the first APD to initiate, at a predefined time, configuration of the first RIS in accordance with the first beam sweeping pattern; and transmit the first wireless signal based on the predefined time via the first APD, the reflections of the first wireless signal including at least the first reflection of the first wireless signal.

17. The base station as recited in claim 16, wherein:

the first beam sweeping pattern includes a sequence of phase vectors for configuring the first RIS during a beam sweeping procedure to implement the beam sweep of the reflections of the first wireless signal, and the instructions are further executable to direct the base station to modulate a sequence of reflected beam identifiers onto respective portions of the first wireless signal; and wherein at least a portion of the first identifier associated with the first reflection corresponds to at least part of the sequence of reflected beam identifiers.

18. The base station as recited in claim 16, wherein:

the base station determines the first reflected angle off the first RIS of the first APD prior to the transmitting of the second wireless signal, and the instructions are further executable to direct the base station to:

update an estimated position of the UE based on the first reflected angle and the first position of the first APD to provide an updated estimated position of the UE; and select a second beam sweeping pattern for the second APD based on the updated estimated position of the UE; or reduce a number of phase vectors of the second beam sweeping pattern for the second APD effective to narrow the second beam sweeping pattern based on the updated estimated position of the UE.

19. The base station as recited in claim 12, wherein:

the UE is a first UE;

one of the first wireless signal or the second wireless signal for the first UE is transmitted toward the first RIS or the second RIS during a predefined timeslot, and the instructions are further executable to direct the base station to:

transmit a third wireless signal for a second UE toward a different one of the first RIS or the second RIS during the predefined timeslot to concurrently determine respective positions of at least the first UE and the second UE.

20. The base station as recited in claim 12, wherein:

the wireless connection between the base station and the UE is a first wireless connection implemented in a first frequency band that is below 6 GHz, and the instructions are further executable to direct the base station to:

transmit the first wireless signal or the second wireless signal directed to the UE as part of a second wireless connection implemented in a second frequency band that is at or above 6 GHz.

* * * * *